US012761860B2

(12) United States Patent
Gossain et al.

(10) Patent No.: US 12,761,860 B2
(45) Date of Patent: Oct. 13, 2026

(54) FLEXIBLE BACKHAUL TECHNIQUES FOR A WIRELESS HOME THEATER ENVIRONMENT

(71) Applicant: Sonos Inc., Santa Barbara, CA (US)

(72) Inventors: Hrishikesh Gossain, Santa Barbara, CA (US); Michael Strack, Santa Barbara, CA (US); Lawrence Stefani, Andover, MA (US)

(73) Assignee: Sonos Inc., Goleta, CA (US)

( * ) Notice: Subject to any disclaimer, the term of this patent is extended or adjusted under 35 U.S.C. 154(b) by 183 days.

(21) Appl. No.: 18/712,334

(22) PCT Filed: Dec. 2, 2022

(86) PCT No.: PCT/US2022/080794

§ 371 (c)(1),
(2) Date: May 22, 2024

(87) PCT Pub. No.: WO2023/102511

PCT Pub. Date: Jun. 8, 2023

(65) Prior Publication Data

US 2025/0013421 A1 Jan. 9, 2025

Related U.S. Application Data

(60) Provisional application No. 63/321,962, filed on Mar. 21, 2022, provisional application No. 63/264,906, filed on Dec. 3, 2021.

(51) Int. Cl.

| | |
|---|---|
| ***H04B 3/00*** | (2006.01) |
| ***G06F 3/16*** | (2006.01) |
| ***H04R 27/00*** | (2006.01) |

(52) U.S. Cl.
CPC .............. *G06F 3/16* (2013.01); *H04R 27/00* (2013.01)

(58) Field of Classification Search
CPC ................................. G06F 3/16; H04R 27/00
(Continued)

(56) References Cited

U.S. PATENT DOCUMENTS

| | | | |
|---|---|---|---|
| 5,440,644 | A | 8/1995 | Farinelli et al. |
| 5,761,320 | A | 6/1998 | Farinelli et al. |

(Continued)

FOREIGN PATENT DOCUMENTS

| | | | |
|---|---|---|---|
| EP | 1389853 | A1 | 2/2004 |
| WO | 0153994 | A2 | 7/2001 |
| WO | 2003093950 | A2 | 11/2003 |

OTHER PUBLICATIONS

AudioTron Quick Start Guide, Version 1.0, Mar. 2001, 24 pages.

(Continued)

*Primary Examiner* — Ammar T Hamid
(74) *Attorney, Agent, or Firm* — Secant IP, P.L.L.C.

(57) ABSTRACT

Embodiments disclosed herein include playback devices with multiple radios, antennas, filters, and switching circuits employed to enable switching of radios between multiple wireless networks. The switching is based on parameters of the wireless networks and on capabilities of other satellite playback devices communicating over the wireless networks. In some embodiments, the wireless networks are WIFI networks operating over one or more of a 2.4 GHz WIFI band, a lower frequency region of a 5 GHz WIFI band, a higher frequency region of the 5 GHz WIFI band, and a 6 GHz WIFI band. In some embodiments, the radios are switched between wireless networks in response to a change of frequency of a WIFI Access Point and/or a lost connection to a satellite playback device.

20 Claims, 21 Drawing Sheets

(58) Field of Classification Search
USPC ........................................................ 381/77, 80
See application file for complete search history.

(56) References Cited

U.S. PATENT DOCUMENTS

| | | | |
|---|---|---|---|
| 5,923,902 | A | 7/1999 | Inagaki |
| 6,032,202 | A | 2/2000 | Lea et al. |
| 6,256,554 | B1 | 7/2001 | DiLorenzo |
| 6,404,811 | B1 | 6/2002 | Cvetko et al. |
| 6,469,633 | B1 | 10/2002 | Wachter |
| 6,522,886 | B1 | 2/2003 | Youngs et al. |
| 6,611,537 | B1 | 8/2003 | Edens et al. |
| 6,631,410 | B1 | 10/2003 | Kowalski et al. |
| 6,757,517 | B2 | 6/2004 | Chang |
| 6,778,869 | B2 | 8/2004 | Champion |
| 7,130,608 | B2 | 10/2006 | Hollström et al. |
| 7,130,616 | B2 | 10/2006 | Janik |
| 7,143,939 | B2 | 12/2006 | Henzerling |
| 7,236,773 | B2 | 6/2007 | Thomas |
| 7,295,548 | B2 | 11/2007 | Blank et al. |
| 7,391,791 | B2 | 6/2008 | Balassanian et al. |
| 7,483,538 | B2 | 1/2009 | McCarty et al. |
| 7,571,014 | B1 | 8/2009 | Lambourne et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,853,341 | B2 | 12/2010 | McCarty et al. |
| 7,987,294 | B2 | 7/2011 | Bryce et al. |
| 8,014,423 | B2 | 9/2011 | Thaler et al. |
| 8,045,952 | B2 | 10/2011 | Qureshey et al. |
| 8,103,009 | B2 | 1/2012 | McCarty et al. |
| 8,234,395 | B2 | 7/2012 | Millington |
| 8,483,853 | B1 | 7/2013 | Lambourne |
| 8,942,252 | B2 | 1/2015 | Balassanian et al. |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0124097 | A1 | 9/2002 | Isely et al. |
| 2003/0157951 | A1 | 8/2003 | Hasty, Jr. |
| 2004/0024478 | A1 | 2/2004 | Hans et al. |
| 2007/0142944 | A1 | 6/2007 | Goldberg et al. |
| 2011/0299422 | A1 | 12/2011 | Kim et al. |
| 2013/0090115 | A1 | 4/2013 | Deivasigamani et al. |
| 2014/0093085 | A1 | 4/2014 | Jarvis et al. |
| 2015/0331663 | A1 | 11/2015 | Beckhardt et al. |
| 2020/0280800 | A1 | 9/2020 | Wilberding et al. |
| 2020/0374148 | A1* | 11/2020 | Wilberding ............. G06F 3/017 |
| 2021/0185101 | A1 | 6/2021 | Millington et al. |

OTHER PUBLICATIONS

AudioTron Reference Manual, Version 3.0, May 2002, 70 pages.
AudioTron Setup Guide, Version 3.0, May 2002, 38 pages.
Bluetooth. "Specification of the Bluetooth System: The ad hoc Scatternet for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
European Patent Office, European Extended Search Report mailed on Oct. 28, 2025, issued in connection with European Application No. 22902415.3, 11 pages.
International Bureau, International Preliminary Report on Patentability and Written Opinion, mailed on Jun. 13, 2024, issued in connection with International Application No. PCT/US2022/080794, filed on Dec. 2, 2022, 8 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Palm, Inc., "Handbook for the Palm VII Handheld," May 2000, 311 pages.
Presentations at WinHEC 2000, May 2000, 138 pages.
*Sonos, Inc.* v. *D&M Holdings* (No. 14-1330-RGA), DI 219, Claim Construction Opinion (Jan. 12, 2017) (24 pages).
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

* cited by examiner

FLEXIBLE BACKHAUL TECHNIQUES FOR A WIRELESS HOME THEATER ENVIRONMENT

CROSS-REFERENCE TO RELATED APPLICATIONS

This application is filed under 35 U.S.C. § 371 as a national stage application of International Application No. PCT/US2022/080794 filed Dec. 2, 2022, titled FLEXIBLE BACKHAUL TECHNIQUES FOR A WIRELESS HOME THEATER ENVIRONMENT. International Application No. PCT/US2022/080794 claims priority under 35 U.S.C. § 119(e), PCT Article 8, and Article 4 of the Paris Convention to U.S. Application No. 63/264,906 filed Dec. 3, 2021, titled FLEXIBLE BACKHAUL TECHNIQUES FOR A WIRELESS HOME THEATER ENVIRONMENT, and U.S. Application No. 63/321,962 filed Mar. 21, 2021, titled FLEXIBLE BACKHAUL TECHNIQUES FOR A WIRELESS HOME THEATER ENVIRONMENT. Each of the applications cited above is hereby incorporated herein by reference in its entirety.

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until 2002 when SONOS, Inc. began the development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

Figure 1A:
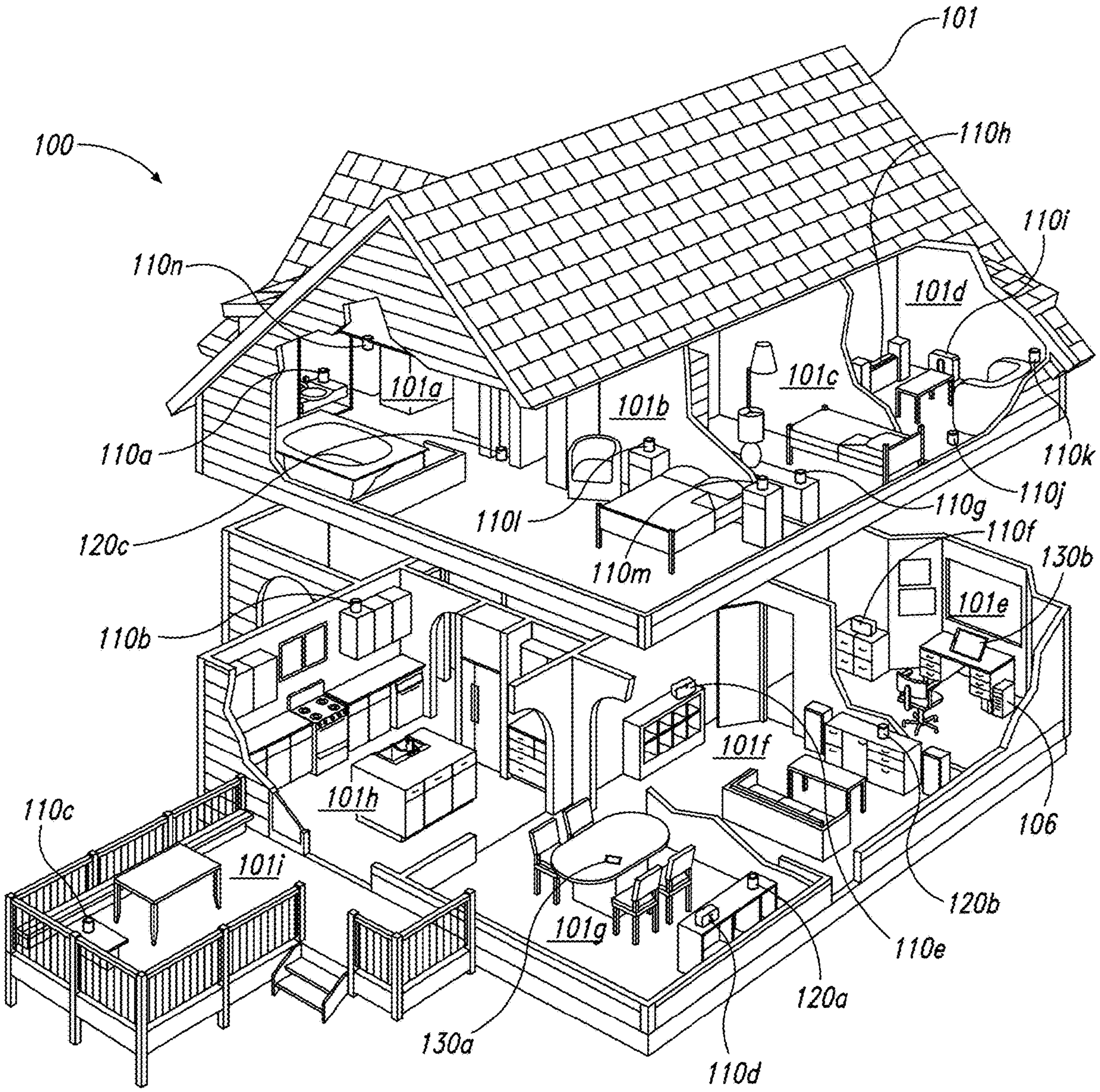
FIG. 1A is a partial cutaway view of an environment having a media playback system, in accordance with an example.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

SONOS Inc. has a long history of innovating in the home theater space as demonstrated by the successful launch of numerous home theater soundbar products including (but not limited to): PLAYBAR, PLAYBASE, BEAM, and ARC. For example, SONOS Inc. invented a low-latency communication scheme for wireless transmission of audio from a primary device (e.g., a soundbar) to one or more satellite devices (e.g., a subwoofer, a rear surround, etc.). Low-latency communication of audio enables expeditious transmission of audio content received at the primary device from a television to the one or more satellite devices for playback within a short period of time (e.g., within tens of milliseconds) after receipt. Such expeditious transmission of the received audio allows the home theater system to render the received audio in lip-synchrony with the corresponding visual content displayed on the television. Should the transmission of audio content from the primary device to the one or more satellite devices take too long, the audio content associated with a given section of visual content may not reach the satellite devices in time to be rendered in lip-synchrony with the visual content (e.g., reaching the one or more satellite devices more than 40 milliseconds after the visual content has been rendered).

In such a low-latency communication scheme, the satellite devices may connect to a dedicated wireless network established by the primary device for communication of audio for playback. By employing a dedicated network established by the primary device to communicate the audio traffic to the satellite devices, the audio traffic may be communicated directly to the satellite devices without the delay otherwise introduced by an intermediary hop across an Access Point (AP) (or other piece of networking equipment). Further, the wireless network is configured as a 5 Gigahertz (GHz) WIFI network (e.g., a WIFI network that employs one or more wireless channels in the 5 GHz band for communication) that offers additional latency benefits relative to a 2.4 GHz WIFI network (e.g., a WIFI network that employs one or more wireless channels in the 2.4 GHz band for communication) that typically suffers from considerable traffic congestion. To enable such a dedicated 5 GHz WIFI network for transmission of audio content from the primary device to the satellite devices, the primary device may employ a dedicated radio to establish the dedicated 5 GHz network. The primary device may employ a second radio configured to communicate over a backhaul connection to an AP (e.g., a user's AP in their home) so as to provide a communication path to other devices (e.g., user devices to facilitate control of the home theater system and/or cloud server(s) to obtain audio content for streaming). The backhaul connection to the AP is limited to being over a 2.4 GHz WIFI network to avoid interference with the 5 GHz WIFI network employed to communicate audio to the satellite devices. Additional details regarding low-latency communication schemes for home theater systems are described in U.S. Pat. No. 9,031,255 titled "Systems, Methods, Apparatus, and Articles of Manufacture to Provide Low-Latency Audio," issued May 12, 2015, which is incorporated herein by reference in its entirety.

SONOS Inc. has appreciated that forcing the backhaul connection to be over a 2.4 GHz WIFI network can create a number of headaches for end-users in view of the growing trend away from use of 2.4 GHz WIFI networks. For instance, a user may reconfigure their AP to only create a 5 GHz WIFI network (e.g., turn off the 2.4 GHz WIFI network) in an attempt to force all of their WIFI-enabled devices to use the 5 GHz WIFI network (e.g., in hopes of obtaining improved wireless performance). In such an instance, a primary device may be incapable of connecting to the user's AP and, as a result, require the user to troubleshoot the home theater system. Further, the user may inadvertently limit their troubleshooting attempts to only the primary device and/or the satellite devices (e.g., the devices perceived as being problematic) instead of looking to their already installed (and potentially otherwise properly functioning) AP configuration.

Accordingly, aspects of the present disclosure relate to flexible backhaul techniques that enable a primary device to intelligently coordinate the backhaul connection with the dedicated wireless network for communication of audio to the satellite devices. In some embodiments, the primary device may be designed so as to be capable of simultaneously communicating over at least two frequency ranges (e.g., that are outside the 2.4 GHz band) and coordinate the backhaul connection in a first frequency range with the dedicated wireless network in a second frequency range. For example, the primary device may be capable of simultaneously communicating in three frequency ranges. In this example, the primary device may first establish the backhaul connection to an AP in whatever frequency range (from the set of three frequency ranges) the AP is currently operating. After establishing the backhaul connection, the primary device may establish the dedicated wireless network in one of the remaining available frequency ranges (from the set of three frequency ranges) that are not occupied by the backhaul connection. In such an example, the primary device can accommodate a wide array of AP configurations and avoid the need for a user to troubleshoot or otherwise modify their AP configuration.

In some embodiments, the primary device may establish the dedicated wireless network first and then establish the backhaul wireless network in one of the remaining available frequency ranges.

In some embodiments, the primary device may be configured to simultaneously operate in multiple frequency ranges (e.g., outside the 2.4 GHz band) at least in part by splitting a band (e.g., the 5 GHz band) into multiple sub-bands. For instance, the primary device may split the 5 GHz band into multiple sub-bands, such as 5 GHz High sub-band and 5 GHz Low sub-band. Each of these sub-bands may comprise a subset of the total number of available channels in the 5 GHz band (e.g., 5 GHz High may comprise those channels above a cutoff frequency in the 5 GHz band while 5 GHz Low may comprise those channels below that cutoff frequency in the 5 GHz frequency band). In some embodiments, the cutoff frequency may be at the center of the 5 GHz band such that the 5 GHz Low sub-band covers the lower half of the 5 GHz band and the 5 GHz High sub-band covers the upper half of the 5 GHz band.

By dividing the 5 GHz band into multiple sub-bands, the primary device may facilitate concurrent operation in the 5 GHz band of both the backhaul connection and the dedicated wireless network for communication of audio content to the satellites. For instance, the primary device may establish (e.g., using a first radio) a backhaul connection to a 5 GHz WIFI network established by an AP on a first channel in the 5 GHz band that is in the 5 GHz Low sub-band. In such an instance, the primary device may (e.g., using a second radio) establish a 5 GHz WIFI network for the satellite devices on a second, different channel in the 5 GHz band that is in the 5 GHz High sub-band. As a result, the primary device may concurrently communicate over two different 5 GHz WIFI networks that are on different channels in different sub-bands.

Additionally (or alternatively), the primary device may be configured to simultaneously operate in multiple frequency ranges (e.g., outside the 2.4 GHz band) at least in part by incorporating additional bands available in newer communication standards. For instance, the primary device may be configured to support WIFI 6E and be capable of operating in the 6 GHz band in addition to the 2.4 GHz and 5 GHz bands.

In some instances, the primary device may leverage this new capability of simultaneous communication over multiple WIFI networks (e.g., in a single band) to provide flexibility in establishing the backhaul connection to the AP. For instance, the primary device may first establish the backhaul connection to the AP over whatever band (e.g., 2.4 GHz, 5 GHz, 6 GHz, etc.) is preferred (and/or otherwise encouraged by the AP such as via band steering techniques). After the primary device has established the backhaul connection to the AP via whatever band (or sub-band) is preferred, the primary device may create the dedicated wireless network for the satellite devices using whatever band or sub-bands remain available (e.g., not occupied by the backhaul connection to the AP). For instance, a user's AP may have established 2.4 GHz and 5 GHz WIFI networks. In such an instance, the primary device may establish a backhaul connection to the user's AP over the 5 GHz WIFI network, determine which sub-band is being used (e.g., 5 GHz High or 5 GHz Low), and use the remaining available 5 GHz sub-band or the 6 GHz band in establishing the WIFI network for the satellite devices to connect to. As a result, the primary device can accommodate any of a variety of existing network configurations that an end-user may have without requiring the end-user to troubleshoot or otherwise modify any settings on their AP.

It should be appreciated that the techniques described herein to enable a flexible backhaul connection may be readily applied to any of a variety of devices and is not limited to primary devices in a home theater system. For instance, the techniques described herein may be readily applied to mesh router systems where a given mesh router in the system may need to successfully coordinate a backhaul connection to a primary mesh router (e.g., the mesh router with a wired connection to a modem) with a wireless network established for one or more client devices to connect to. Further, the techniques described herein may be employed by devices that combine the functionality of a mesh router with a playback device (e.g., operating as a primary device in a home theater system).

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

In the Figures, identical reference numbers identify generally similar, and/or identical, elements. To facilitate the discussion of any particular element, the most significant digit or digits of a reference number refers to the Figure in which that element is first introduced. For example, element 110*a* is first introduced and discussed with reference to FIG. 1A. Many of the details, dimensions, angles and other features shown in the Figures are merely illustrative of particular embodiments of the disclosed technology. Accordingly, other embodiments can have other details, dimensions, angles, and features without departing from the spirit or scope of the disclosure. In addition, those of ordinary skill in the art will appreciate that further embodiments of the various disclosed technologies can be practiced without several of the details described below.

II. Suitable Operating Environment

FIG. 1A is a partial cutaway view of a media playback system 100 distributed in an environment 101 (e.g., a house). The media playback system 100 comprises one or more playback devices 110 (identified individually as playback devices 110*a-n*), one or more network microphone devices ("NMDs"), 120 (identified individually as NMDs 120*a-c*), and one or more control devices 130 (identified individually as control devices 130*a* and 130*b*).

As used herein the term "playback device" can generally refer to a network device configured to receive, process, and output data of a media playback system. For example, a playback device can be a network device that receives and processes audio content. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

Moreover, as used herein the term NMD (i.e., a "network microphone device") can generally refer to a network device that is configured for audio detection. In some embodiments, an NMD is a stand-alone device configured primarily for audio detection. In other embodiments, an NMD is incorporated into a playback device (or vice versa).

The term "control device" can generally refer to a network device configured to perform functions relevant to facilitating user access, control, and/or configuration of the media playback system 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some embodiments, for example, the media playback system 100 is configured to play back audio from a first playback device (e.g., the playback device 100*a*) in synchrony with a second playback device (e.g., the playback device 100*b*). Interactions between the playback devices 110, NMDs 120, and/or control devices 130 of the media playback system 100 configured in accordance with the various embodiments of the disclosure are described in greater detail below with respect to FIGS. 1B-1M.

In the illustrated embodiment of FIG. 1A, the environment 101 comprises a household having several rooms, spaces, and/or playback zones, including (clockwise from upper left) a master bathroom 101*a*, a master bedroom 101*b*, a second bedroom 101*c*, a family room or den 101*d*, an office 101*e*, a living room 101*f*, a dining room 101*g*, a kitchen 101*h*, and an outdoor patio 101*i*. While certain embodiments and examples are described below in the context of a home environment, the technologies described herein may be implemented in other types of environments. In some embodiments, for example, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed to form, for example, the configuration shown in FIG. 1A. Each zone may be given a name according to a different room or space such as the office 101*e*, master bathroom 101*a*, master bedroom 101*b*, the second bedroom 101*c*, kitchen 101*h*, dining room 101*g*, living room 101*f*, and/or the balcony 101*i*. In some aspects, a single playback zone may include multiple rooms or spaces. In certain aspects, a single room or space may include multiple playback zones.

In the illustrated embodiment of FIG. 1A, the master bathroom 101*a*, the second bedroom 101*c*, the office 101*e*, the living room 101*f*, the dining room 101*g*, the kitchen 101*h*, and the outdoor patio 101*i* each include one playback device 110, and the master bedroom 101*b* and the den 101*d* include a plurality of playback devices 110. In the master bedroom 101*b*, the playback devices 110*l* and 110*m* may be configured, for example, to play back audio content in synchrony as individual ones of playback devices 110, as a bonded playback zone, as a consolidated playback device, and/or any combination thereof. Similarly, in the den 101*d*, the playback devices 110*h-j* can be configured, for instance, to play back audio content in synchrony as individual ones of playback devices 110, as one or more bonded playback devices, and/or as one or more consolidated playback devices. Additional details regarding bonded and consolidated playback devices are described below with respect to FIGS. 1B and 1M.

In some aspects, one or more of the playback zones in the environment 101 may each be playing different audio content. For instance, a user may be grilling on the patio 101*i* and listening to hip hop music being played by the playback device 110*c* while another user is preparing food in the kitchen 101*h* and listening to classical music played by the playback device 110*b*. In another example, a playback zone may play the same audio content in synchrony with another playback zone. For instance, the user may be in the office 101*e* listening to the playback device 110*f* playing back the same hip hop music being played back by playback device 110*c* on the patio 101*i*. In some aspects, the playback devices 110*c* and 110*f* play back the hip hop music in synchrony such that the user perceives that the audio content is being played seamlessly (or at least substantially seamlessly) while moving between different playback zones. Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

a. Suitable Media Playback System

Figure 1B:
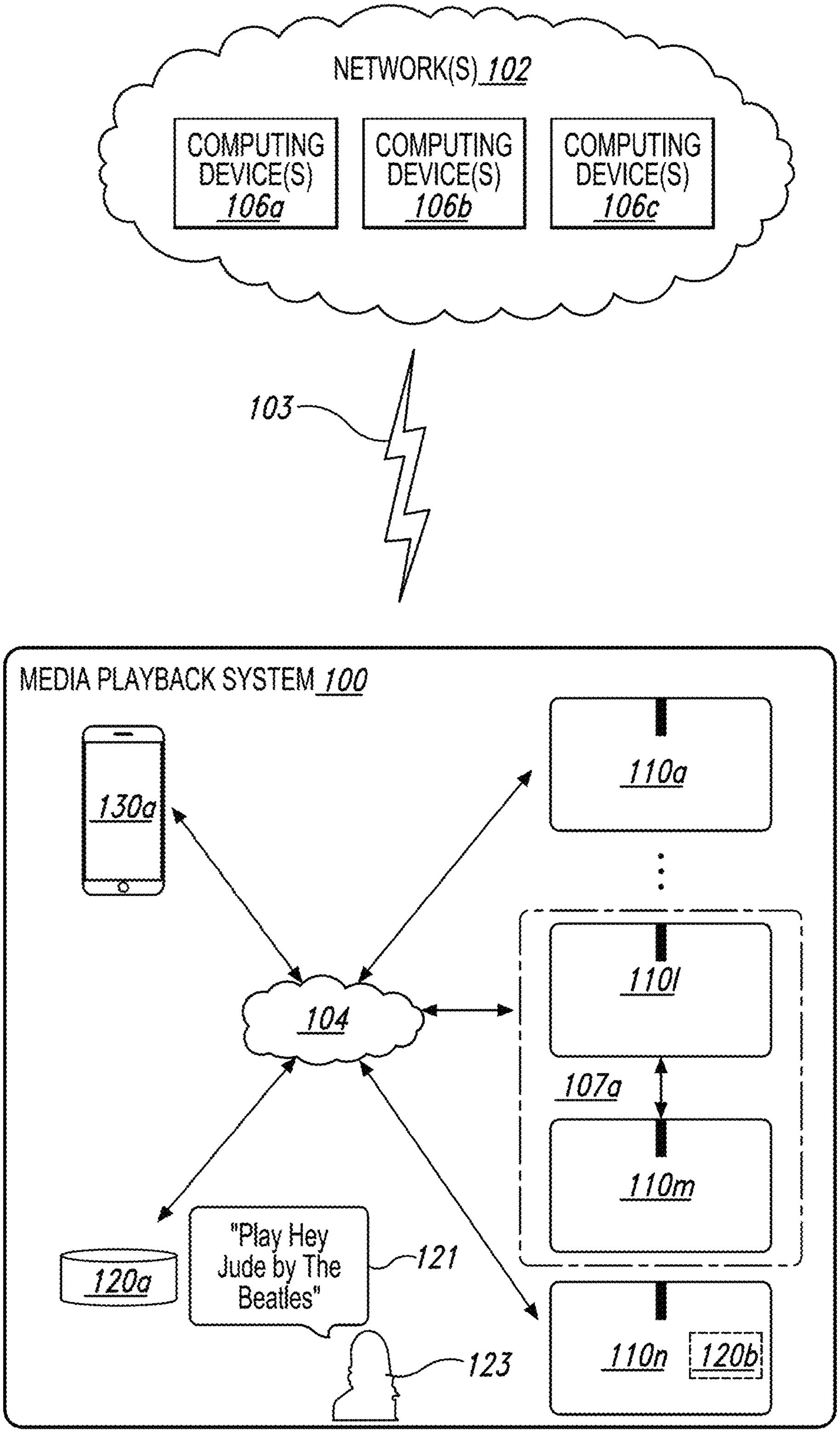
FIG. 1B is a schematic diagram of the media playback system of FIG. 1A and one or more networks, in accordance with an example.

FIG. 1B is a schematic diagram of the media playback system 100 and a cloud network 102. For ease of illustration, certain devices of the media playback system 100 and the cloud network 102 are omitted from FIG. 1B. One or more communication links 103 (referred to hereinafter as "the links 103") communicatively couple the media playback system 100 and the cloud network 102.

The links 103 can comprise, for example, one or more wired networks, one or more wireless networks, one or more wide area networks (WAN), one or more local area networks (LAN), one or more personal area networks (PAN), one or more telecommunication networks (e.g., one or more Global System for Mobiles (GSM) networks, Code Division Multiple Access (CDMA) networks, Long-Term Evolution (LTE) networks, 5G communication network networks, and/or other suitable data transmission protocol networks), etc. The cloud network 102 is configured to deliver media content (e.g., audio content, video content, photographs, social media content) to the media playback system 100 in response to a request transmitted from the media playback system 100 via the links 103. In some embodiments, the cloud network 102 is further configured to receive data (e.g., voice input data) from the media playback system 100 and correspondingly transmit commands and/or media content to the media playback system 100.

The cloud network 102 comprises computing devices 106 (identified separately as a first computing device 106*a*, a second computing device 106*b*, and a third computing device 106*c*). The computing devices 106 can comprise individual computers or servers, such as, for example, a media streaming service server storing audio and/or other media content, a voice service server, a social media server, a media playback system control server, etc. In some embodiments, one or more of the computing devices 106 comprise modules of a single computer or server. In certain embodiments, one or more of the computing devices 106 comprise one or more modules, computers, and/or servers. Moreover, while the cloud network 102 is described above in the context of a single cloud network, in some embodiments, the cloud network 102 comprises a plurality of cloud networks comprising communicatively coupled computing devices. Furthermore, while the cloud network 102 is shown in FIG. 1B as having three of the computing devices 106, in some embodiments, the cloud network 102 comprises fewer (or more than) three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a WIFI network, a BLUETOOTH, a Z-WAVE network, a ZIGBEE, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WIFI" can refer to several different communication protocols including, for example, Institute of Electrical and Electronics Engineers (IEEE) 802.11a, 802.11b, 802.11g, 802.11n, 802.11ac, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHz, and/or another suitable frequency.

In some embodiments, the network 104 comprises a dedicated communication network that the media playback system 100 uses to transmit messages between individual devices and/or to transmit media content to and from media content sources (e.g., one or more of the computing devices 106). In certain embodiments, the network 104 is configured to be accessible only to devices in the media playback system 100, thereby reducing interference and competition with other household devices. In other embodiments, however, the network 104 comprises an existing household communication network (e.g., a household WIFI network). In some embodiments, the links 103 and the network 104 comprise one or more of the same networks. In some aspects, for example, the links 103 and the network 104 comprise a telecommunication network (e.g., an LTE network, a 5G network). Moreover, in some embodiments, the media playback system 100 is implemented without the network 104, and devices comprising the media playback system 100 can communicate with each other, for example, via one or more direct connections, PANs, telecommunication networks, and/or other suitable communication links.

In some embodiments, audio content sources may be regularly added or removed from the media playback system 100. In some embodiments, for example, the media playback system 100 performs an indexing of media items when one or more media content sources are updated, added to, and/or removed from the media playback system 100. The media playback system 100 can scan identifiable media items in some or all folders and/or directories accessible to the playback devices 110 and generate or update a media content database comprising metadata (e.g., title, artist, album, track length) and other associated information (e.g., URIs, URLs) for each identifiable media item found. In some embodiments, for example, the media content database is stored on one or more of the playback devices 110, network microphone devices 120, and/or control devices 130.

In the illustrated embodiment of FIG. 1B, the playback devices 110*l* and 110*m* comprise a group 107*a*. The playback devices 110*l* and 110*m* can be positioned in different rooms in a household and be grouped together in the group 107*a* on a temporary or permanent basis based on user input received at the control device 130*a* and/or another control device 130 in the media playback system 100. When arranged in the group 107*a*, the playback devices 110*l* and 110*m* can be configured to play back the same or similar audio content in synchrony from one or more audio content sources. In certain embodiments, for example, the group 107*a* comprises a bonded zone in which the playback devices 110*l* and 110*m* comprise left audio and right audio channels, respectively, of multi-channel audio content, thereby producing or enhancing a stereo effect of the audio content. In some embodiments, the group 107*a* includes additional playback devices 110. In other embodiments, however, the media playback system 100 omits the group 107*a* and/or other grouped arrangements of the playback devices 110. Additional details regarding groups and other arrangements of playback devices are described in further detail below with respect to FIGS. 1-I through 1M.

The media playback system 100 includes the NMDs 120*a* and 120*d*, each comprising one or more microphones configured to receive voice utterances from a user. In the illustrated embodiment of FIG. 1B, the NMD 120*a* is a standalone device and the NMD 120*d* is integrated into the playback device 110*n*. The NMD 120*a*, for example, is configured to receive voice input 121 from a user 123. In some embodiments, the NMD 120*a* transmits data associated with the received voice input 121 to a voice assistant service (VAS) configured to (i) process the received voice input data and (ii) transmit a corresponding command to the media playback system 100. In some aspects, for example, the computing device 106*c* comprises one or more modules and/or servers of a VAS (e.g., a VAS operated by one or more of SONOS®, AMAZON®, GOOGLE® APPLE®, MICROSOFT®). The computing device 106*c* can receive the voice input data from the NMD 120*a* via the network 104 and the links 103. In response to receiving the voice input data, the computing device 106*c* processes the voice input data (i.e., "Play Hey Jude by The Beatles"), and determines that the processed voice input includes a command to play a song (e.g., "Hey Jude"). The computing device 106*c* accordingly transmits commands to the media playback system 100 to play back "Hey Jude" by the Beatles from a suitable media service (e.g., via one or more of the computing devices 106) on one or more of the playback devices 110.

b. Suitable Playback Devices

Figure 1C:
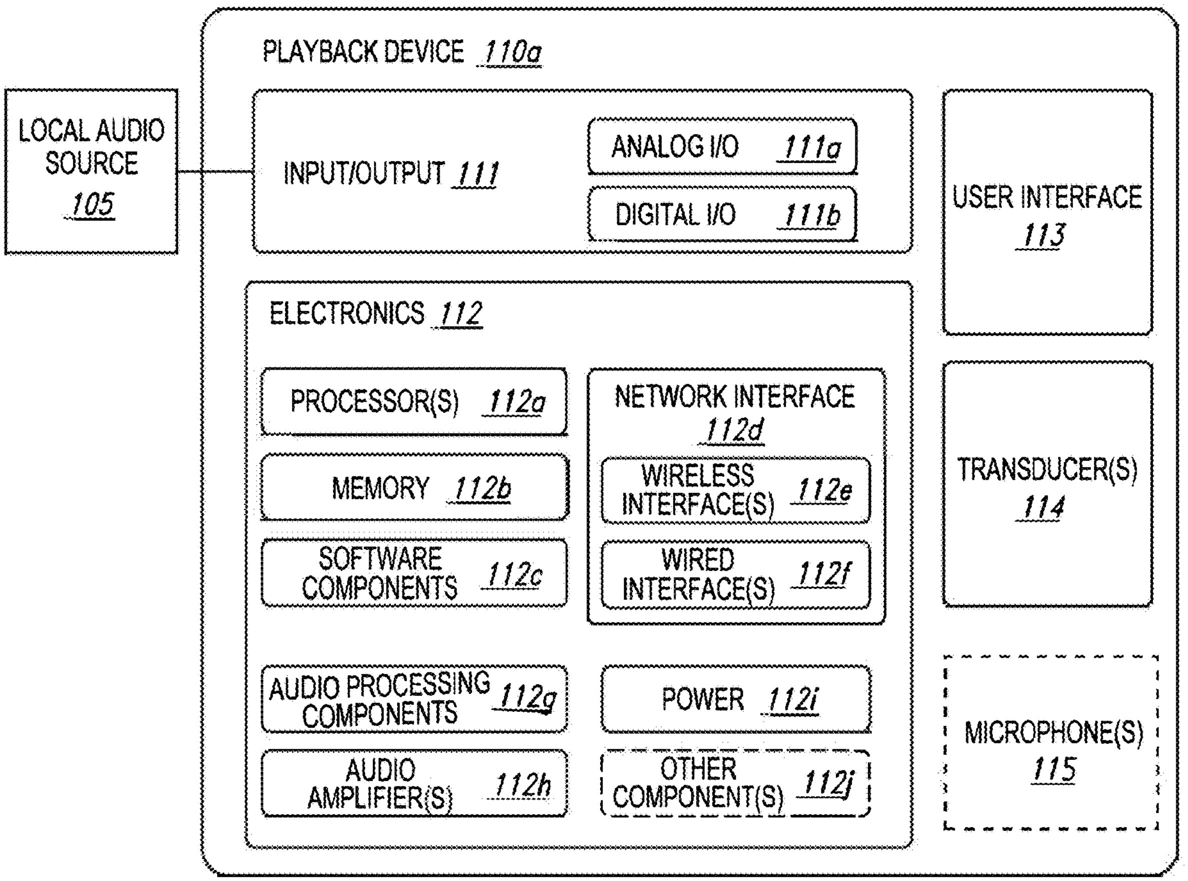
FIG. 1C is a block diagram of a playback device, in accordance with an example.

FIG. 1C is a block diagram of the playback device 110*a* comprising an input/output 111. The input/output 111 can include an analog I/O 111*a* (e.g., one or more wires, cables, and/or other suitable communication links configured to carry analog signals) and/or a digital I/O 111*b* (e.g., one or more wires, cables, or other suitable communication links configured to carry digital signals). In some embodiments, the analog I/O 111*a* is an audio line-in input connection comprising, for example, an auto-detecting 3.5 mm audio line-in connection. In some embodiments, the digital I/O 111*b* comprises a Sony/Philips Digital Interface Format (S/PDIF) communication interface and/or cable and/or a Toshiba Link (TOSLINK) cable. In some embodiments, the digital I/O 111*b* comprises a High-Definition Multimedia Interface (HDMI) interface and/or cable. In some embodiments, the digital I/O 111*b* includes one or more wireless communication links comprising, for example, a radio frequency (RF), infrared, WIFI, BLUETOOTH, or another suitable communication protocol. In certain embodiments, the analog I/O 111*a* and the digital 111*b* comprise interfaces (e.g., ports, plugs, jacks) configured to receive connectors of cables transmitting analog and digital signals, respectively, without necessarily including cables.

The playback device 110*a*, for example, can receive media content (e.g., audio content comprising music and/or other sounds) from a local audio source 105 via the input/output 111 (e.g., a cable, a wire, a PAN, a BLUETOOTH connection, an ad hoc wired or wireless communication network, and/or another suitable communication link). The local audio source 105 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some aspects, the local audio source 105 includes local music libraries on a smartphone, a computer, networked-attached storage (NAS), and/or another suitable device configured to store media files. In certain embodiments, one or more of the playback devices 110, NMDs 120, and/or control devices 130 comprise the local audio source 105. In other embodiments, however, the media playback system omits the local audio source 105 altogether. In some embodiments, the playback device 110*a* does not include an input/output 111 and receives all audio content via the network 104.

The playback device 110*a* further comprises electronics 112, a user interface 113 (e.g., one or more buttons, knobs, dials, touch-sensitive surfaces, displays, touchscreens), and one or more transducers 114 (referred to hereinafter as "the transducers 114"). The electronics 112 is configured to receive audio from an audio source (e.g., the local audio source 105) via the input/output 111, one or more of the computing devices 106*a-c* via the network 104 (FIG. 1B)), amplify the received audio, and output the amplified audio for playback via one or more of the transducers 114. In some embodiments, the playback device 110*a* optionally includes one or more microphones 115 (e.g., a single microphone, a plurality of microphones, a microphone array) (hereinafter referred to as "the microphones 115"). In certain embodiments, for example, the playback device 110*a* having one or more of the optional microphones 115 can operate as an NMD configured to receive voice input from a user and correspondingly perform one or more operations based on the received voice input.

In the illustrated embodiment of FIG. 1C, the electronics 112 comprise one or more processors 112*a* (referred to hereinafter as "the processors 112*a*"), memory 112*b*, software components 112*c*, a network interface 112*d*, one or more audio processing components 112*g* (referred to hereinafter as "the audio components 112*g*"), one or more audio amplifiers 112*h* (referred to hereinafter as "the amplifiers 112*h*"), and power 112*i* (e.g., one or more power supplies, power cables, power receptacles, batteries, induction coils, Power-over Ethernet (POE) interfaces, and/or other suitable sources of electric power). In some embodiments, the electronics 112 optionally include one or more other components 112*j* (e.g., one or more sensors, video displays, touchscreens, battery charging bases).

The processors 112*a* can comprise clock-driven computing component(s) configured to process data, and the memory 112*b* can comprise a computer-readable medium (e.g., a tangible, non-transitory computer-readable medium, data storage loaded with one or more of the software components 112*c*) configured to store instructions for performing various operations and/or functions. The processors 112*a* are configured to execute the instructions stored on the memory 112*b* to perform one or more of the operations. The operations can include, for example, causing the playback device 110*a* to retrieve audio data from an audio source (e.g., one or more of the computing devices 106*a-c* (FIG. 1B)), and/or another one of the playback devices 110. In some embodiments, the operations further include causing the playback device 110*a* to send audio data to another one of the playback devices 110*a* and/or another device (e.g., one of the NMDs 120). Certain embodiments include operations causing the playback device 110*a* to pair with another of the one or more playback devices 110 to enable a multi-channel audio environment (e.g., a stereo pair, a bonded zone).

The processors 112*a* can be further configured to perform operations causing the playback device 110*a* to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110*a* and the other one or more other playback devices 110. Additional details regarding audio playback synchronization among playback devices can be found, for example, in U.S. Pat. No. 8,234,395, which was incorporated by reference above.

In some embodiments, the memory 112*b* is further configured to store data associated with the playback device 110*a*, such as one or more zones and/or zone groups of which the playback device 110*a* is a member, audio sources accessible to the playback device 110*a*, and/or a playback queue that the playback device 110*a* (and/or another of the one or more playback devices) can be associated with. The stored data can comprise one or more state variables that are periodically updated and used to describe a state of the playback device 110*a*. The memory 112*b* can also include data associated with a state of one or more of the other devices (e.g., the playback devices 110, NMDs 120, control devices 130) of the media playback system 100. In some aspects, for example, the state data is shared during predetermined intervals of time (e.g., every 5 seconds, every 10 seconds, every 60 seconds) among at least a portion of the devices of the media playback system 100, so that one or more of the devices have the most recent data associated with the media playback system 100.

The network interface 112*d* is configured to facilitate transmission of data between the playback device 110*a* and one or more other devices on a data network such as, for example, the links 103 and/or the network 104 (FIG. 1B). The network interface 112*d* is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112*d* can parse the digital packet data such that the electronics 112 properly receives and processes the data destined for the playback device 110*a*.

In the illustrated embodiment of FIG. 1C, the network interface 112*d* comprises one or more wireless interfaces 112*e* (referred to hereinafter as "the wireless interface 112*e*"). The wireless interface 112*e* (e.g., a suitable interface comprising one or more antennae) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., WIFI, BLUETOOTH, LTE). In some embodiments, the network interface 112*d* optionally includes a wired interface 112*f* (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112*d* includes the wired interface 112*f* and excludes the wireless interface 112*e*. In some embodiments, the electronics 112 excludes the network interface 112*d* altogether and transmits and receives media content and/or other data via another communication path (e.g., the input/output 111).

The audio components 112*g* are configured to process and/or filter data comprising media content received by the electronics 112 (e.g., via the input/output 111 and/or the network interface 112*d*) to produce output audio signals. In some embodiments, the audio processing components 112*g* comprise, for example, one or more digital-to-analog converters (DAC), audio preprocessing components, audio enhancement components, digital signal processors (DSPs), and/or other suitable audio processing components, modules, circuits, etc. In certain embodiments, one or more of the audio processing components 112_g_ can comprise one or more subcomponents of the processors 112_a_. In some embodiments, the electronics 112 omits the audio processing components 112_g_. In some aspects, for example, the processors 112_a_ execute instructions stored on the memory 112_b_ to perform audio processing operations to produce the output audio signals.

The amplifiers 112_h_ are configured to receive and amplify the audio output signals produced by the audio processing components 112_g_ and/or the processors 112_a_. The amplifiers 112_h_ can comprise electronic devices and/or components configured to amplify audio signals to levels sufficient for driving one or more of the transducers 114. In some embodiments, for example, the amplifiers 112_h_ include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 112_h_ comprise a suitable combination of two or more of the foregoing types of power amplifiers.

Moreover, in some embodiments, individual ones of the amplifiers 112_h_ correspond to individual ones of the transducers 114. In other embodiments, however, the electronics 112 includes a single one of the amplifiers 112_h_ configured to output amplified audio signals to a plurality of the transducers 114. In some other embodiments, the electronics 112 omits the amplifiers 112_h_.

The transducers 114 (e.g., one or more speakers and/or speaker drivers) receive the amplified audio signals from the amplifier 112_h_ and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low-frequency transducers (e.g., subwoofers, woofers), mid-range frequency transducers (e.g., mid-range transducers, mid-woofers), and one or more high-frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

Figure 1D:
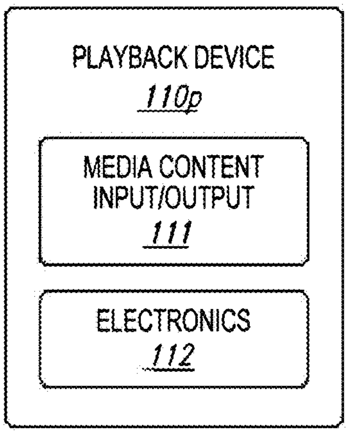
FIG. 1D is a block diagram of a playback device, in accordance with an example.

By way of illustration, SONOS, Inc. presently offers (or has offered) for sale certain playback devices including, for example, a "SONOS ONE," "PLAY: 1," "PLAY: 3," "PLAY: 5," "PLAYBAR," "PLAYBASE," "CONNECT: AMP," "CONNECT," and "SUB." Other suitable playback devices may additionally or alternatively be used to implement the playback devices of example embodiments disclosed herein. Additionally, one of ordinary skilled in the art will appreciate that a playback device is not limited to the examples described herein or to SONOS product offerings. In some embodiments, for example, one or more playback devices 110 comprises wired or wireless headphones (e.g., over-the-ear headphones, on-ear headphones, in-ear earphones). In other embodiments, one or more of the playback devices 110 comprise a docking station and/or an interface configured to interact with a docking station for personal mobile media playback devices. In certain embodiments, a playback device may be integral to another device or component such as a television, a lighting fixture, or some other device for indoor or outdoor use. In some embodiments, a playback device omits a user interface and/or one or more transducers. For example, FIG. 1D is a block diagram of a playback device 110_p_ comprising the input/output 111 and electronics 112 without the user interface 113 or transducers 114.

Figure 1E:
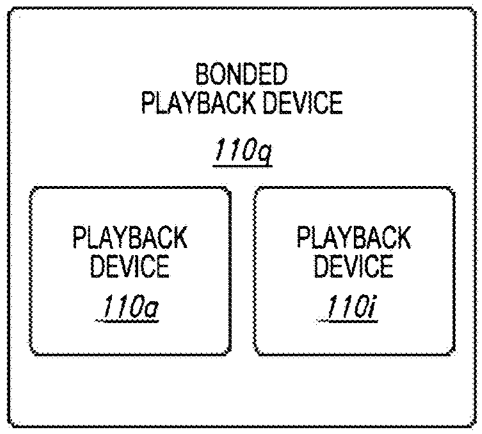
FIG. 1E is a block diagram of a network microphone device, in accordance with an example.

FIG. 1E is a block diagram of a bonded playback device 110_q_ comprising the playback device 110_a_ (FIG. 1C) sonically bonded with the playback device 110_i_ (e.g., a subwoofer) (FIG. 1A). In the illustrated embodiment, the playback devices 110_a_ and 110_i_ are separate ones of the playback devices 110 housed in separate enclosures. In some embodiments, however, the bonded playback device 110_q_ comprises a single enclosure housing both the playback devices 110_a_ and 110_i_. The bonded playback device 110_q_ can be configured to process and reproduce sound differently than an unbonded playback device (e.g., the playback device 110_a_ of FIG. 1C) and/or paired or bonded playback devices (e.g., the playback devices 110_l_ and 110_m_ of FIG. 1B). In some embodiments, for example, the playback device 110_a_ is a full-range playback device configured to render low frequency, mid-range frequency, and high-frequency audio content, and the playback device 110_i_ is a subwoofer configured to render low-frequency audio content. In some aspects, the playback device 110_a_, when bonded with the first playback device, is configured to render only the mid-range and high-frequency components of particular audio content, while the playback device 110_i_ renders the low-frequency component of the particular audio content. In some embodiments, the bonded playback device 110_q_ includes additional playback devices and/or another bonded playback device.

c. Suitable Network Microphone Devices (NMDs)

Figure 1F:
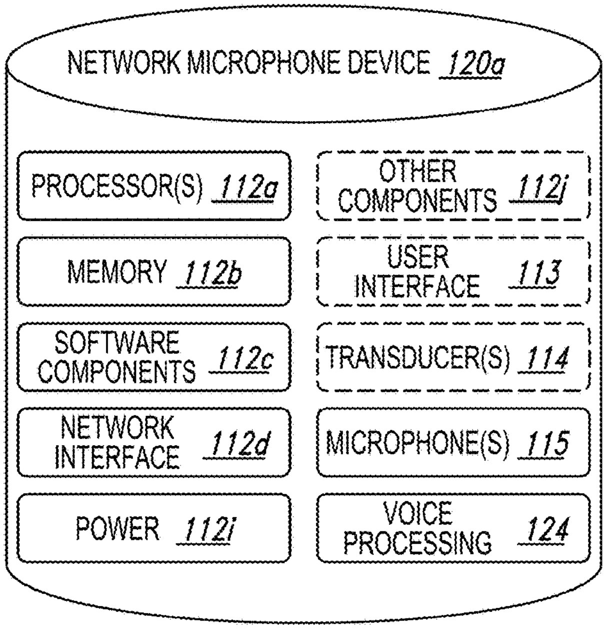
FIG. 1F is a block diagram of a network microphone device, in accordance with an example.

FIG. 1F is a block diagram of the NMD 120_a_ (FIGS. 1A and 1B). The NMD 120_a_ includes one or more voice processing components 124 (hereinafter "the voice components 124") and several components described with respect to the playback device 110_a_ (FIG. 1C) including the processors 112_a_, the memory 112_b_, and the microphones 115. The NMD 120_a_ optionally comprises other components also included in the playback device 110_a_ (FIG. 1C), such as the user interface 113 and/or the transducers 114. In some embodiments, the NMD 120_a_ is configured as a media playback device (e.g., one or more of the playback devices 110), and further includes, for example, one or more of the audio components 112_g_ (FIG. 1C), the amplifiers 114, and/or other playback device components. In certain embodiments, the NMD 120_a_ comprises an Internet of Things (IoT) device such as, for example, a thermostat, alarm panel, fire and/or smoke detector, etc. In some embodiments, the NMD 120_a_ comprises the microphones 115, the voice processing 124, and only a portion of the components of the electronics 112 described above with respect to FIG. 1B. In some aspects, for example, the NMD 120_a_ includes the processor 112_a_ and the memory 112_b_ (FIG. 1B), while omitting one or more other components of the electronics 112. In some embodiments, the NMD 120_a_ includes additional components (e.g., one or more sensors, cameras, thermometers, barometers, hygrometers).

Figure 1G:
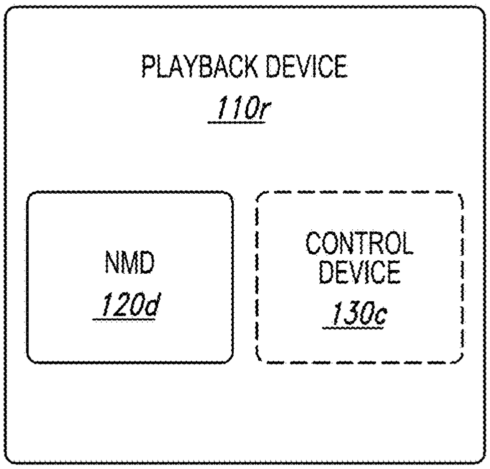
FIG. 1G is a block diagram of a playback device, in accordance with an example.

In some embodiments, an NMD can be integrated into a playback device. FIG. 1G is a block diagram of a playback device 110*r* comprising an NMD 120*d*. The playback device 110*r* can comprise many or all of the components of the playback device 110*a* and further include the microphones 115 and voice processing 124 (FIG. 1F). The playback device 110*r* optionally includes an integrated control device 130*c*. The control device 130*c* can comprise, for example, a user interface (e.g., the user interface 113 of FIG. 1B) configured to receive user input (e.g., touch input, voice input) without a separate control device. In other embodiments, however, the playback device 110*r* receives commands from another control device (e.g., the control device 130*a* of FIG. 1B).

Referring again to FIG. 1F, the microphones 115 are configured to acquire, capture, and/or receive sound from an environment (e.g., the environment 101 of FIG. 1A) and/or a room in which the NMD 120*a* is positioned. The received sound can include, for example, vocal utterances, audio played back by the NMD 120*a* and/or another playback device, background voices, ambient sounds, etc. The microphones 115 convert the received sound into electrical signals to produce microphone data. The voice processing 124 receives and analyzes the microphone data to determine whether a voice input is present in the microphone data. The voice input can comprise, for example, an activation word followed by an utterance including a user request. As those of ordinary skill in the art will appreciate, an activation word is a word or other audio cue that signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing 124 monitors the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home.

d. Suitable Control Devices

Figure 1H:
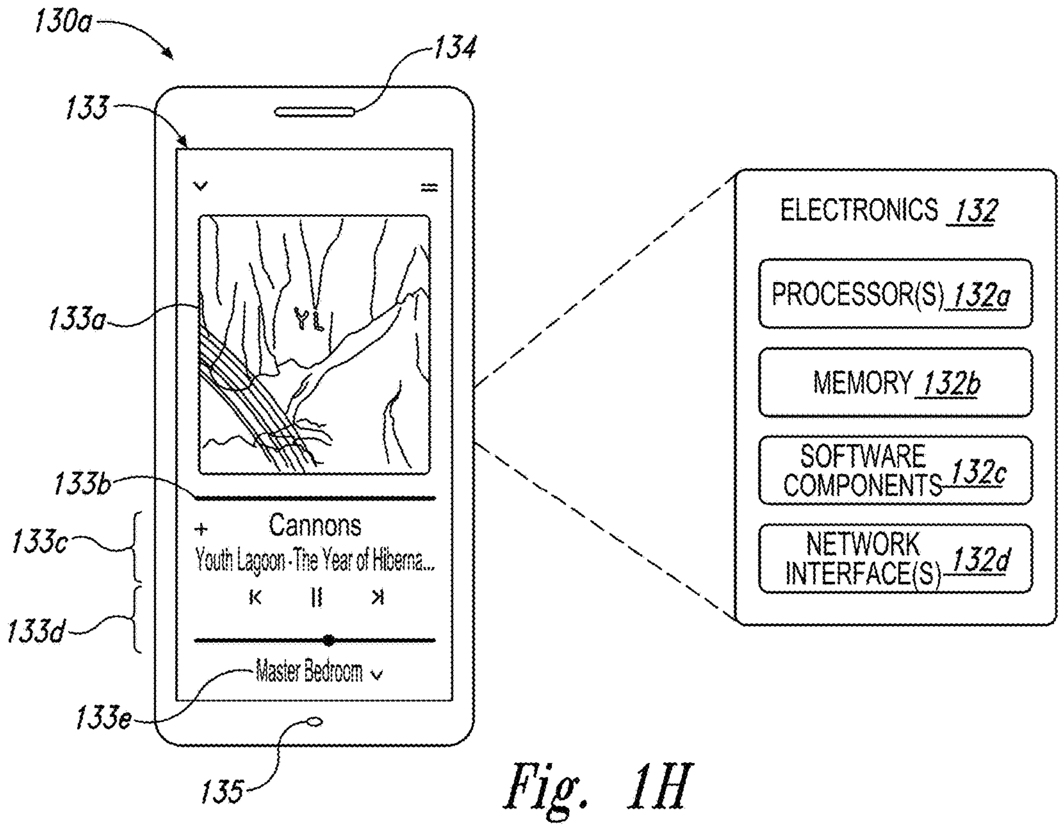
FIG. 1H is a partially schematic diagram of a control device, in accordance with an example.
Figure 1I:
FIGS. 1I through 1L are schematic diagrams of corresponding media playback system zones, in accordance with an example.

FIG. 1H is a partially schematic diagram of the control device 130*a* (FIGS. 1A and 1B). As used herein, the term "control device" can be used interchangeably with "controller" or "control system." Among other features, the control device 130*a* is configured to receive user input related to the media playback system 100 and, in response, cause one or more devices in the media playback system 100 to perform an action(s) or operation(s) corresponding to the user input. In the illustrated embodiment, the control device 130*a* comprises a smartphone (e.g., an iPhone™, an Android phone) on which media playback system controller application software is installed. In some embodiments, the control device 130*a* comprises, for example, a tablet (e.g., an iPad™), a computer (e.g., a laptop computer, a desktop computer), and/or another suitable device (e.g., a television, an automobile audio head unit, an IoT device). In certain embodiments, the control device 130*a* comprises a dedicated controller for the media playback system 100. In other embodiments, as described above with respect to FIG. 1G, the control device 130*a* is integrated into another device in the media playback system 100 (e.g., one more of the playback devices 110, NMDs 120, and/or other suitable devices configured to communicate over a network).

The control device 130*a* includes electronics 132, a user interface 133, one or more speakers 134, and one or more microphones 135. The electronics 132 comprise one or more processors 132*a* (referred to hereinafter as "the processors 132*a*"), a memory 132*b*, software components 132*c*, and a network interface 132*d*. The processor 132*a* can be configured to perform functions relevant to facilitating user access, control, and configuration of the media playback system 100. The memory 132*b* can comprise data storage that can be loaded with one or more of the software components executable by the processor 302 to perform those functions. The software components 132*c* can comprise applications and/or other executable software configured to facilitate control of the media playback system 100. The memory 112*b* can be configured to store, for example, the software components 132*c*, media playback system controller application software, and/or other data associated with the media playback system 100 and the user.

The network interface 132*d* is configured to facilitate network communications between the control device 130*a* and one or more other devices in the media playback system 100, and/or one or more remote devices. In some embodiments, the network interface 132 is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE). The network interface 132*d* can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone, and/or zone group configurations. For instance, based on user input received at the user interface 133, the network interface 132*d* can transmit a playback device control command (e.g., volume control, audio playback control, audio content selection) from the control device 130 to one or more of the playback devices 100. The network interface 132*d* can also transmit and/or receive configuration changes such as, for example, adding/removing one or more playback devices 100 to/from a zone, adding/removing one or more zones to/from a zone group, forming a bonded or consolidated player, separating one or more playback devices from a bonded or consolidated player, among others. Additional description of zones and groups can be found below with respect to FIGS. 1I through 1M.

The user interface 133 is configured to receive user input and can facilitate 'control of the media playback system 100. The user interface 133 includes media content art 133*a* (e.g., album art, lyrics, videos), a playback status indicator 133*b* (e.g., an elapsed and/or remaining time indicator), media content information region 133*c*, a playback control region 133*d*, and a zone indicator 133*e*. The media content information region 133*c* can include a display of relevant information (e.g., title, artist, album, genre, release year) about media content currently playing and/or media content in a queue or playlist. The playback control region 133*d* can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit crossfade mode, etc. The playback control region 133*d* may also include selectable icons to modify equalization settings, playback volume, and/or other suitable playback actions. In the illustrated embodiment, the user interface 133 comprises a display presented on a touch screen interface of a smartphone (e.g., an iPhone™, an Android phone). In some embodiments, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device 130*a*. In some embodiments, the one or more speakers comprise individual transducers configured to correspondingly output low frequencies, mid-range frequencies, and/or high frequencies. In some aspects, for example, the control device 130*a* is configured as a playback device (e.g., one of the playback devices 110). Similarly, in some embodiments, the control device 130*a* is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound) and/or configured to facilitate filtering of background noise. Moreover, in certain embodiments, the control device 130*a* is configured to operate as a playback device and an NMD. In other embodiments, however, the control device 130*a* omits the one or more speakers 134 and/or the one or more microphones 135. For instance, the control device 130*a* may comprise a device (e.g., a thermostat, an IoT device, a network device) comprising a portion of the electronics 132 and the user interface 133 (e.g., a touch screen) without any speakers or microphones.

e. Suitable Playback Device Configurations

FIGS. 1-I through 1M show example configurations of playback devices in zones and zone groups. Referring first to FIG. 1M, in one example, a single playback device may belong to a zone. For example, the playback device 110*g* in the second bedroom 101*c* (FIG. 1A) may belong to Zone C. In some implementations described below, multiple playback devices may be "bonded" to form a "bonded pair" which together form a single zone. For example, the playback device 110*l* (e.g., a left playback device) can be bonded to the playback device 110*l* (e.g., a left playback device) to form Zone A. Bonded playback devices may have different playback responsibilities (e.g., channel responsibilities). In another implementation described below, multiple playback devices may be merged to form a single zone. For example, the playback device 110*h* (e.g., a front playback device) may be merged with the playback device 110*i* (e.g., a subwoofer), and the playback devices 110*j* and 110*k* (e.g., left and right surround speakers, respectively) to form a single Zone D. In another example, the playback devices 110*g* and 110*h* can be merged to form a merged group or a zone group 108*b*. The merged playback devices 110*g* and 110*h* may not be specifically assigned different playback responsibilities. That is, the merged playback devices 110*h* and 110*i* may, aside from playing audio content in synchrony, each play audio content as they would if they were not merged.

Each zone in the media playback system 100 may be provided for control as a single user interface (UI) entity. For example, Zone A may be provided as a single entity named Master Bathroom. Zone B may be provided as a single entity named Master Bedroom. Zone C may be provided as a single entity named Second Bedroom.

Playback devices that are bonded may have different playback responsibilities, such as responsibilities for certain audio channels. For example, as shown in FIG. 1-I, the playback devices 110*l* and 110*m* may be bonded to produce or enhance a stereo effect of audio content. In this example, the playback device 110*l* may be configured to play a left channel audio component, while the playback device 110*k* may be configured to play a right channel audio component. In some implementations, such stereo bonding may be referred to as "pairing."

Figure 1J:
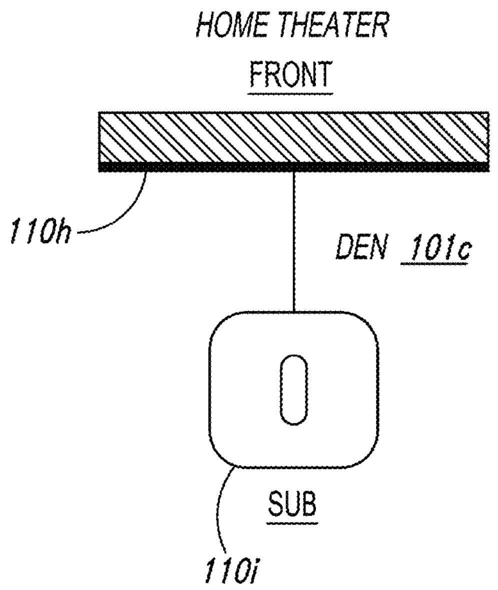
Figure 1K:
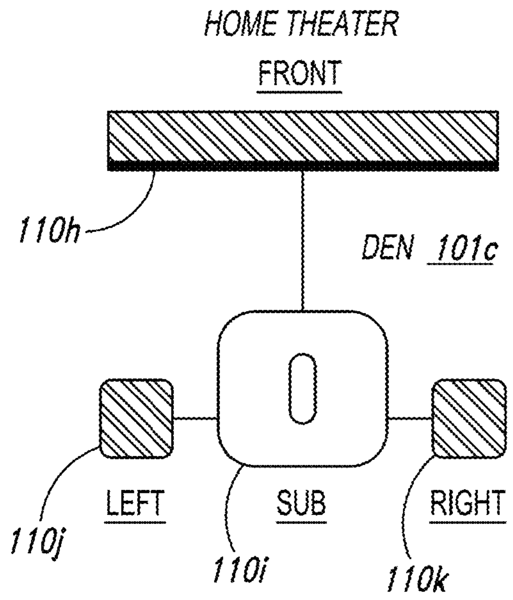
Figure 1L:
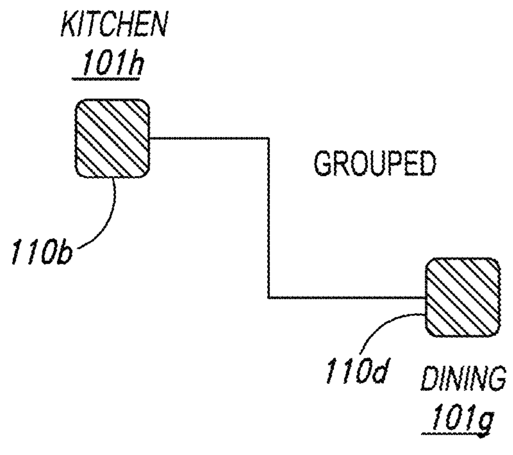
Figure 1M:
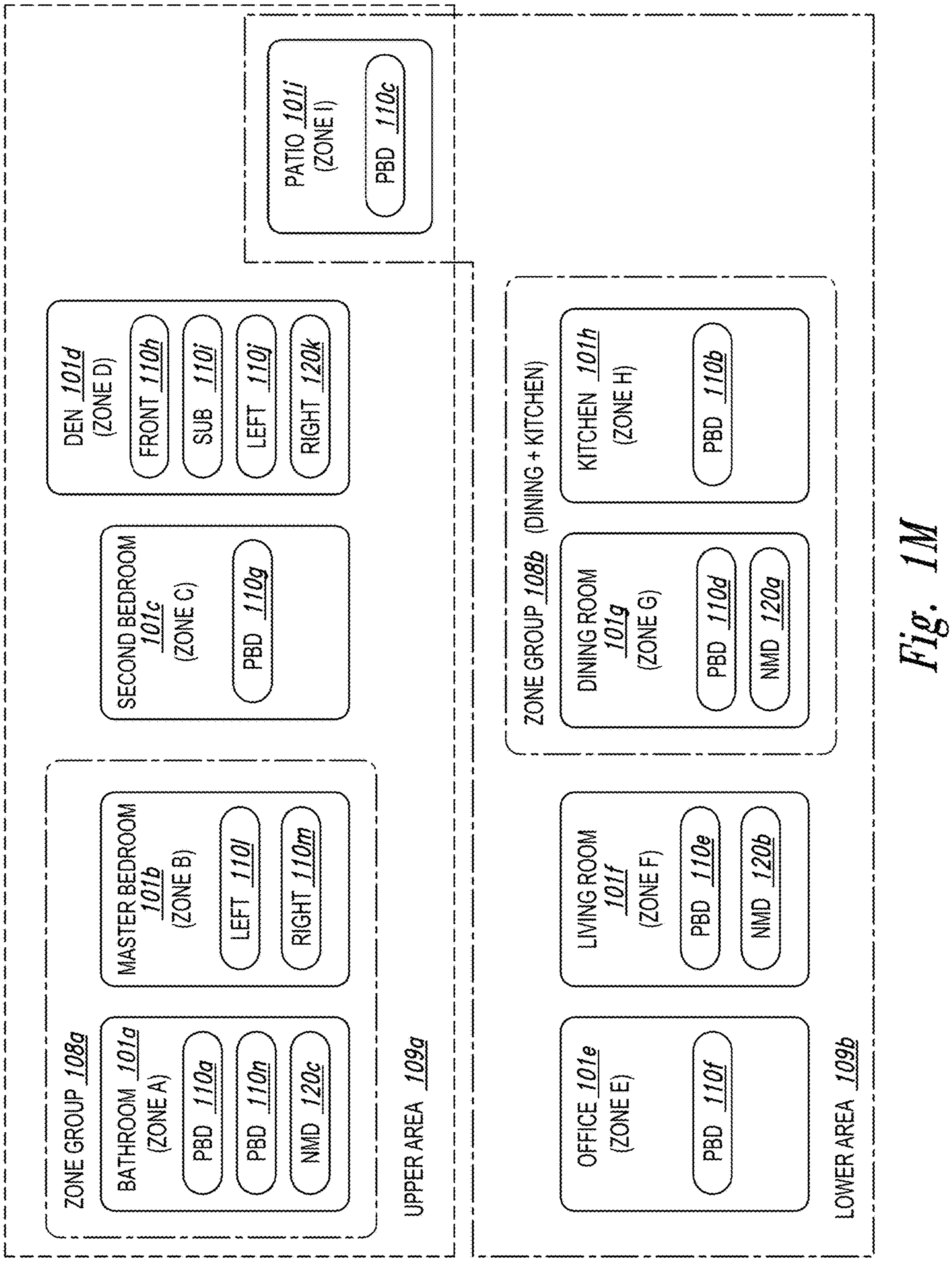
FIG. 1M is a schematic diagram of media playback system areas, in accordance with an example.

Additionally, bonded playback devices may have additional and/or different respective speaker drivers. As shown in FIG. 1J, the playback device 110*h* named Front may be bonded with the playback device 110*i* named SUB. The Front device 110*h* can be configured to render a range of mid to high frequencies, and the SUB device 110*i* can be configured to render low frequencies. When unbonded, however, the Front device 110*h* can be configured to render a full range of frequencies. As another example, FIG. 1K shows the Front and SUB devices 110*h* and 110*i* further bonded with Left and Right playback devices 110*j* and 110*k*, respectively. In some implementations, the Right and Left devices 110*j* and 102*k* can be configured to form surround or "satellite" channels of a home theater system. The bonded playback devices 110*h*, 110*i*, 110*j*, and 110*k* may form a single Zone D (FIG. 1M).

Playback devices that are merged may not have assigned playback responsibilities and may each render the full range of audio content the respective playback device is capable of. Nevertheless, merged devices may be represented as a single UI entity (i.e., a zone, as discussed above). For instance, the playback devices 110*a* and 110*n* in the master bathroom have the single UI entity of Zone A. In one embodiment, the playback devices 110*a* and 110*n* may each output the full range of audio content each respective playback devices 110*a* and 110*n* are capable of, in synchrony.

In some embodiments, an NMD is bonded or merged with another device so as to form a zone. For example, the NMD 120*b* may be bonded with the playback device 110*e*, which together form Zone F, named Living Room. In other embodiments, a stand-alone network microphone device may be in a zone by itself. In other embodiments, however, a stand-alone network microphone device may not be associated with a zone. Additional details regarding associating network microphone devices and playback devices as designated or default devices may be found, for example, in previously referenced U.S. patent application Ser. No. 15/438,749.

Zones of individual, bonded, and/or merged devices may be grouped to form a zone group. For example, referring to FIG. 1M, Zone A may be grouped with Zone B to form a zone group 108*a* that includes the two zones. Similarly, Zone G may be grouped with Zone H to form the zone group 108*b*. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234,395. Playback devices may be dynamically grouped and ungrouped to form new or different groups that synchronously play back audio content.

In various implementations, the zones in an environment may be the default name of a zone within the group or a combination of the names of the zones within a zone group. For example, Zone Group 108*b* can be assigned a name such as "Dining+Kitchen", as shown in FIG. 1M. In some embodiments, a zone group may be given a unique name selected by a user.

Certain data may be stored in a memory of a playback device (e.g., the memory 112*c* of FIG. 1C) as one or more state variables that are periodically updated and used to describe the state of a playback zone, the playback device(s), and/or a zone group associated therewith. The memory may also include the data associated with the state of the other devices of the media system and shared from time to time among the devices so that one or more of the devices have the most recent data associated with the system.

In some embodiments, the memory may store instances of various variable types associated with the states. Variables instances may be stored with identifiers (e.g., tags) corresponding to a type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, identifiers associated with the second bedroom 101*c* may indicate that the playback device is the only playback device of the Zone C and not in a zone group. Identifiers associated with the Den may indicate that the Den is not grouped with other zones but includes bonded playback devices 110*h*-110*k*. Identifiers associated with the Dining Room may indicate that the Dining Room is part of the Dining+Kitchen zone group 108*b* and that devices 110*b* and 110*d* are grouped (FIG. 1L). Identifiers associated with the Kitchen may indicate the same or similar information by virtue of the Kitchen being part of the Dining+Kitchen zone group 108*b*. Other example zone variables and identifiers are described below.

In yet another example, the media playback system 100 may store variables or identifiers representing other associations of zones and zone groups, such as identifiers associated with Areas, as shown in FIG. 1M. An area may involve a cluster of zone groups and/or zones not within a zone group. For instance, FIG. 1M shows an Upper Area 109*a* including Zones A-D, and a Lower Area 109*b* including Zones E-I. In one aspect, an Area may be used to invoke a cluster of zone groups and/or zones that share one or more zones and/or zone groups of another cluster. In another aspect, this differs from a zone group, which does not share a zone with another zone group.

Further examples of techniques for implementing Areas may be found, for example, in U.S. application Ser. No. 15/682,506 filed Aug. 21, 2017, and titled "Room Association Based on Name," and U.S. Pat. No. 8,483,853 filed Sep. 11, 2007, and titled "Controlling and manipulating groupings in a multi-zone media system." Each of these applications is incorporated herein by reference in its entirety. In some embodiments, the media playback system 100 may not implement Areas, in which case the system may not store variables associated with Areas.

III. Example Flexible Backhaul Techniques for a Wireless Home Theater Environment As noted above, playback devices that are bonded may have different playback responsibilities, such as responsibilities for certain audio channels. For example, as illustrated in FIG. 1K, in a home theater environment, the Front and SUB devices 110*h* and 110*i* can be bonded with Left and Right playback devices 110*j* and 110*k*, respectively. Further, in some implementations, the Right and Left devices 110*j* and 102*k* can be configured to form surround or "satellite" channels of a home theater system. The bonded playback devices 110*h*, 110*i*, 110*j*, and 110*k* may form a single Zone D (FIG. 1M).

Figure 2A:
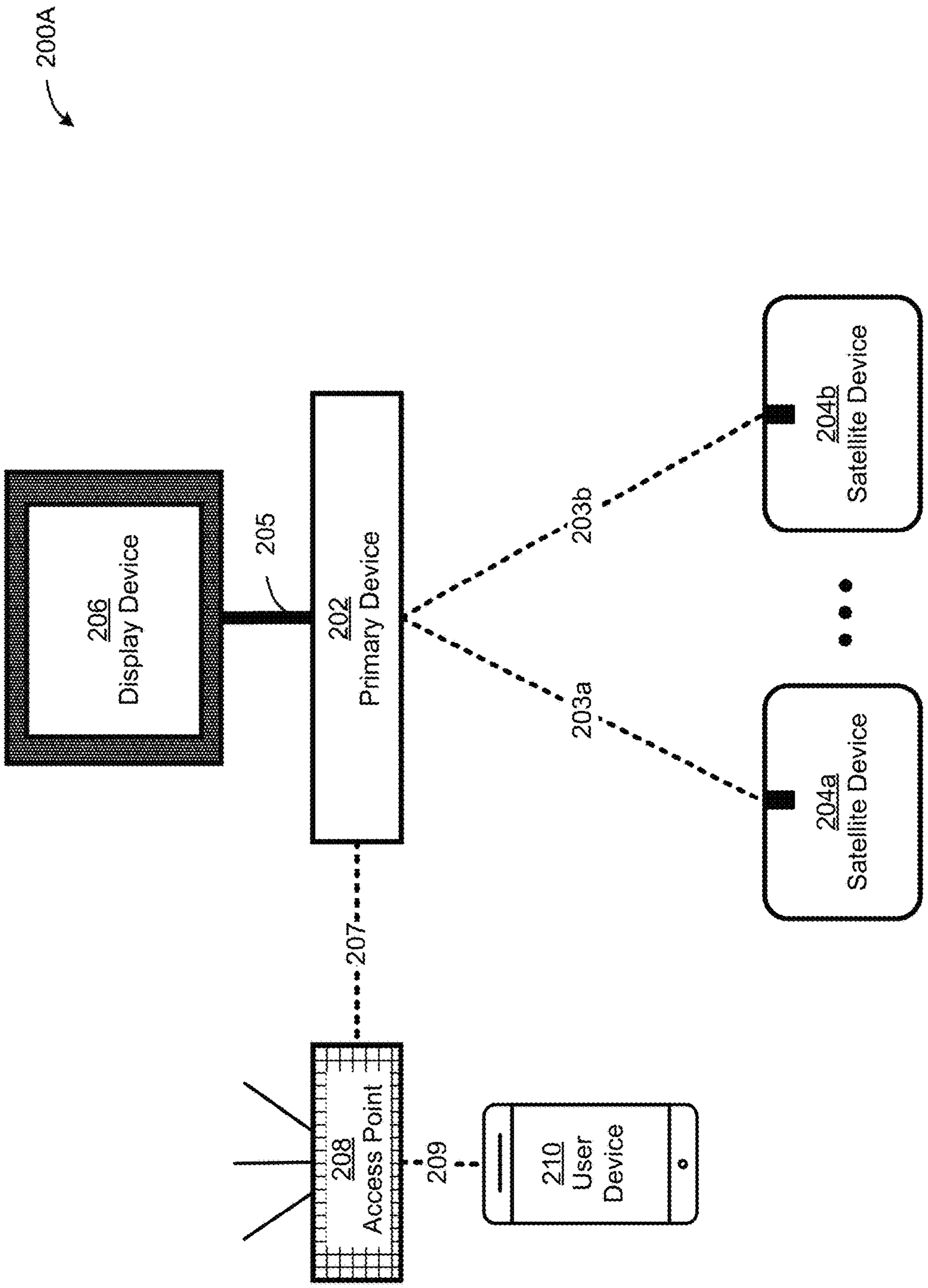
FIG. 2A illustrates a home theater environment, in accordance with an example.

FIG. 2A illustrates an example of a home theater environment 200A. As shown, the home theater environment 200A comprises a display device 206, such as a television or monitor, that displays visual content and outputs audio content (associated with the displayed visual content) via communication link 205 to a primary device 202 (e.g., a soundbar, a smart TV box, a smart TV stick, etc.). The primary device 202 communicates with one or more satellite devices 204 (shown as satellite devices 204*a* and 204*b*) via one or more communication links 203 (shown as communication links 203*a* and 203*b*). Additionally, the primary device 202 communicates with an access point (AP) 208 via a communication link 207 (e.g., a backhaul connection). The AP 208, in turn, communicates with other devices such as a user device 210 (e.g., a smartphone, tablet, laptop, desktop computer, etc.) via communication link 209. In some examples, the primary device 202 may be integrated with the display device 206, for example a TV may include a smart soundbar.

In some instances, the home theater environment 200A may playback audio from a music streaming service. In such instances, the primary device 202 may communicate with one or more cloud servers associated with a music service provider (e.g., via the communication link 207 to the AP 208) to obtain the audio content for playback. After receipt of the audio content for playback, the primary device 202 may communicate the audio content (or any portion thereof) to the satellite devices 204 for synchronous playback via the communication links 203. In examples where the primary device 202 is implemented as a soundbar (or otherwise comprises transducers for rendering audio content), the primary device 202 may render the audio content in synchrony with the satellite devices 204. In examples where the primary device 202 is implemented as a smart TV box or smart TV stick (or otherwise does not comprise transducers for rendering audio content), the satellite devices 204 may render the audio content in synchrony with each other while the primary device 202 may not render the audio content.

In some instances, the primary device 202 and the satellite devices 204 may render audio content in lip-synchrony with associated visual content displayed by the display device 206. In such examples, the primary device 202 may receive audio content from the display device 206. For example, the primary device 202 and the display device 206 can include analog and/or digital interfaces that facilitate communicating the audio content (e.g., multi-channel audio content) such as a SPDIF RCA interface, an HDMI interface (e.g., audio return channel (ARC) HDMI interface), an optical interface (e.g., TOSLINK interface), etc. In such examples, the communication link 205 may comprise a wired connection (e.g., an SPDIF cable, an HDMI cable, a TOSLINK cable, etc.). In other examples, the primary device 202 and the display device 206 may include wireless circuitry that facilitates wirelessly communicating the audio content from the display device 206 to the primary device 202. In such examples, the communication link 205 may be a wireless communication link such as a WIFI link, BLUETOOTH link, ZIGBEE link, Z-WAVE link, and/or wireless HDMI link.

After receipt of the audio content associated with visual content to be rendered by the display device 206, the primary device 202 may communicate the received audio content (or any portion thereof) to the satellite devices 204 (e.g., via communication links 203). Any of a variety of methodologies may be employed to communicate the audio content to the satellite devices as described in more detail below with respect to FIGS. 3A and 3B. Once the audio content has been communicated to the satellite devices, the satellite devices 204 (and/or primary device 202) may render the audio content in synchrony with each other and in lip-synchrony with visual content displayed on the display device 206. For instance, in examples where the primary device 202 is implemented as a soundbar (or otherwise comprises transducers for rendering audio content), the primary device 202 may render the audio content in synchrony with the satellite devices 204 and in lip-synchrony with the visual content displayed on the display device 206. In examples where the primary device 202 is implemented as a smart TV box or smart TV stick (or otherwise does not comprise transducers for rendering audio content), the satellite devices 204 may render the audio content in synchrony with each other and in lip-synchrony with the display of visual content on the display device 206 while the primary device 202 may not render the audio content.

In some embodiments, the primary device 202 may also be configured to operate as an AP and/or as a router (e.g., a mesh router) that client devices (e.g., separate and apart from devices in the home theater environment) may be able to connect to for network access (e.g., access to a Wide Area Network (WAN) such as the Internet). For instance, the primary device 202 may be configured as a wireless mesh router that integrates into a mesh router system to extend the range of the mesh router system. Such mesh router systems are becoming increasingly advantageous with the deployment of countless Internet-of-Things (IoT) devices in spaces (e.g., residential and/or commercial spaces).

Figure 2B:
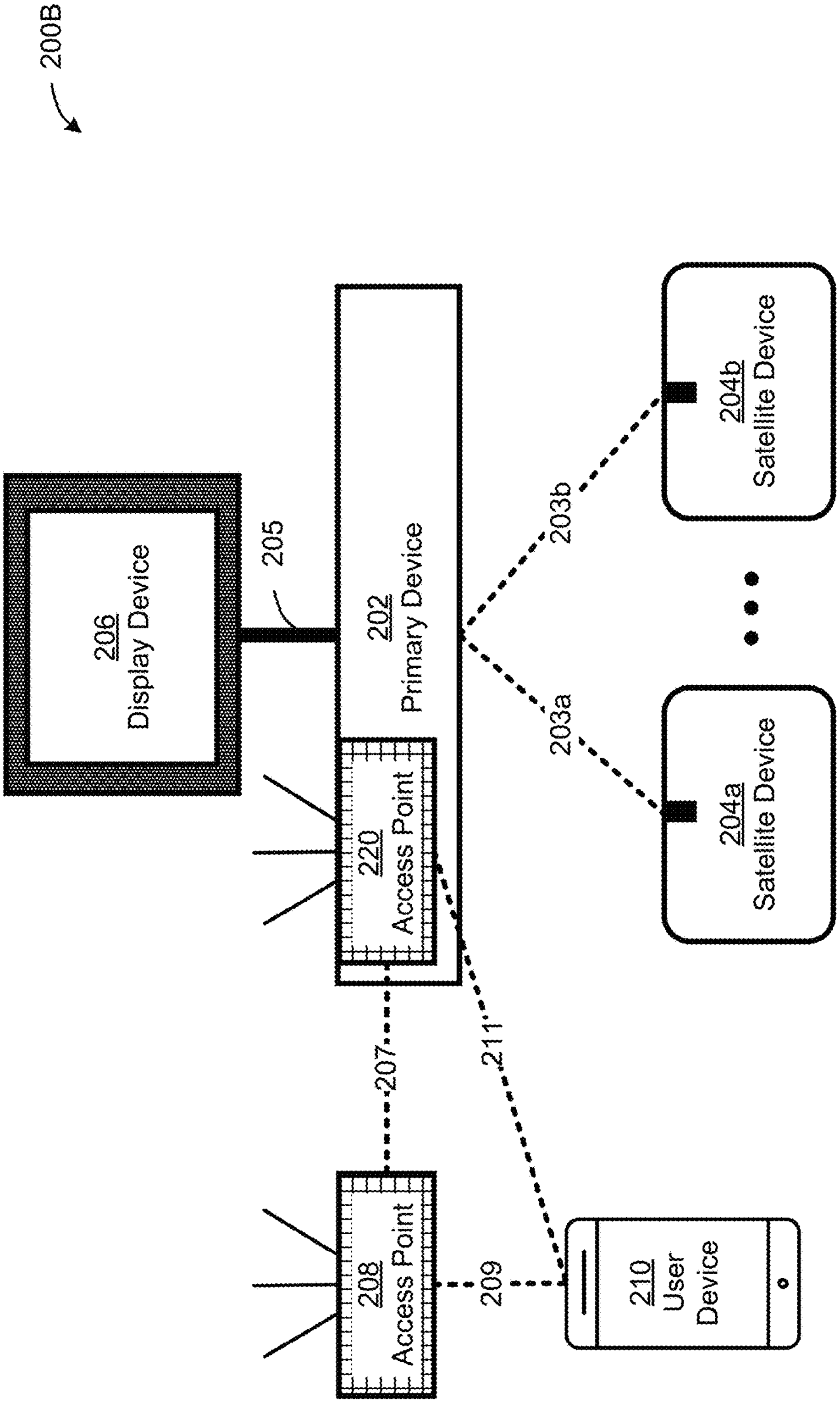
FIG. 2B illustrates a home theater environment, in accordance with another example.

FIG. 2B illustrates an example of a home theater environment 200B comprising such a primary device 202 that is configured as a wireless mesh router. Relative to FIG. 2A, the primary device 202 further includes an AP 220 configured to extend the wireless network of the AP 208. Thus, the primary device 202 may serve as a mesh router in a mesh router system (comprising the primary device 202 and the AP 208) to provide seamless wireless coverage to client devices in a space. In this example, user device 210, or any other WIFI enabled device, can connect to either AP 208 or AP 220 of primary device 202 to obtain access to one or more networks (e.g., a WAN such as the Internet). In FIG. 2B, the primary device 202 may be configured to manage three or more concurrent network connections (e.g., in different frequency ranges) including, for example: (1) connection 207 to AP 208, (2) connection 211 to one or more client devices (such as user device 210), and (3) connection 203 to satellite devices 204.

Figure 3A:
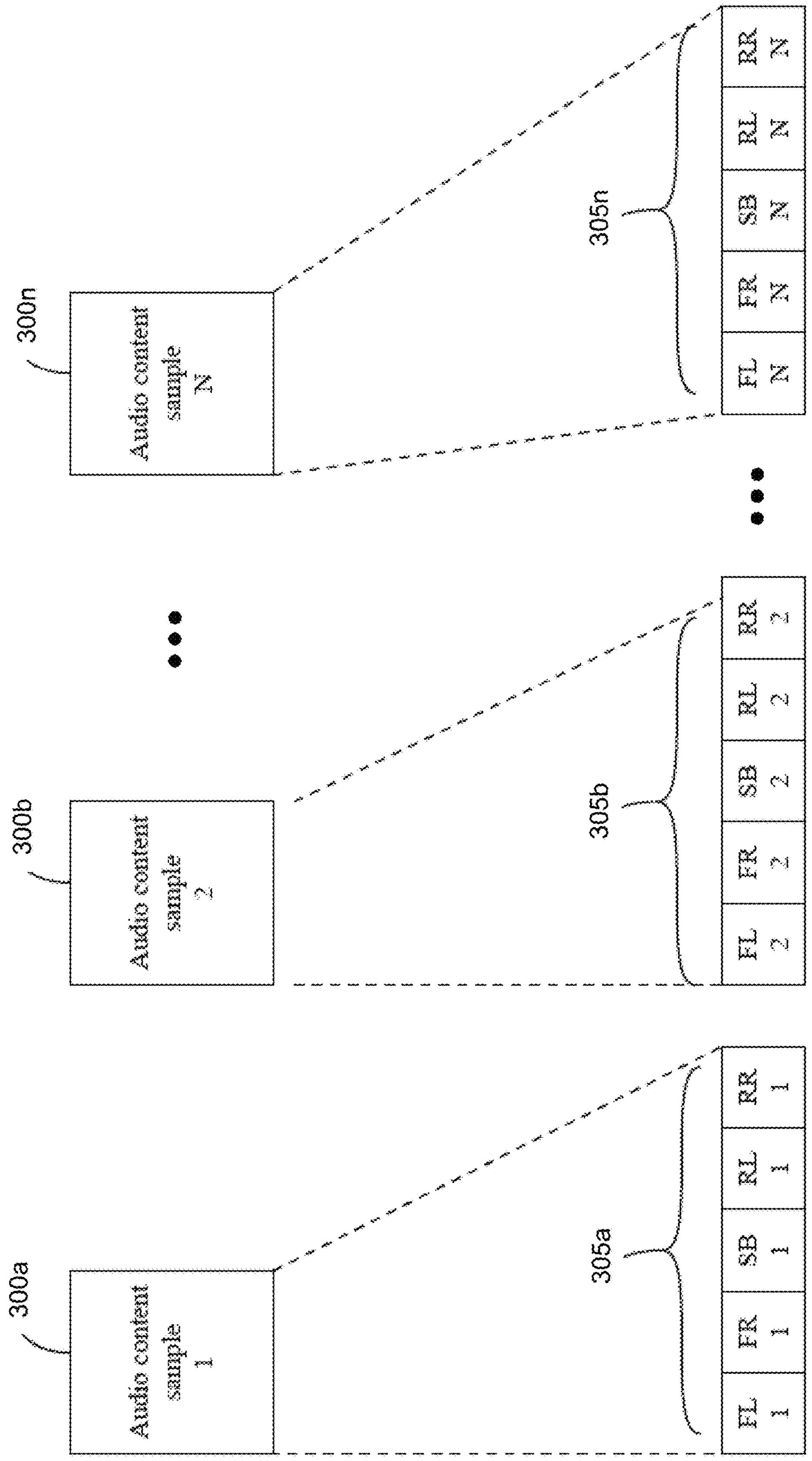
FIG. 3A illustrates a methodology that can be utilized by a primary device to communicate audio content to a satellite device in a home theater environment, in accordance with an example.

FIG. 3A illustrates an example of a methodology that can be utilized by the primary device 202 to communicate audio content to the satellite devices 204. In some instances, the primary device 202 can utilize a "Round Robin" scheduling approach to communicate the audio content to the satellite devices 204. For example, the primary device 202 can receive a stream of audio content samples (300*a*, 300*b*, . . . 300*n*) from the display device 206. The audio content samples 300 can be communicated from the display device 206 at any of a variety of rates including, for example, 44.1 kilohertz (kHz), 48 kHz, 96 kHz, 176.2 kHz, and 192 kHz. The audio content samples 300 may comprise uncompressed audio content (e.g., Pulse-Code Modulation (PCM) audio) and/or compressed audio content (e.g., DOLBY audio such as DOLBY AC-3 audio, DOLBY E-AC-3 audio, DOLBY AC-4 audio, and DOLBY ATMOS audio). The display device 206 outputs the audio content samples 300 while beginning the process of rendering the video content on a display (e.g., integrated into the display device 206). Given that the display device 206 may take tens of milliseconds to successfully render the video content, the audio content samples 300 may be output just before the corresponding video content is displayed (e.g., tens of milliseconds earlier). The primary device 202 may coordinate playback of the audio content samples 300 in lip-synchrony with the video content being displayed on the display device 206 such that there is no perceived audio delay (i.e., no lip-syncing issues are perceived) by the viewer. In this regard, it can be shown that in some cases, a delay of no more than 40 ms between the video content being rendered and the audio content being heard is imperceptible to the average viewer. The primary device 202 may achieve lip-synchrony by, for example, exploiting one or more of the following periods of time: (1) a gap between the display device 206 outputting the audio content samples 300 and display device 206 actually displaying the associated visual content; and/or (2) an allowable delay between the visual content being displayed and the associated audio content being played back without losing lip-synchrony (e.g., up to 40 milliseconds).

After receiving a particular audio content sample 300*a*, the primary device 202 can extract the channel samples 305*a* (i.e., front-left, front-right, etc.) from the audio content sample 300*a* and can communicate the channel samples 305*a* to the corresponding satellite devices 204. In the illustrated examples in FIG. 3A, the channel samples 305*a* are communicated sequentially. For example, during a first interval, the primary device 202 can communicate the front-left channel sample (FL1) associated with a first audio content sample 300*a* to a first satellite device assigned to render the front left channel. During a second interval, the primary device 202 can communicate the front-right channel sample (FR1) associated with the first audio content sample 300*a* to a second satellite device assigned to render the front right channel. During a third interval, the primary device 202 can communicate the subwoofer channel sample (SB1) associated with the first audio content sample 300*a* to a third satellite device assigned to render the subwoofer channel. During a fourth interval, the primary device 202 can communicate the rear-left channel sample (RL1) associated with the first audio content sample 300*a* to a fourth satellite device associated to render the rear-left channel. During a fifth interval, the primary device 202 can communicate the rear-right channel sample (RR1) associated with the first audio content sample 300*a* to a fifth satellite device assigned to render the rear-right channel. The same process can repeat with the arrival of subsequent audio content samples from the display device 206, such as audio content sample 300*b* through audio content sample 300*n*.

It should be noted that a single device (e.g., the primary device and/or any one or more of the satellite devices) may, in some examples, be assigned to render multiple audio channels simultaneously. As a result, a single transmission to a single satellite in accordance with the "Round-Robin" approach shown in FIG. 3A may comprise channel samples associated with multiple channels. For instance, a satellite device may be assigned to render both a right-rear channel and a height channel. In such an instance, a transmission to that satellite device may comprise a right-rear channel sample and a height channel sample for the satellite device to render.

Further, it should be appreciated that the primary device may communicate channel samples to multiple satellite devices 204 simultaneously. Simultaneous communication of audio content from the primary device 202 to the satellite devices 204 may be accomplished in any of a variety of ways. For example, certain wireless communication standards (e.g., 802.11ax, WIFI 6, and/or WIFI 6E) include orthogonal frequency-division multiple access (OFDMA) support that enables a given wireless channel to be subdivided into multiple smaller sub-channels. Each of these sub-channels may be employed to communicate with different devices independently from each other. In examples where the primary device 202 (and at least two of the satellite devices 204) support such a wireless communication standard, the primary device 202 may simultaneously transmit audio samples to two or more satellite devices 204 that support OFDMA.

In some instances, the satellite devices 204 may comprise a mix of one or more devices that support OFDMA (e.g., one or more devices that support 802.11ax, WIFI 6, and/or WIFI 6E) and one or more devices that do not support OFDMA (e.g., one or more devices that support an older backwards-compatible standard such as 802.11n, 802.11ac, WIFI 4, WIFI 5, etc.). In such instances, the primary device 202 may combine transmission of channel samples to multiple OFDMA capable satellite devices into a fewer number of transmissions than there are OFDMA capable satellite devices (e.g., into one transmission) while individually transmitting the other channel samples to the set of devices that do not support OFDMA. For example, the satellite devices 204 may comprise four devices that support OFDMA and two devices that do not. In this example, the primary device 202 may make three transmissions for each audio content sample including: (1) a first transmission to all four of the OFDMA capable satellites; (2) a second transmission to the first non-OFDMA capable satellite; and (3) a third transmission to the second non-OFDMA capable satellite.

It should be appreciated that other techniques separate and apart from OFDMA may be employed to facilitate simultaneous communication of channel samples to satellite devices 204. For instance, the primary device 202 may simultaneously communicate with multiple satellite devices 204 using multiple wireless channels. For example, the channel samples **305*a* for a first subset of the satellite devices 204 can be communicated via a first wireless channel and the channel samples 305*a* for a second subset of the satellite devices 204** can be communicated via a second wireless channel that is different from the first wireless channel (e.g., a different channel in the same band as the first wireless channel or a different channel in a different band than the first wireless channel).

Figure 3B:
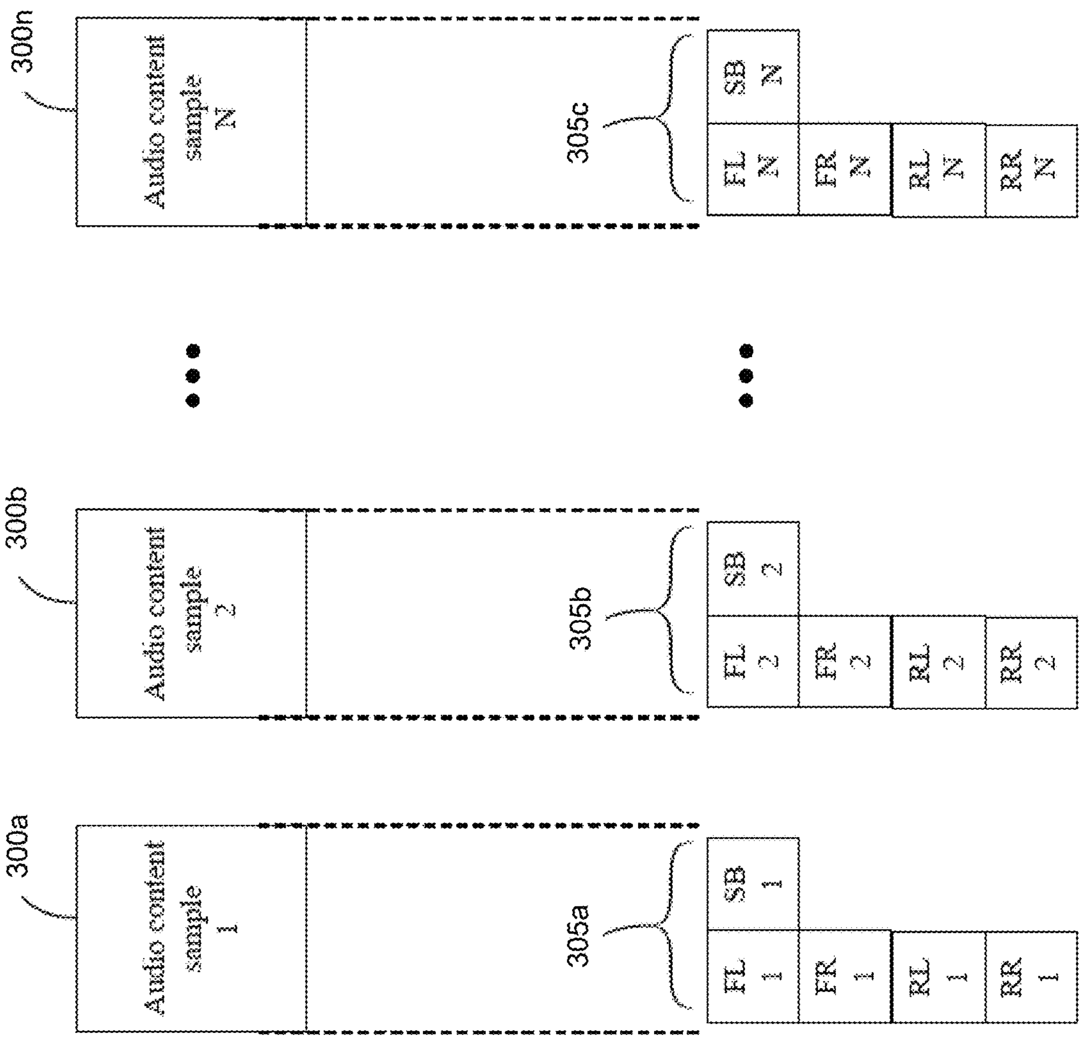
FIG. 3B illustrates another methodology that can be utilized by a primary device to communicate audio content to a satellite device in a home theater environment, in accordance with an example.

FIG. 3B illustrates an example of a methodology that can be utilized by the primary device 202 to communicate audio content to the satellite devices 204 that leverages the simultaneous communication capabilities described above. As shown, multiple channel samples may be transmitted simultaneously to multiple different satellite devices 204. For example, during a first interval, the primary device 202 may simultaneously communicate: (1) the front-left channel sample (FL1) to a first satellite device; (2) the front-right channel sample (FR1) to a second satellite device; (3) the rear-left channel sample (RL1) channel sample to a third satellite device; and (4) the rear-right channel sample (RR1) channel sample to a fourth satellite device. During a second interval, the primary device may communicate the subwoofer channel sample (SB1) to a fifth satellite device. The same process can repeat with the arrival of subsequent audio content samples from the display device 206, such as audio content sample **300*b* through audio content sample 300*n***.

It should be appreciated that the order in which the particular channel samples 305 are transmitted and the way in which the particular channel samples 305 are grouped for simultaneous transmission may vary based on the particular implementation. For example, the rear-left channel sample (RL1) and/or the rear-right channel sample (RR1) may be transmitted before the front-left channel sample (FL1) and/or the front-right channel sample (FR1). Additionally (or alternatively), the rear-left channel sample (RL1) may be transmitted simultaneously with the front-left channel sample (FL1) and/or the front-right channel sample (FR1). Thus, the particular channel samples **305*a*** may be ordered and/or grouped in any of a variety of ways.

Figure 4:
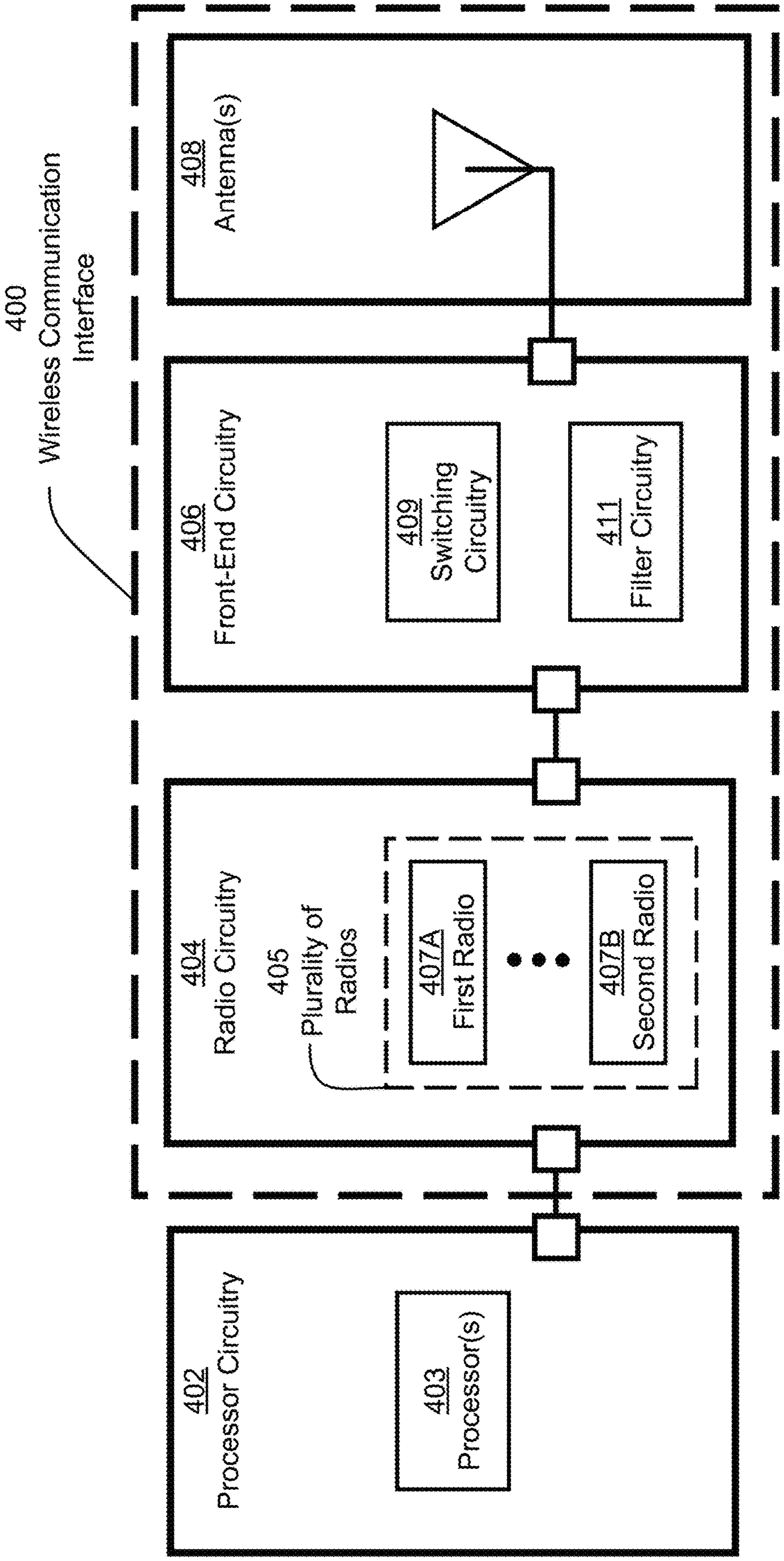
FIG. 4 illustrates a logical diagram of a wireless communication interface for a primary device, in accordance with an example.

FIG. 4 illustrates an example of a logical diagram of a wireless communication interface 400 that may be integrated into any of the devices described herein, such as primary device 202. As shown, the wireless communication interface 400 may be communicatively coupled to processor circuitry 402 that may comprise one or more processors 403. The wireless communication interface 400 comprises radio circuitry 404 including a plurality of radios 405 (shown as a first radio 407A and a second radio 407B), front end-circuitry 406 including switching circuitry 409 and filter circuitry 411, and one or more antennas 408.

The processor circuitry 402 may comprise one or more processors 403 that execute instructions stored in memory to facilitate performance of any of a variety of operations including, for instance, those operations described herein. The memory may be integrated into the processor circuitry 402 or separate from the processor circuitry 402. The processor circuitry 402 may be implemented using one or more integrated circuits (ICs) that may be packaged separately, together in any combination, or left unpackaged. In some examples, the processor circuitry 402 may be implemented using a System-On-a-Chip (SoC) into which the processor(s) 403 may be integrated.

The radio circuitry 404 may be coupled to the processor circuitry 402 and comprise a plurality of radios 405 to facilitate wireless communication. The plurality of radios 405 may include a first radio 407A and a second radio 407B. It should be appreciated that the plurality of radios 405 may include any number of radios (e.g., three radios, four radios, etc.) and is not limited in this way. In some instances, the first radio 407A may be employed to facilitate communication over a backhaul connection (e.g., connection 207 in FIGS. 2A and 2B, or connection 211 in FIG. 2B) and the second radio may be employed to facilitate communication with one or more satellite devices (e.g., connections 203 in FIGS. 2A and 2B). The radio circuitry 404 may be implemented using one or more integrated circuits (ICs) that may be packaged separately, together in any combination, or left unpackaged. In some instances, the first radio 407A and the second radio 407B may be integrated into separate ICs. In other instances, the first radio 407A and the second radio 407B may be integrated into a single IC.

The front-end circuitry 406 may be coupled between the radio circuitry 404 and the antennas 408. The front-end circuitry 406 may comprise switching circuitry 409 and filter circuitry 411. The switching circuitry 409 may comprise one or more switches to control which of the antenna(s) 408 are coupled to which ports of the radio circuitry 404 based on received control signals (e.g., from the radio circuitry 404, the processor circuitry 402, or any component thereof). Examples of switches that may be incorporated into the switching circuitry 409 include: Single Pole Single Throw (SP1T) switches, Single Pole Double Throw (SP2T) switches, Single Pole Triple Throw (SP3T) switches, Double Pole Single Throw (DP1T) switches, Double Pole Double Throw (DP2T) switches, and/or Double Pole Triple Throw (DP3T) switches. The filter circuitry 411 may comprise one or more filters to filter signals going to (or being received from) the antenna(s) 408. Example filters that may be incorporated into the filter circuitry 411 include: bandpass filters, lowpass filters, highpass filters, all-pass filters, and diplexers. The front-end circuitry 406 may be implemented using one or more integrated circuits (ICs) that may be packaged separately, together in any combination, or left unpackaged.

The antenna(s) 408 may be configured to radiate and/or detect electromagnetic waves. The antenna(s) 408 may have any of a variety of constructions. For example, one or more of the antenna(s) 408 may be multi-band antennas (e.g., dual-band antennas, tri-band antennas, etc.) configured to operate on several bands (e.g., two or more of: the 2.4 GHz band, the 5 GHz band, and the 6 GHz band). Additionally (or alternatively), the antenna(s) 408 may comprise one or more single-band antennas configured to operate on a single band (e.g., the 2.4 GHz band (or any portion thereof), the 5 GHz band (or any portion thereof), the 6 GHz band (or any portion thereof), etc.).

It should be appreciated that one or any combination of the ICs described above with respect to processor circuitry 402, radio circuitry 404, and/or front-end circuitry 406 may be mounted to (or otherwise attached) to one or more substrates, such as a circuit board. In some instances, all of the ICs in the processor circuitry 402, radio circuitry 404, and/or front-end circuitry 406 may be mounted to a single circuit board. In other instances, the ICs in the processor circuitry 402, radio circuitry 404, and/or front-end circuitry 406 may be distributed across multiple circuit boards that may be communicatively coupled to each other (e.g., using one or more cables).

Figure 5A:
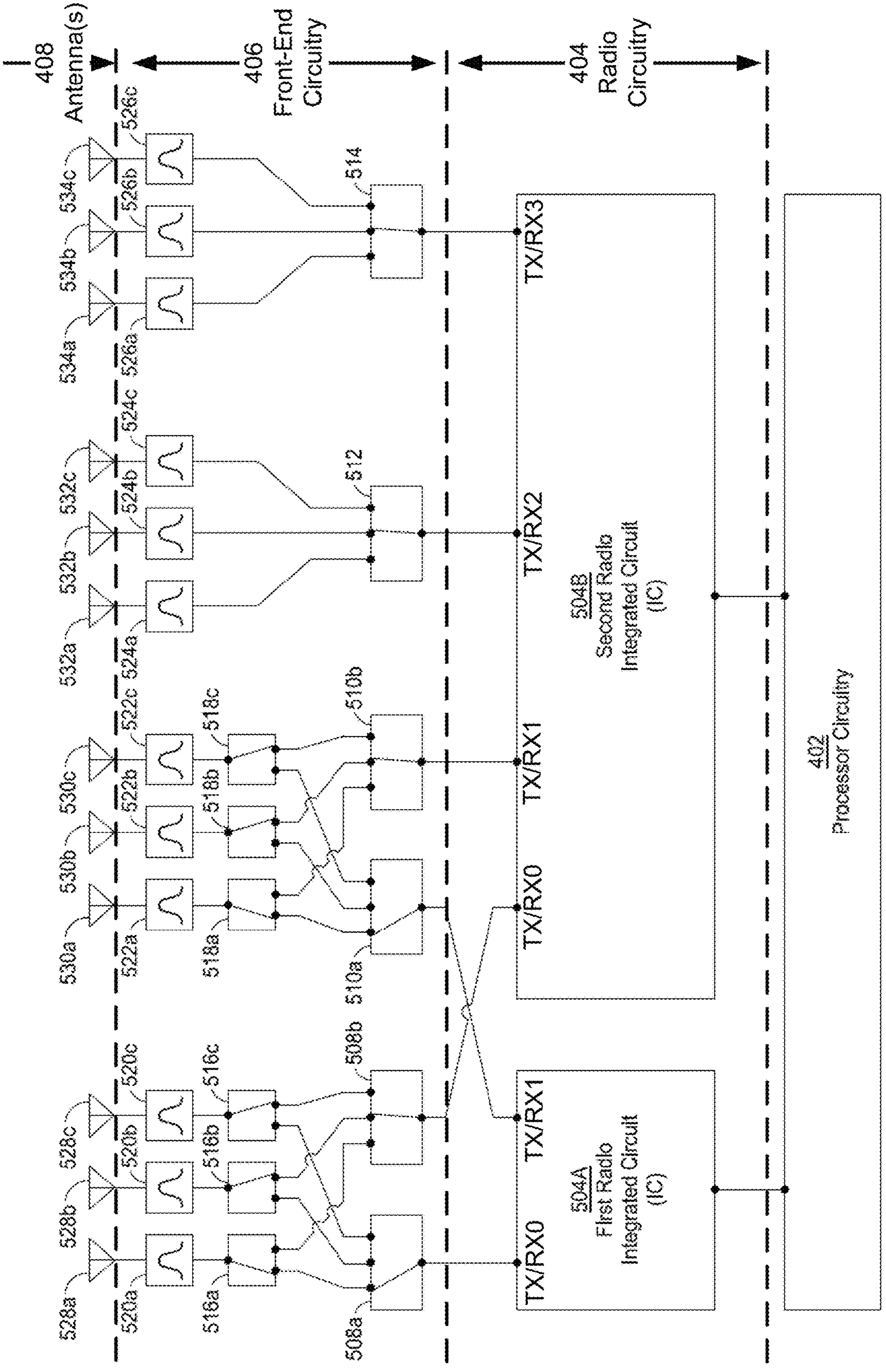
FIG. 5A illustrates a circuit diagram depicting an implementation of the wireless communication interface of FIG. 4, in accordance with an example.

FIG. 5A illustrates a circuit diagram depicting an example implementation of the wireless communication interface 400 of FIG. 4. As shown, the radio circuitry 404 comprises a first radio IC 504A and a second radio IC 504B each coupled to, and under the control of, the processor circuitry 402. The first radio IC 504A may comprise a 2×2 MIMO radio configured to simultaneously communicate (e.g., transmit and/or receive) using two antennas in one of a plurality of frequency bands (e.g., the 2.4 GHz band, the 5 GHz band, and the 6 GHz band). The two antennas employed for simultaneous communication may be those antennas coupled to the transmit/receive ports TX/RX0 and TX/RX1 on the first radio IC 504A. The first radio IC 504A may be employed to facilitate communication with an AP, such as over communication link 207 in FIG. 2A and/or communication link 211 in FIG. 2B. In some instances, a third radio (not shown) may be employed to handle communication link 211, particularly if that link uses a different frequency band or protocol. The second radio IC 504B may comprise a 4×4 MIMO radio configured to simultaneously communicate (e.g., transmit and/or receive) using four antennas in one of a plurality of frequency bands (e.g., the 5 GHz band and the 6 GHz band). The four antennas employed for simultaneous communication may be those antennas coupled to the transmit/receive ports TX/RX0, TX/RX1, TX/RX3, TX/RX4 on the second radio IC 504B. The second radio IC 504B may be employed to facilitate communication with one or more satellite devices, such as over communication links 203 in FIGS. 2A and 2B.

The radio circuitry 404 may be coupled to front-end circuitry 406 that comprises a plurality of switches that control which antenna of the antennas 408 is coupled to which TX/RX port of the first and second radio ICs 504A and 504B, respectively, and a plurality of filters. The plurality of switches comprises a set of SP3T switches 508*a*, 508*b*, 510*a*, 510*b*, 512, and 514 in addition to a set of SP2T switches 516*a*, 516*b*, 516*c*, 518*a*, 518*b*, and 518*c*. The state of the switches may be controlled by the first radio IC 504A, the second radio IC 504B, and/or the processor circuitry 402. The plurality of filters comprises a plurality of bandpass filters 520*a*, 520*b*, 520*c*, 522*a*, 522*b*, 522*c*, 524*a*, 524*b*, 524*c*, 526*a*, 526*b*, and 526*c*. The band pass filters 520*a*, 522*a*, 524*a*, and 526*a* may be configured to pass frequencies that correspond to a 5 GHz Low sub-band and block other frequencies. For example, in some embodiments, the 5 GHz Low sub-band may range from 5.03 GHz to 5.51 GHz. The band pass filters 520*b*, 522*b*, 524*b*, and 526*b* may be configured to pass frequencies that correspond to a 5 GHz High sub-band and block other frequencies. For example, in some embodiments, the 5 GHz Low sub-band may range from 5.51 GHz to 5.99 GHz. The band pass filters 520*c*, 522*c*, 524*c*, and 526*c* may be configured to pass frequencies that correspond to a 6 GHz band and block other frequencies.

The front-end circuitry 406 is coupled to the antennas 408 that comprises twelve antennas grouped into four sets of three antennas (including a first antenna configured to operate in the 5 GHz Low sub-band, a second antenna configured to operate in the 5 GHz High sub-band, and a third antenna configured to operate in the 6 GHz band). Each antenna of a given antenna set may be coupled to a particular transmit/receive port of the first and/or second radio IC 504A and 504B, respectively, based on the position of the switches. Table 1 below describes the operating band(s) of each antenna and the particular ports of the first and second radio ICs 504*a* and 504*b*, respectively, that the respective antenna can be connected to (based on the position of the switches).

TABLE 1

Antenna Operating Band(s) and Possible TX/RX Port connections for FIG. 5A

| Antenna | Antenna Set | Operating Band(s) | Possible TX/RX Port Connections |
|---|---|---|---|
| 528a | 1 | 5 GHz Low | TX/RX0 of First Radio IC 504A or TX/RX0 of Second Radio IC 504B |
| 528b | 1 | 5 GHz High | TX/RX0 of First Radio IC 504A or TX/RX0 of Second Radio IC 504B |
| 528c | 1 | 6 GHz | TX/RX0 of First Radio IC 504A or TX/RX0 of Second Radio IC 504B |
| 530a | 2 | 5 GHz Low | TX/RX1 of First Radio IC 504A or TX/RX1 of Second Radio IC 504B |
| 530b | 2 | 5 GHz High | TX/RX1 of First Radio IC 504A or TX/RX1 of Second Radio IC 504B |
| 530c | 2 | 6 GHz | TX/RX1 of First Radio IC 504A or TX/RX1 of Second Radio IC 504B |
| 532a | 3 | 5 GHz Low | TX/RX2 of Second Radio IC 504B |
| 532b | 3 | 5 GHz High | TX/RX2 of Second Radio IC 504B |
| 532c | 3 | 6 GHz | TX/RX2 of Second Radio IC 504B |
| 534a | 4 | 5 GHz Low | TX/RX3 of Second Radio IC 504B |
| 534b | 4 | 5 GHz High | TX/RX3 of Second Radio IC 504B |
| 534c | 4 | 6 GHz | TX/RX3 of Second Radio IC 504B |

For instance, antenna 528*a* may be coupled to the TX/RX0 port of the first radio 504A, through 5 GHz Low bandpass filter 520*a*, when switch 516*a* is set to the left position and switch 508*a* is set to the left position. Alternatively, antenna 528*a* may be coupled to the TX/RX0 port of the second radio 504B when switch 516*a* is set to the right position and switch 508*b* is set to the left position. Likewise, antenna 528*b* may be coupled to the TX/RX0 port of the first radio 504A, through 5 GHz High bandpass filter 520*b*, when switch 516*b* is set to the left position and switch 508*a* is set to the middle position. Alternatively, antenna 528*b* may be coupled to the TX/RX0 port of the second radio 504B when switch 516*b* is set to the right position and switch 508*b* is set to the middle position. Likewise, antenna 528*c* may be coupled to the TX/RX0 port of the first radio 504A, through 6 GHz bandpass filter 520*c*, when switch 516*c* is set to the left position and switch 508*a* is set to the right position. Alternatively, antenna 528*c* may be coupled to the TX/RX0 port of the second radio 504B when switch 516*c* is set to the right position and switch 508*b* is set to the right position.

Similarly, antenna 530*a* may be coupled to the TX/RX1 port of the first radio 504A, through 5 GHz Low bandpass filter 522*a*, when switch 518*a* is set to the left position and switch 510*a* is set to the left position. Alternatively, antenna 530*a* may be coupled to the TX/RX1 port of the second radio 504B when switch 518*a* is set to the right position and switch 510*b* is set to the left position. Likewise, antenna 530*b* may be coupled to the TX/RX1 port of the first radio 504A, through 5 GHz High bandpass filter 522*b*, when switch 518*b* is set to the left position and switch 510*a* is set to the middle position. Alternatively, antenna 530*b* may be coupled to the TX/RX1 port of the second radio 504B when switch 518*b* is set to the right position and switch 510*b* is set to the middle position. Likewise, antenna 530*c* may be coupled to the TX/RX1 port of the first radio 504A, through 6 GHz bandpass filter 522*c*, when switch 518*c* is set to the left position and switch 510*a* is set to the right position. Alternatively, antenna 530*c* may be coupled to the TX/RX1 port of the second radio 504B when switch 518*c* is set to the right position and switch 510*b* is set to the right position.

Continuing, antenna 532*a* may be coupled to the TX/RX2 port of the second radio 504B, through 5 GHz Low bandpass filter 524*a*, when switch 512 is set to the left position. Alternatively, antenna 532*b* may be coupled to the TX/RX2 port of the second radio 504B, through 5 GHz High bandpass filter 524*b*, when switch 512 is set to the middle position. Or, antenna 532*c* may be coupled to the TX/RX2 port of the second radio 504B, through 6 GHz bandpass filter 524*c*, when switch 512 is set to the right position.

Continuing, antenna 534*a* may be coupled to the TX/RX3 port of the second radio 504B, through 5 GHz Low bandpass filter 526*a*, when switch 514 is set to the left position. Alternatively, antenna 534*b* may be coupled to the TX/RX3 port of the second radio 504B, through 5 GHz High bandpass filter 526*b*, when switch 514 is set to the middle position. Or, antenna 534*c* may be coupled to the TX/RX3 port of the second radio 504B, through 6 GHz bandpass filter 526*c*, when switch 514 is set to the right position.

Figure 5B:
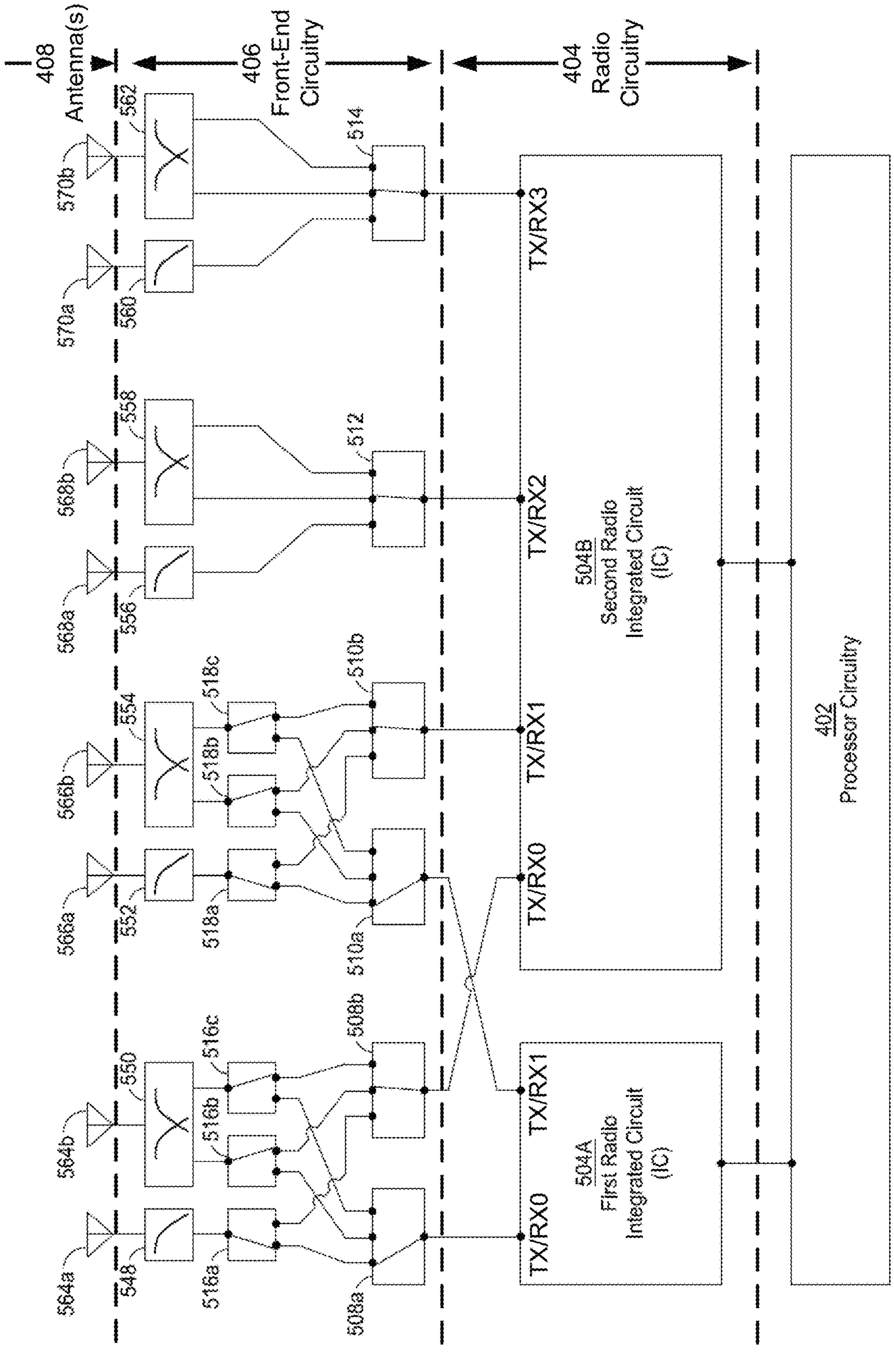
FIG. 5B illustrates a circuit diagram depicting another implementation of the wireless communication interface of FIG. 4, in accordance with an example.

It should be appreciated that the particular implementation of the wireless communication interface 400 shown in FIG. 5A is only one possibility and any of a variety of alterations may be made to the circuit without departing from the scope of the present disclosure. For instance, the wireless communication interface 400 may be implemented using less than twelve antennas and less than twelve filters. An example of such an implementation with fewer antennas and filters is shown in FIG. 5B. Relative to FIG. 5A, the set of twelve antennas have been replaced with a set of eight antennas grouped into four sets of two antennas (including a first antenna configured to operate in the 5 GHz Low sub-band and a second antenna configured to operate in 5 GHz High sub-band and the 6 GHz band). Further, the set of twelve filters have been replaced with eight filters including four low-pass filters 548, 552, 556, and 560 each configured to block frequencies above the 5 GHz Low sub-band and pass frequencies within (and below) the 5 GHz Low sub-band in addition to four diplexers 550, 554, 558, and 562. Each of the diplexers 550, 554, 558, and 562 may be configured to: (1) receive a wide-band input (e.g., with frequencies in the 5 GHz High sub-band and the 6 GHz band) from an antenna and divide the wide-band input into two narrow-band outputs (e.g., a first output in the 5 GHz High sub-band and a second output in the 6 GHz band); and/or (2) receive two narrow band inputs (e.g., a first input in the 5 GHz High sub-band and a second input in the 6 GHz band) and provide a wide-band output (e.g., comprising the first input in the 5 GHz High sub-band and the second input in the 6 GHz band). Table 2 below describes the operating band(s) of each antenna and the particular ports of the first and second radio ICs 504*a* and 504*b*, respectively, that the respective antenna can be connected to (based on the position of the switches).

TABLE 2

Antenna Operating Band(s) and Possible TX/RX Port connections for FIG. 5B

| Antenna | Antenna Set | Operating Band(s) | Possible TX/RX Port Connections |
|---|---|---|---|
| 564a | 1 | 5 GHz Low | TX/RX0 of First Radio IC 504A or TX/RX0 of Second Radio IC 504B |
| 564b | 1 | 5 GHz High and 6 GHz | TX/RX0 of First Radio IC 504A or TX/RX0 of Second Radio IC 504B |
| 566a | 2 | 5 GHz Low | TX/RX1 of First Radio IC 504A or TX/RX1 of Second Radio IC 504B |
| 566b | 2 | 5 GHz High and 6 GHz | TX/RX1 of First Radio IC 504A or TX/RX1 of Second Radio IC 504B |
| 568a | 3 | 5 GHz Low | TX/RX2 of Second Radio IC 504B |
| 568b | 3 | 5 GHz High and 6 GHz | TX/RX2 of Second Radio IC 504B |
| 570a | 4 | 5 GHz Low | TX/RX3 of Second Radio IC 504B |
| 570b | 4 | 5 GHz High and 6 GHz | TX/RX3 of Second Radio IC 504B |

For instance, antenna 564*a* may be coupled to the TX/RX0 port of the first radio 504A, through the 5 GHz Low lowpass filter 548, when switch 516*a* is set to the left position and switch 508*a* is set to the left position. Alternatively, antenna 564*a* may be coupled to the TX/RX0 port of the second radio 504B when switch 516*a* is set to the right position and switch 508*b* is set to the left position. Likewise, antenna 564*b* may be coupled to the TX/RX0 port of the first radio 504A, through the 5 GHz High portion of diplexer 550, when switch 516*b* is set to the left position and switch 508*a* is set to the middle position, or antenna 564*b* may be coupled to the TX/RX0 port of the first radio 504A, through the 6 GHz portion of diplexer 550, when switch 516*c* is set to the left position and switch 508*a* is set to the right position. Alternatively, antenna 564*b* may be coupled to the TX/RX0 port of the second radio 504B, through the 5 GHz High portion of diplexer 550, when switch 516*b* is set to the right position and switch 508*b* is set to the middle position, or antenna 564*b* may be coupled to the TX/RX0 port of the second radio 504B, through the 6 GHz portion of diplexer

550, when switch 516*c* is set to the right position and switch 508*b* is set to the right position.

Similarly, antenna 566*a* may be coupled to the TX/RX1 port of the first radio 504A, through the 5 GHz Low lowpass filter 552, when switch 518*a* is set to the left position and switch 510*a* is set to the left position. Alternatively, antenna 566*a* may be coupled to the TX/RX1 port of the second radio 504B when switch 518*a* is set to the right position and switch 510*b* is set to the left position. Likewise, antenna 566*b* may be coupled to the TX/RX1 port of the first radio 504A, through the 5 GHz High portion of diplexer 554, when switch 518*b* is set to the left position and switch 510*a* is set to the middle position, or antenna 566*b* may be coupled to the TX/RX1 port of the first radio 504A, through the 6 GHz portion of diplexer 554, when switch 518*c* is set to the left position and switch 510*a* is set to the right position. Alternatively, antenna 566*b* may be coupled to the TX/RX1 port of the second radio 504B, through the 5 GHz High portion of diplexer 554, when switch 518*b* is set to the right position and switch 510*b* is set to the middle position, or antenna 566*b* may be coupled to the TX/RX1 port of the second radio 504B, through the 6 GHz portion of diplexer 554, when switch 518*c* is set to the right position and switch 510*b* is set to the right position.

Continuing, antenna 568*a* may be coupled to the TX/RX2 port of the second radio 504B, through the 5 GHz Low lowpass filter 556, when switch 512 is set to the left position. Alternatively, antenna 568*b* may be coupled to the TX/RX2 port of the second radio 504B, through the 5 GHz High portion of diplexer 558, when switch 512 is set to the middle position, or antenna 568*b* may be coupled to the TX/RX2 port of the second radio 504B, through the 6 GHz portion of diplexer 558, when switch 512 is set to the right position.

Continuing, antenna 570*a* may be coupled to the TX/RX3 port of the second radio 504B, through the 5 GHz Low lowpass filter 560, when switch 514 is set to the left position. Alternatively, antenna 570*b* may be coupled to the TX/RX3 port of the second radio 504B, through the 5 GHz High portion of diplexer 562, when switch 514 is set to the middle position, or antenna 570*b* may be coupled to the TX/RX3 port of the second radio 504B, through the 6 GHz portion of diplexer 562, when switch 514 is set to the right position.

Figure 5C:
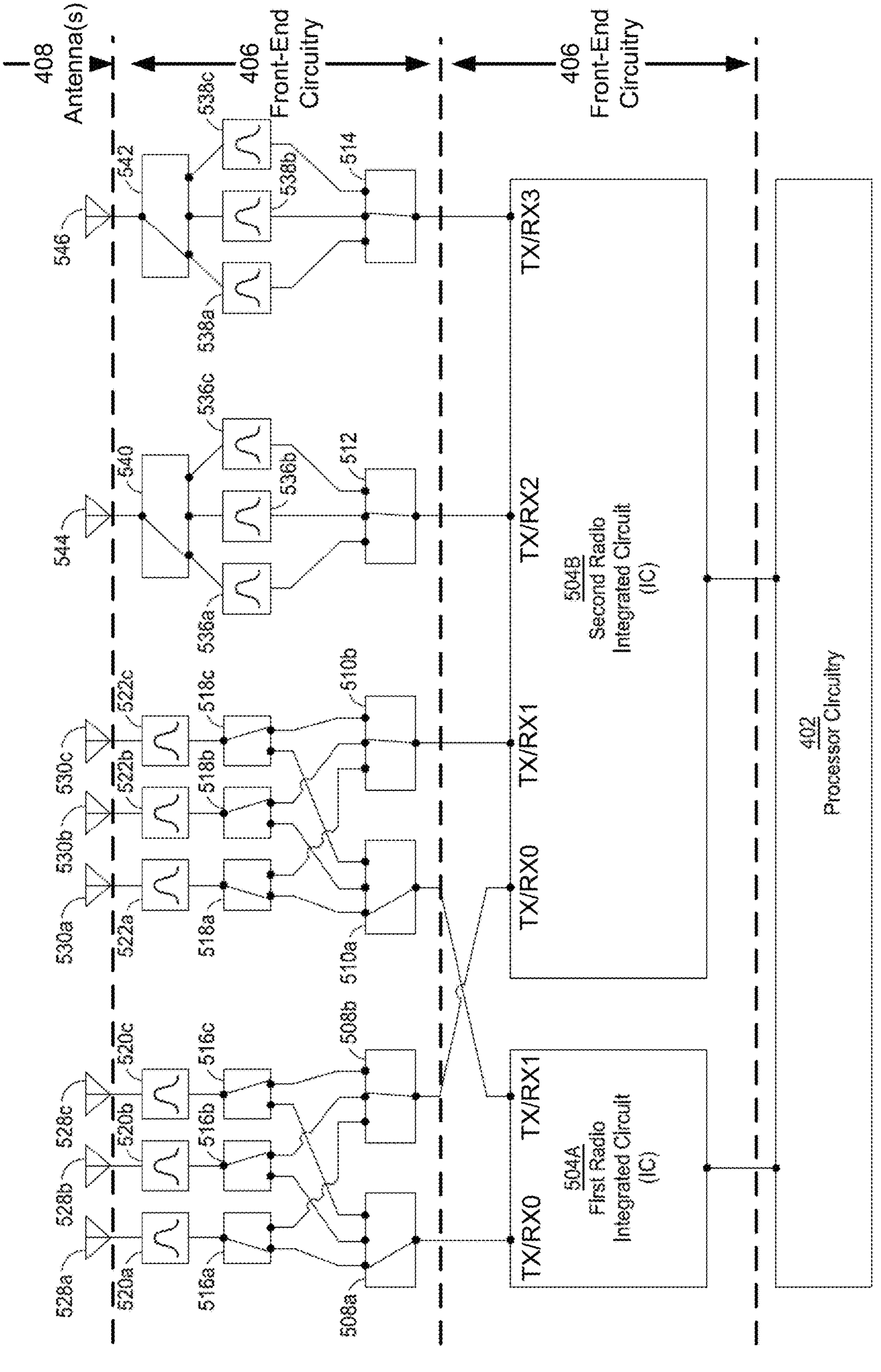
FIG. 5C illustrates a circuit diagram depicting another implementation of the wireless communication interface of FIG. 4, in accordance with an example.

FIG. 5C illustrates a circuit diagram depicting another example implementation of the wireless communication interface of FIG. 4. Relative to FIG. 5A, the circuit diagram shown in FIG. 5C makes the following changes: (1) antennas 532*a*, 532*b* and 532*c* are replaced with a single antenna 544 configured to operate in the 5 GHz and 6 GHz bands, (2) antennas 534*a*, 534*b* and 534*c* are replaced with a single antenna 546 configured to operate in the 5 GHz and 6 GHz bands; (3) a SP3T switch 540 is coupled between the filters 536*a*, 536*b*, and 536*c* and the antenna 544; and (4) a SP3T switch 542 is coupled between the filters 538*a*, 538*b*, and 538*c* and the antenna 546. Table 3 below describes the operating band(s) of each antenna and the particular ports of the first and second radio ICs 504*a* and 504*b*, respectively, that the respective antenna can be connected to (based on the position of the switches).

TABLE 3

Antenna Operating Band(s) and Possible TX/RX Port connections for FIG. 5C

| Antenna | Antenna Set | Operating Band(s) | Possible TX/RX Port Connections |
|---|---|---|---|
| 528a | 1 | 5 GHz Low | TX/RX0 of First Radio IC 504A or TX/RX0 of Second Radio IC 504B |
| 528b | 1 | 5 GHz High | TX/RX0 of First Radio IC 504A or TX/RX0 of Second Radio IC 504B |
| 528c | 1 | 6 GHz | TX/RX0 of First Radio IC 504A or TX/RX0 of Second Radio IC 504B |
| 530a | 2 | 5 GHz Low | TX/RX1 of First Radio IC 504A or TX/RX1 of Second Radio IC 504B |
| 530b | 2 | 5 GHz High | TX/RX1 of First Radio IC 504A or TX/RX1 of Second Radio IC 504B |
| 530c | 2 | 6 GHz | TX/RX1 of First Radio IC 504A or TX/RX1 of Second Radio IC 504B |
| 544 | 3 | 5 GHz and 6 GHz | TX/RX2 of Second Radio IC 504B |
| 546 | 4 | 5 GHz and 6 GHz | TX/RX3 of Second Radio IC 504B |

For instance, while antennas 528*a*, 528*b*, 528*c*, 530*a*, 530*b*, and 530*c* (and their associated switches and filters) operate as previously described in connection with FIG. 5A, antenna 544 may be coupled to the TX/RX2 port of the second radio 504B, through 5 GHz Low bandpass filter 536*a*, when switches 540 and 512 are set to the left position. Alternatively, antenna 544 may be coupled to the TX/RX2 port of the second radio 504B, through 5 GHz High bandpass filter 536*b*, when switches 540 and 512 are set to the middle position. Or, antenna 544 may be coupled to the TX/RX2 port of the second radio 504B, through 6 GHz bandpass filter 536*c*, when switches 540 and 512 are set to the right position.

Continuing, antenna 546 may be coupled to the TX/RX3 port of the second radio 504B, through the 5 GHz Low bandpass filter 538*a*, when switches 542 and 514 are set to the left position. Alternatively, antenna 546 may be coupled to the TX/RX3 port of the second radio 504B, through the 5 GHz High bandpass filter 538*b*, when switches 542 and 514 are set to the middle position. Or, antenna 546 may be coupled to the TX/RX3 port of the second radio 504B, through the 6 GHz bandpass filter 538*c*, when switches 542 and 514 are set to the right position.

Figure 5D:
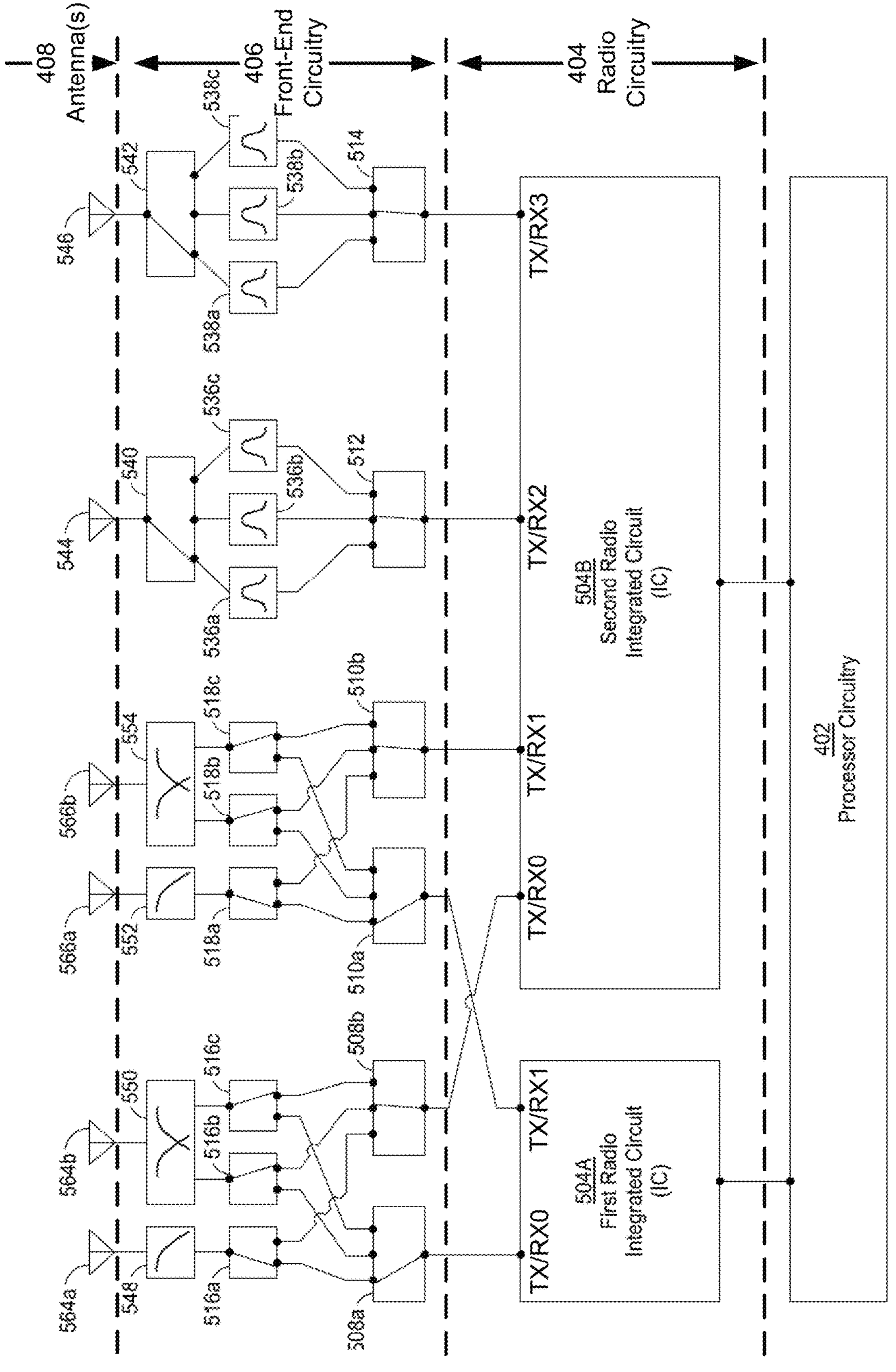
FIG. 5D illustrates a circuit diagram depicting another implementation of the wireless communication interface of FIG. 4, in accordance with an example.

FIG. 5D illustrates a circuit diagram depicting another example implementation of the wireless communication interface of FIG. 4. Relative to FIG. 5B, the circuit diagram shown in FIG. 5D makes the following changes: (1) antennas 568*a* and 568*b* are replaced with a single antenna 544 configured to operate in the 5 GHz and 6 GHz bands, (2) antennas 570*a* and 570*b* are replaced with a single antenna 546 configured to operate in the 5 GHz and 6 GHz bands; (3) the lowpass filter 556 and the diplexer 558 are replaced with three bandpass filters 536*a*, 536*b*, and 536*c* (e.g., having the same construction as bandpass filters 536*a*, 536*b*, and 536*c* described in FIG. 5A); and (4) the lowpass filter 560 and the diplexer 562 are replaced with three bandpass filters 538*a*, 538*b*, and 538*c* (e.g., having the same construction as bandpass filters 538*a*, 538*b*, and 538*c* described in FIG. 5A). Table 4 below describes the operating band(s) of each antenna and the particular ports of the first and second radio ICs 504*a* and 504*b*, respectively, that the respective antenna can be connected to (based on the position of the switches).

TABLE 4

| Antenna Operating Band(s) and Possible TX/RX Port connections for FIG. 5D | | | |
|---|---|---|---|
| Antenna | Antenna Set | Operating Band(s) | Possible TX/RX Port Connections |
| 564a | 1 | 5 GHz Low | TX/RX0 of First Radio IC 504A or TX/RX0 of Second Radio IC 504B |
| 564b | 1 | 5 GHz High and 6 GHz | TX/RX0 of First Radio IC 504A or TX/RX0 of Second Radio IC 504B |
| 566a | 2 | 5 GHz Low | TX/RX1 of First Radio IC 504A or TX/RX1 of Second Radio IC 504B |
| 566b | 2 | 5 GHz High and 6 GHz | TX/RX1 of First Radio IC 504A or TX/RX1 of Second Radio IC 504B |
| 544 | 3 | 5 GHz and 6 GHz | TX/RX2 of Second Radio IC 504B |
| 546 | 4 | 5 GHz and 6 GHz | TX/RX3 of Second Radio IC 504B |

In this example, antennas 564*a*, 564*b*, 566*a*, and 566*b* (and their associated switches and filters) operate as previously described in connection with FIG. 5B. Likewise, antennas 544 and 546 (and their associated switches and filters) operate as previously described in connection with FIG. 5C.

Having depicted multiple possible circuit implementations in FIGS. 5A, 5B, 5C, 5D, and 5E of the wireless communication interface 400, it should be understood that the wireless communication interface 400 may be implemented in any of a variety of ways. For example, in some embodiments, radios 504A and/or 504B may be configured as a 3×3 MIMO radio or any other suitable type of radio (including a 1×1 Single Input Single Output radio), depending on the number of radio channels that need to be concurrently supported. An appropriate number and configuration of switches and filters may be provided to support selection of ports of the selected type of radio.

Additionally, in some instances, radio 504A (or another radio) may be configured to support a 2.4 GHz channel for backhaul communication with AP 208, to handle occasions during which AP 208 operates in a 2.4 GHz mode.

Figure 5E:
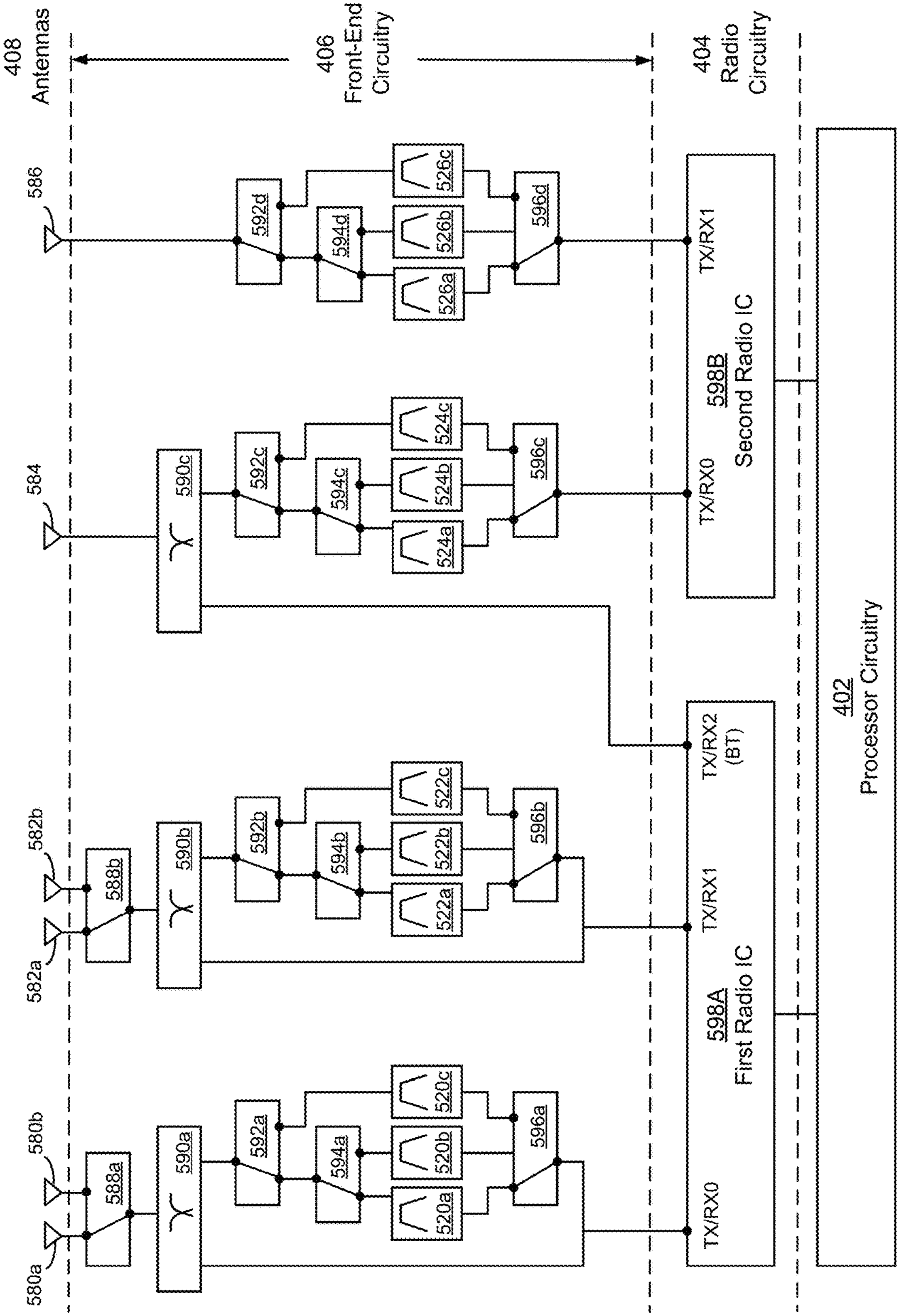
FIG. 5E illustrates a circuit diagram depicting another implementation of the wireless communication interface of FIG. 4, in accordance with an example.

FIG. 5E illustrates a circuit diagram depicting still another example implementation of the wireless communication interface of FIG. 4, in which sub-bands are combined into single antennas, as explained below. As shown, the radio circuitry 404 comprises a first radio IC 598A and a second radio IC 598B each coupled to the processor circuitry 402. The first radio IC 598A may comprise a 2×2 MIMO radio (e.g., a 2×2 MIMO WIFI radio) configured to simultaneously communicate (e.g., transmit and/or receive) using two antennas in one of a plurality of frequency bands (e.g., the 2.4 GHz band, the 5 GHz band, and the 6 GHz band) and another radio (e.g., a BLUETOOTH radio) configured to communicate (e.g., transmit and/or receive) using one antenna. The 2×2 MIMO radio may, in some instances, operate simultaneously with the other radio (e.g., the BLUETOOTH radio). The three antennas employed for communication may be those antennas coupled to the transmit/receive ports TX/RX0, TX/RX1, and TX/RX2 on the first radio IC 598A. The first radio IC 598A may be employed to facilitate communication with an AP (e.g., backhaul communications), such as over communication link 207 in FIG. 2A and/or communication link 211 in FIG. 2B. The TX/RX2 port of the first radio IC 598A is shown to provide BLUETOOTH communications through antenna 584. The second radio IC 598B may comprise a 2×2 MIMO radio configured to simultaneously communicate (e.g., transmit and/or receive) using two antennas in one of a plurality of frequency bands (e.g., the 5 GHz band and the 6 GHz band). The two antennas employed for simultaneous communication may be those antennas coupled to the transmit/receive ports TX/RX0 and TX/RX1 on the second radio IC 504B. The second radio IC 598B may be employed to facilitate communication with one or more satellite devices (e.g., fronthaul communications), such as over communication links 203 in FIGS. 2A and 2B.

The front-end circuitry 406 is shown to comprise a plurality of switches that control which antenna of the antennas 408 is coupled to which TX/RX port of the first and second radio ICs 598A and 598B, respectively, and a plurality of filters and diplexers. The plurality of switches comprises a set of SP3T switches 596*a*, 596*b*, 596*c*, and 596*d*, in addition to a set of SP2T switches 594*a*, 594*b*, 594*c*, 504*d*, 592*a*, 592*b*, 592*c*, 592*d*, 588*a*, and 588*b*. The state of the switches may be controlled by the first radio IC 598A, the second radio IC 598B, and/or the processor circuitry 402. The plurality of filters comprises a plurality of bandpass filters 520*a*, 520*b*, 520*c*, 522*a*, 522*b*, 522*c*, 524*a*, 524*b*, 524*c*, 526*a*, 526*b*, and 526*c*. The band pass filters 520*a*, 522*a*, 524*a*, and 526*a* may be configured to pass frequencies that correspond to a 5 GHz Low sub-band and block other frequencies. The band pass filters 520*b*, 522*b*, 524*b*, and 526*b* may be configured to pass frequencies that correspond to a 5 GHz High sub-band and block other frequencies. The band pass filters 520*c*, 522*c*, 524*c*, and 526*c* may be configured to pass frequencies that correspond to a 6 GHz band and block other frequencies. The diplexers 590*a*, 590*b*, and 590*c* may be configured to: (1) receive a wide-band input (e.g., with frequencies in the 2.4 GHz, 5 GHz Low sub-band, 5 GHz High sub-band, and 6 GHz band) from an antenna and divide the wide-band input into two narrow-band outputs (e.g., a first output in the 2.4 GHz band and a second output in the 5 GHz Low sub-band, 5 GHz High sub-band, and 6 GHz band); and/or (2) receive two narrow band inputs (e.g., a first input in the 2.4 GHz band and a second input in the 5 GHz Low sub-band, 5 GHz High sub-band, and 6 GHz band) and provide a wide-band output (e.g., comprising the first input in the 2.4 GHz and the second input in the 5 GHz Low sub-band, 5 GHz High sub-band, and 6 GHz band).

The front-end circuitry 406 is coupled to the antennas 408 that comprises six antennas grouped into a first set of two diversity antennas 580*a* and 580*b*, a second set of diversity antennas 582*a* and 582*b*, a third antenna 584, and a fourth antenna 586. Each antenna (or antenna of a given antenna set) may be coupled to a particular transmit/receive port of the first and/or second radio IC 598A and 598B, respectively, based on the position of the switches. Table 5 below describes the operating band(s) of each antenna and the particular ports of the first and second radio ICs 598A and 598B, respectively, that the respective antenna can be connected to (based on the position of the switches).

TABLE 5

| Antenna Operating Band(s) and Possible TX/RX Port connections for FIG. 5E | | | |
|---|---|---|---|
| Antenna | Antenna Set | Operating Band(s) | Possible TX/RX Port Connections |
| 580a | 1 | 2.4 GHz, 5 GHz Low, 5 GHz High, 6 GHz | TX/RX0 of First Radio IC 598A |
| 580b | 1 | 2.4 GHz, 5 GHz Low, 5 GHz High, 6 GHz | TX/RX0 of First Radio IC 598A |

TABLE 5-continued

Antenna Operating Band(s) and Possible TX/RX Port connections for FIG. 5E

| Antenna | Antenna Set | Operating Band(s) | Possible TX/RX Port Connections |
|---|---|---|---|
| 582a | 2 | 2.4 GHz, 5 GHz Low, 5 GHz High, 6 GHz | TX/RX1 of First Radio IC 598A |
| 582b | 2 | 2.4 GHz, 5 GHz Low, 5 GHz High, 6 GHz | TX/RX1 of First Radio IC 598A |
| 584 | 3 | BT, 2.4 GHz, 5 GHz Low, 5 GHz High, 6 GHz | TX/RX2 of First Radio IC 598A and/or TX/RX0 of Second Radio IC 598B |
| 586 | 4 | 2.4 GHz, 5 GHz Low, 5 GHz High, 6 GHz | TX/RX1 of Second Radio IC 598B |

For instance, switch 596*a* may be used to select one of the three bandpass filters 520*a*, 520*b*, and 520*c* for the signal path from the TX/RX0 port of the first radio 504A. Switches 596*b*, 596*c*, and 596*d* operate in a similar manner for the TX/RX1 port of radio 598A, the TX/RX0 port of radio 598B, and the TX/RX1 port of radio 598B respectively. The combination of switches 594*a* and 592*a* may be used to select one of the three bandpass filters 520*a*, 520*b*, and 520*c* for coupling to the diplexer 590*a*. Similarly, switch combination 594*b*/592*b*, may be used to select one of the three bandpass filters 522*a*, 522*b*, and 522*c* for coupling to the diplexer 590*b*. Switch combination 594*c*/592*c* may be used to select one of the three bandpass filters 524*a*, 524*b*, and 524*c* for coupling to the diplexer 590*c*. Switch combination 594*d*/592*d* may be used to select one of the three bandpass filters 526*a*, 526*b*, and 526*c* for coupling to the antenna 586.

Switch 588*a* may be used to select between the two diversity antennas 580*a* and 580*b*, for the TX/RX0 port of the first radio 504A. Likewise, switch 588*b* may be used to select between the two diversity antennas 582*a* and 582*b*, for the TX/RX1 port of the first radio 504A.

IV. Example Methods

Figure 6A:
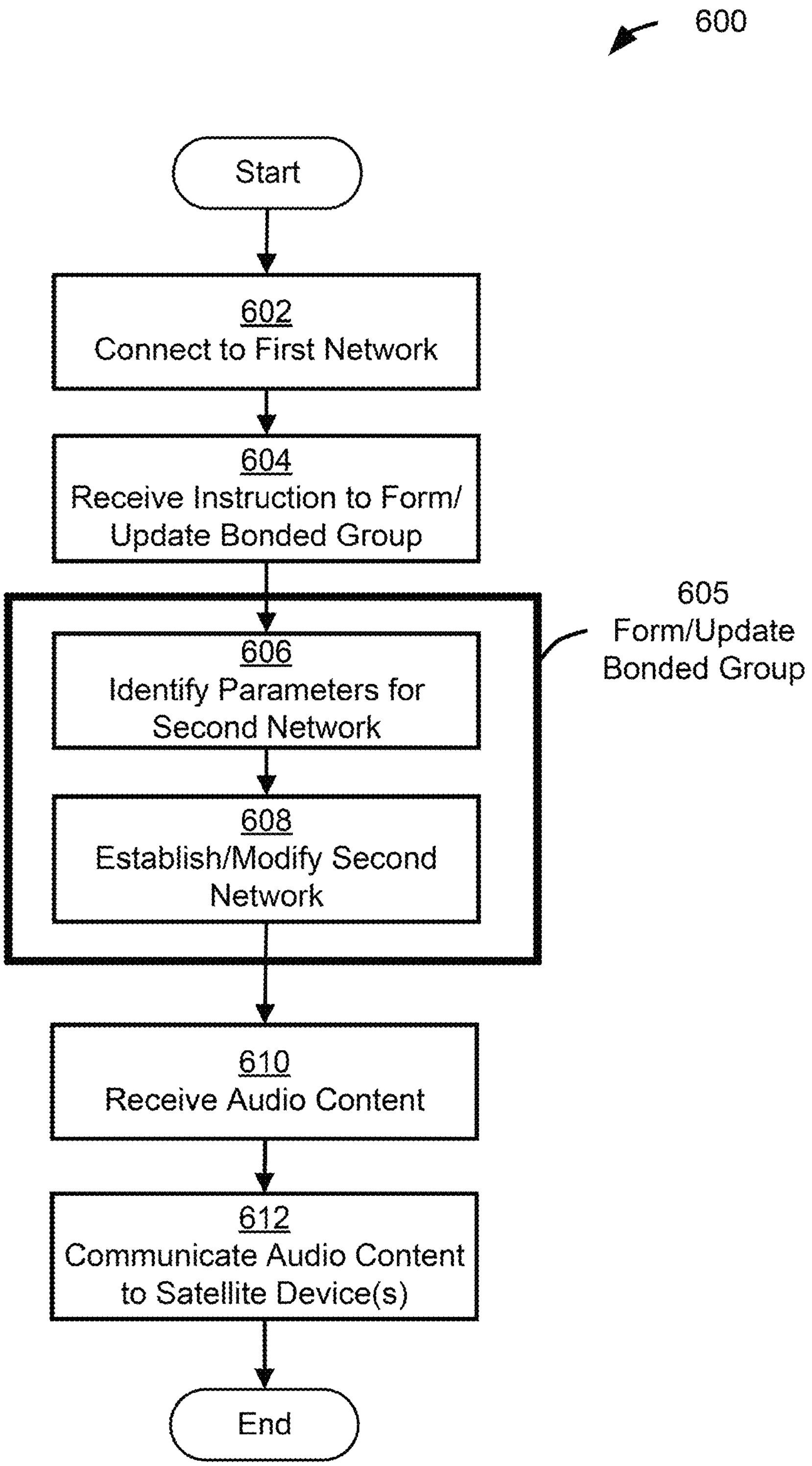
FIG. 6A illustrates a method of operation, in accordance with an example.

FIG. 6A is an example method of operation for a primary device (e.g., or any other device described herein) during setup of and/or an update to a bonded group in accordance with the flexible backhaul techniques described herein. As shown, process 600 comprises an act 602 of connecting to a first network, an act 604 of receiving an instruction to form/update a bonded group, an act 605 of forming/updating the bonded group, an act 610 of receiving audio content, and an act 612 of communicating the audio content to satellite device(s). The act 605 of forming/updating the bonded group may comprise an act 606 of identifying parameters for the second network and an act 608 of establishing/modifying the second network.

In act 602, the primary device may connect to a first network. For example, the primary device may establish a backhaul connection to an AP (e.g., connection 207 in FIG. 2A). The primary device may, for example, establish the connection to the first network using security credentials received from a user device (e.g., user device 210) during initial setup of the primary device.

In act 604, the primary device may receive an instruction to form/update a bonded group. For example, the primary device may receive an instruction (e.g., from a user device) to form a bonded group with one or more satellite devices. Additionally (or alternatively), the primary device may receive an instruction (e.g., from a user device) to modify an existing group (e.g., add a new satellite device, remove a satellite device, etc.).

In act 605, the primary device may form/update the bonded group based on the instruction received in act 604. For example, the primary device may establish a second network for the one or more satellite devices to connect to (e.g., to receive audio content) and/or assign particular roles for the satellites to perform in the bonded group (e.g., assign a subset of audio channels from multi-channel audio content to render). It should be appreciated that the primary device may form/update the bonded group in any of a variety of ways. For instance, the primary device may perform one or more of operations 606 and 608 in forming/updating the bonded group.

In act 606, the primary device may identify one or more parameters for the second network. For instance, the primary device may identify one or more of the following parameters for the second network: an operating band (e.g., 2.4 GHz band, 5 GHz band, 6 GHz band, etc.), a wireless channel (e.g., channels 1-11 in the 2.4 GHz band), a wireless channel width (e.g., 10 MHz, 20 MHz, 40 MHz, 80 MHz, 160 MHz, etc.), a signal modulation scheme (e.g., Binary Phase Shift Keying (BPSK), Quadrature Phase Shift Keying (QPSK), Quadrature Amplitude Modulation (QAM), etc.), one or more supported communication protocols (802.11g, 802.11n, 802.11ac, 802.11ac+, 802.11ax, etc.), guard intervals, coding rate (e.g., 1/2, 2/3, 3/4, 5/6), coding scheme (e.g., High Throughput Modulation and Coding Scheme (HT-MCS), Very High Throughput Modulation and Coding Scheme (VHT-MCS), etc.), security protocol (e.g., WEP, WPA, WPA2, WPA3, etc.), and/or transmit power level(s) (e.g., maximum transmit power level).

The primary device may identify the one or more parameters for the second network based on any of a variety of information. In some instances, the primary device may identify the one or more parameters for the second network based on one or more parameters for the first network. For example, the primary device may identify a band (or sub-band) that is occupied for communication over the first network and set an operating band for the second wireless network to be one (e.g., the first) of the remaining (e.g., currently unused) bands (or sub-bands). Table 5 shows an example band (and/or sub-band) options based on the band employed for communication over the first network.

TABLE 5

Example Band Options for Second Wireless Network

| First Network Band/Sub-Band | Second Network Band/Sub-Band Options |
|---|---|
| 2.4 GHz | 5 GHz or 6 GHz |
| 5 GHz Low | 5 GHz High or 6 GHz |
| 5 GHz High | 5 GHz Low or 6 GHz |
| 6 GHz | 5 GHz Low or 5 GHz High |

It should be appreciated that information separate and apart from the one or more parameters associated with the first network may be taken into account when identifying the one or more parameters for the second network. For example, additionally or alternatively, the primary device may take into account any one or more of the following information sources: (1) capabilities of the satellite devices in the bonded group such as audio rendering capabilities (e.g., a number of audio channels that can be simultaneously rendered) and/or wireless communication capabilities (e.g., supported communication protocols, supported frequency spectrums, etc.); (2) regulatory requirements (e.g., allowed wireless channels, transmit power levels, etc.) of the geographic region in which the device is operating (e.g., Europe, USA, China, etc.); (3) existence (or absence) of a wired connection between the device and a given satellite device; and (4) state information associated with one or more playback devices (e.g., wireless channel(s) used by another primary device to communicate to another set of one or more satellite devices in another part of a user's home). Accordingly, any of a variety of information sources may be employed to identify the one or more parameters for the second network.

In some embodiments, the order in which the acts are performed may be changed. For example, the second network may be determined/established before the first network, in which case act 602 may be performed after act 605.

Figure 6B:
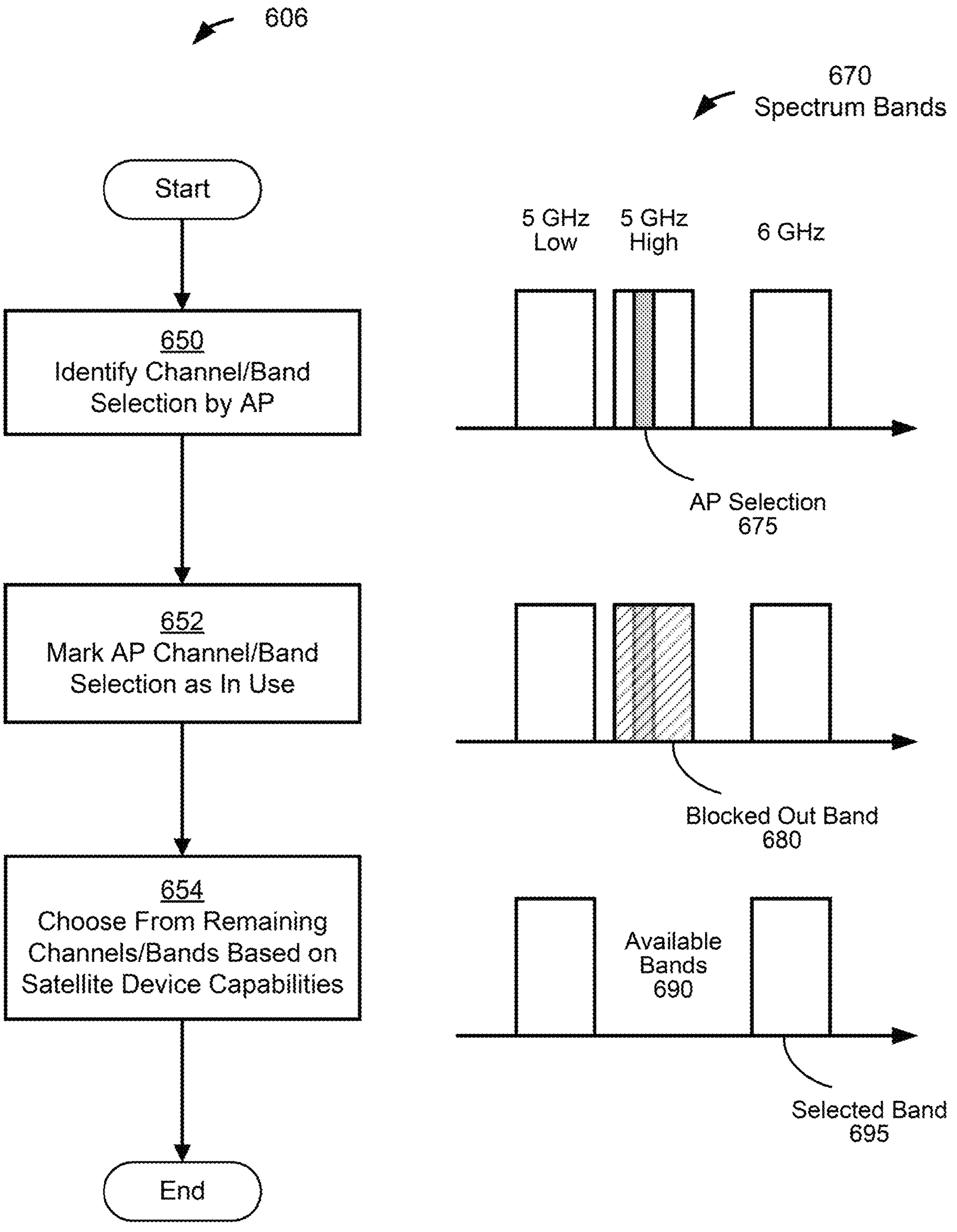
FIG. 6B illustrates additional detail of the method of operation depicted in FIG. 6A, in accordance with an example.

FIG. 6B, illustrates one example of the process (e.g., act 606) for identifying parameters for a second network, in greater detail. In act 650, the primary device identifies the channel/band that was selected by the AP from the available spectrum range 670, for backhaul communication. This is listed as the first network of Table 5 above. For example, the AP may have selected a channel 675 in the 5 GHz High sub-band for communication with the primary device 202 and/or user device 210.

In act 652, the primary device then marks the 5 GHz High sub-band as reserved and unavailable for use with the second network. This is shown as blocked out region 680 of the spectrum.

In act 654, the primary device choses one of the remaining available bands 690, in this case either 5 GHz Low or 6 GHZ, based on, for instance, the capabilities of the satellite devices that will be included in the second network. For example, if the satellite devices are all capable of operating in the 6 GHz band, then the 6 GHz band, and the associated parameters for that band, may be chosen to offer the best performance/lowest latency. The 6 GHz band may also be preferable to take advantage of OFDMA capabilities that can be useful for devices that can simultaneously render multiple audio channels. This is shown as selected band 695 in FIG. 6B. If, however, one of the satellite devices (e.g., an older/legacy device) is only capable of operation in the 5 GHz band (and/or if regulatory restrictions do not permit the use of the 6 GHz band) then the 5 GHz low sub-band may be chosen so that all satellite devices can communicate (recalling that the 5 GHz high sub-band was marked reserved in act 652).

If one or more of the satellite devices employs a hardwired connection to the primary, then the wireless capabilities of those wired devices need not be considered in making the choice of wireless band.

Returning now to FIG. 6A, in act 608, the primary device may establish/modify the second network based on the one or more parameters identified in act 606.

In act 610, the primary device may receive audio content. The audio content may be, for example, multi-channel audio content associated with visual content rendered by a display device. The audio content may be received via a physical interface and/or via a wireless interface.

In act 612, the device may communicate (e.g., transmit) audio content to the satellite devices over the second network. For example, the audio content may be multi-channel content and the device may communicate the appropriate subsets of the multi-channel content (e.g., appropriate channels) to each of the respective satellite devices. The satellite devices may, in turn, render the received audio content in synchrony with each other and in lip-synchrony with visual content displayed by the display device 206.

Figure 7A:
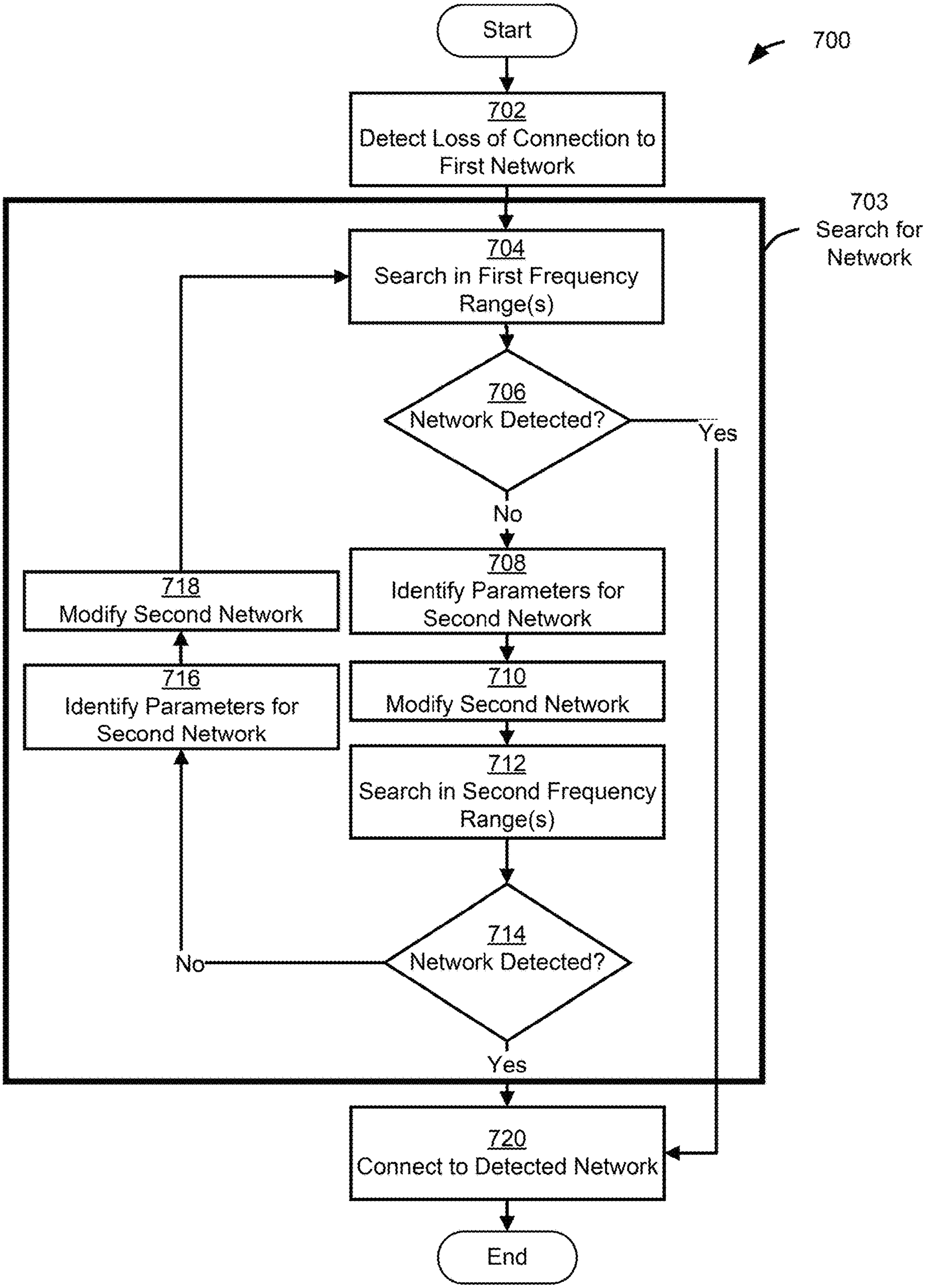
FIG. 7A illustrates another method of operation, in accordance with an example.

FIG. 7A is an example method of operation for a primary device (or any other device described herein) to re-establish a backhaul connection in accordance with the flexible backhaul techniques described herein. As shown, process 700 includes an act 702 of detecting a loss of connection to the first network, an act 703 of searching for a network, and an act 720 of connecting to the detected network. The act 703 of searching for a network may comprise an act 704 of searching in first frequency range(s), an act 706 of determining whether the network was detected, an act 708 of identifying parameters for the second network, an act 710 of modifying the second network, an act 712 of searching in second frequency range(s), an act 714 of determining whether a network was detected, an act 716 of identifying parameters for the second network, and an act 718 of modifying the second network.

In act 702, the primary device may detect loss of a connection to the first network. For example, the primary device (e.g., primary device 202 in FIG. 2A) may detect a loss of a backhaul connection to an AP (e.g., loss of connection 207 to AP 208 in FIG. 2A). The device may lose the connection to the first network for any of a variety of reasons. For instance, a user may reboot the AP (e.g., as part of installing a software update to the AP, as part of a troubleshooting process, etc.) and/or reconfigure one or more parameters associated with the network established by the AP (e.g., change the wireless channel(s) used for communication).

In act 703, the primary device may search for a network to connect to (e.g., to re-establish a backhaul connection to an AP). For example, the device may store a list of one or more known networks (e.g., including the first network) and associated credentials to connect to, such as a table comprising a list of Service Set Identifiers (SSID) and associated passwords. In this example, the primary device may search for a network that matches one of the one or more known networks to re-establish a backhaul connection.

It should be appreciated that the device may search for a network to connect to in act 703 in any of a variety of ways. In some instances, the device may coordinate the search for a network to connect to in act 703 with operation of the second network (e.g., employed to communicate audio content to satellite devices). In such instances, the device may perform one or more of acts 704, 706, 708, 710, 712, 714, 716, and/or 718 shown in FIG. 7A.

In act 704, the device may search for a network to connect to in first frequency range(s) (and/or wireless channel(s)). The first frequency range(s) may comprise one or more frequency ranges (and/or wireless channels) that are not currently occupied by the second network (e.g., non-overlapping with the second network) to avoid interfering with operation of the second network. This is graphically illustrated in FIG. 7B which shows an example where the 6 GHz band is in use by the second network and so the first frequency range to be searched 752 covers the 5 GHz Low and 5 GHz High regions. Such frequency range(s) that are non-overlapping with the second network may comprise those frequency ranges (and/or wireless channels) employed to communicate over the first network (e.g., before the loss of a connection to the first network).

Figure 7B:
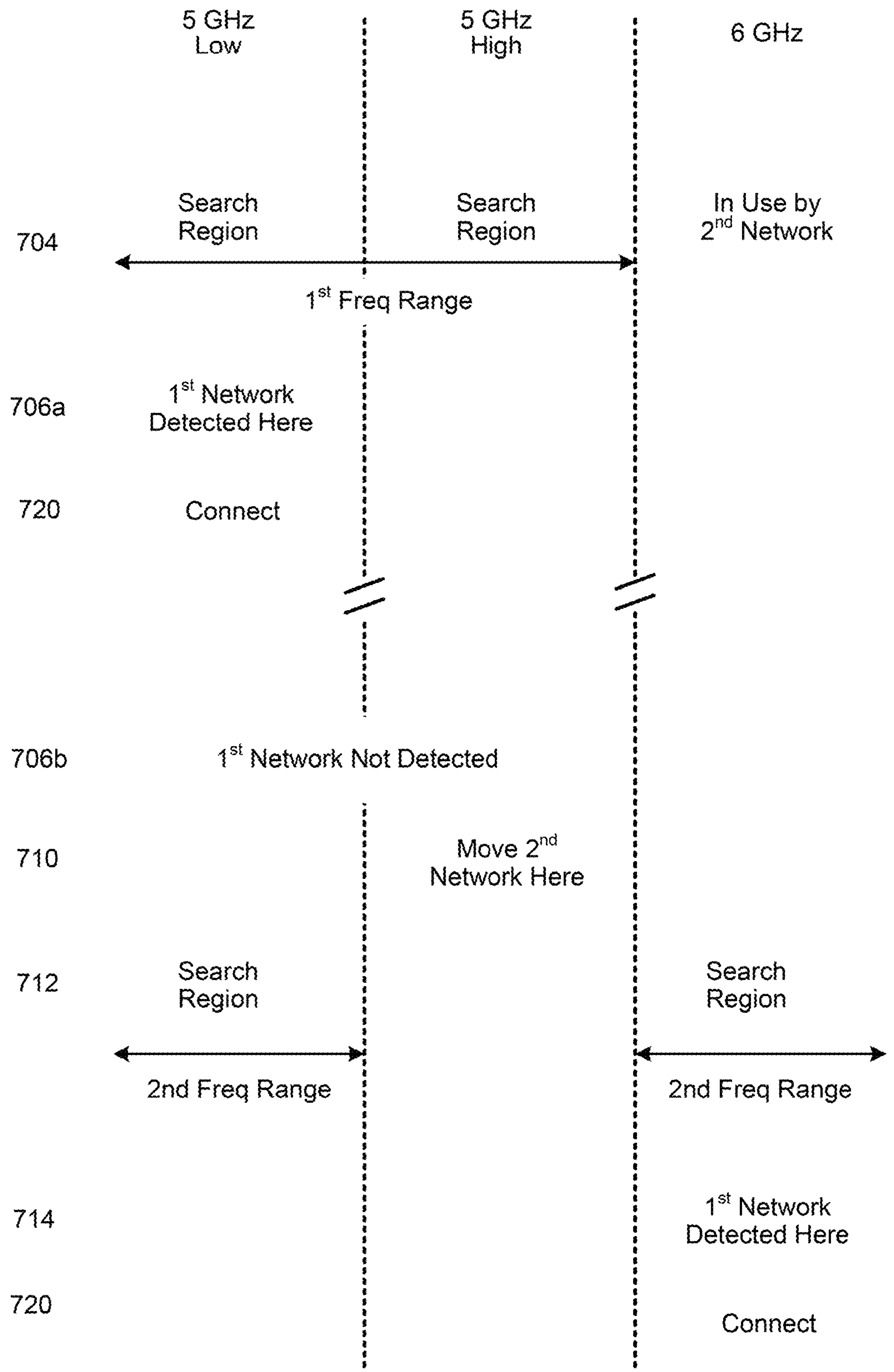
FIG. 7B illustrates additional detail of the method of operation depicted in FIG. 7A, in accordance with an example.

In act 706, the device may determine whether a network was detected in a search of the first frequency range(s) 750. For example, the primary device may have detected the first network at the same wireless channel as the first network was previously (e.g., before the loss of the connection to the first network). Such a scenario may occur, for instance, when the AP is simply rebooted. If the device determined that the network was detected in a search of the first frequency range(s), the device may proceed to act 720 and connect to the detected network. FIG. 7B illustrates an example where the first network is detected in the 5 GHz low region (in act 706*a*) and the device connects to the first network (in act 720).

Conversely, in act 706, if the device may determine that a network was not detected in a search of the first frequency ranges. This is illustrated in FIG. 7B (in act 706*b*) where the first network is not detected in the first frequency range covering 5 GHz Low and 5 GHz High. The device may then proceed to act 708 and identify a new set of one or more parameters for the second network. The device may fail to detect a network in the search of the first frequency range(s) for any of a variety of reasons. For instance, a user may have re-configured the AP to operate in a different band (and/or wireless channel) that may be overlapping with those frequency range(s) (and/or wireless channel) used by the second network. In such an instance, the network established by the AP would be outside the scope of the first search.

In act 708, the device may identify a new set of one or more parameters of the second network. For instance, the device may identify a different wireless channel to be used for operation of the second network that is in a different band and/or sub-band (e.g., to facilitate a search of the frequency range and/or wireless channels occupied by the second network during the search configured in act 704).

In act 710, the device may modify the second network in accordance with the new set of one or more parameters identified in act 708. Given that one or more devices may be connected to the second network (e.g., one or more satellite devices), the device may modify the second network without interrupting communication to the one or more devices connected to the second network using, for example, dynamic frequency selection (DFS) techniques. This is illustrated in FIG. 7B (in act 710) where the second network is moved from the 6 GHz band to the 5 GHz High sub-band.

In act 712, the device may search for a network to connect to in second frequency range(s) (and/or wireless channel(s)). The second frequency range(s) may comprise one or more frequency ranges (and/or wireless channels) that are not currently occupied by the second network (e.g., not occupied by the second network after the modification in act 710). In view of the modification to the second network in act 710, the second frequency range(s) may comprise one or more frequency ranges (and/or wireless channels) previously occupied by the second network during the search in act 704. Accordingly, the second frequency range(s) may be different from the first frequency range(s). This is illustrated in FIG. 7B (in act 712) where the second frequency range for searching is set to the 5 GHz low sub-band and the 6 GHz band.

In act 714, the device may determine whether a network was detected in a search of the second frequency range(s). If the device determines that the network was detected in the search of the second frequency range(s), the device may proceed to act 720 and connect to the detected network. This is illustrated in FIG. 7B (in act 714) where the first network is now detected in the 6 GHz band and the device connects to the detected network. Otherwise, the device may proceed to act 716 of identifying new parameters for the second network.

In act 716, the device may identify new parameters for the second network. For instance, the device may identify a different wireless channel to be used for operation of the second network that is in a different frequency range (e.g., to facilitate a search of the frequency range and/or wireless channels occupied by the second network during the search performed in act 712). The device may identify the same parameters that were previously used (e.g., when the search in act 704 was previously performed) or a different set of parameters.

In act 718, the device may modify the second network in accordance with the new set of one or more parameters identified in act 716. Given that one or more devices may be connected to the second network (e.g., one or more satellite devices), the device may modify the second network without interrupting communication to the one or more devices connected to the second network using, for example, DFS techniques.

After modification of the second network in act 718, the device may return to act 704 and search for a network to connect to in frequency range(s) (and/or wireless channel(s)) that are not currently occupied by the second network (after the modification to the second network in act 718). Such frequency range(s) may be the same as previously used in act 704 (e.g., in an instance where the parameters identified in act 716 are the same as those parameters used for the second network when the search in act 704 was previously performed). In other examples, the frequency range(s) may be different from those previously used in act 704 (e.g., in an instance where the parameters identified in act 716 are different from those parameters used for the second network when the search in act 704 was previously performed).

It should be appreciated that one or more acts of process 700 may be performed while audio is being synchronously played back in lip-synchrony with visual content displayed on a display device. For instance, a primary device may have lost a connection to the first network (and a user's AP) while still maintaining the connection to the satellites over the second network. In such an instance, the primary device may still continue wirelessly communicating any received audio content (e.g., multi-channel audio content received from a television via a physical audio interface) performing all or any portion of process 700.

Figure 8:
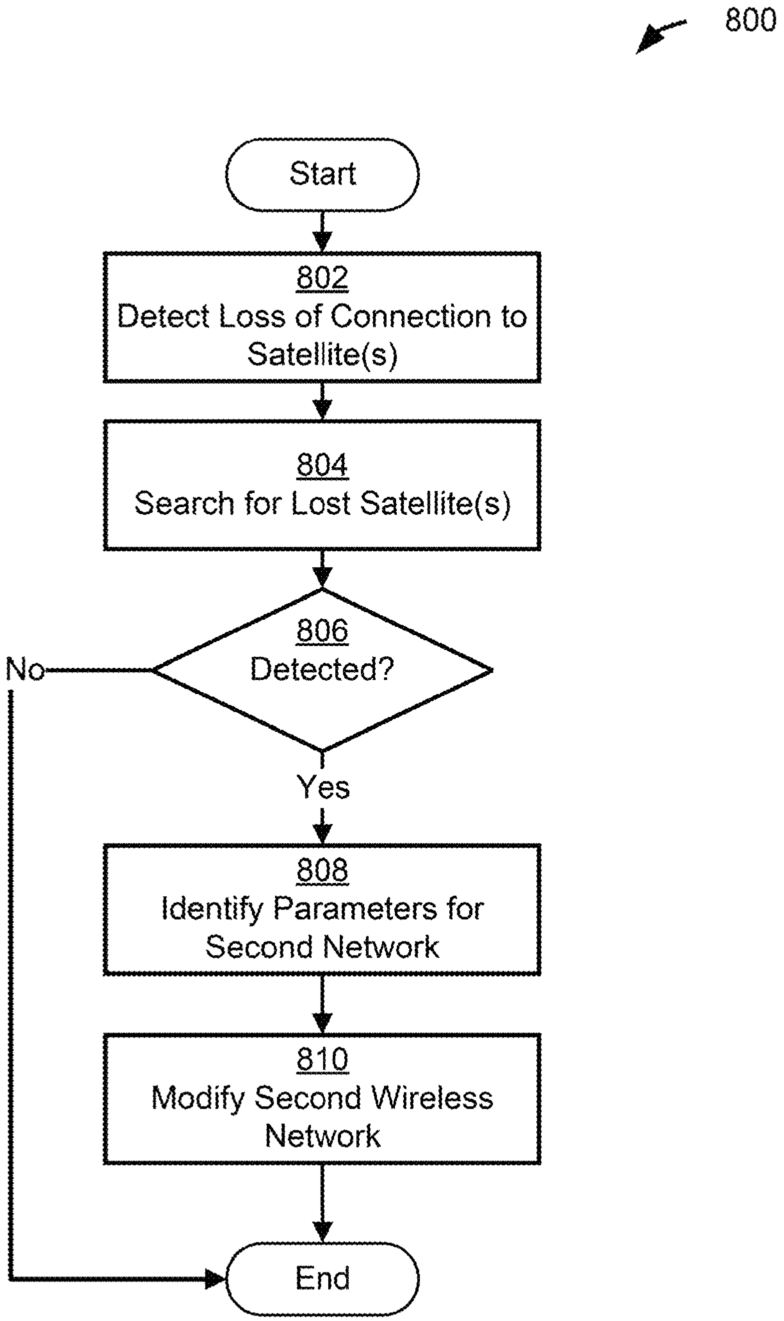
FIG. 8 illustrates another method of operation, in accordance with an example.

FIG. 8 is an example method of operation for a primary device (or any other device described herein) to re-establish a connection to one or more satellite devices in accordance with the flexible backhaul techniques described herein. As shown, process 800 comprises an act 802 of detecting a loss of connection to satellite(s), an act 804 of searching for the lost satellite(s), an act 806 of determining whether the lost satellite(s) were detected, an act 808 of identifying one or more parameter(s) for the second network, and an act 810 of modifying the second wireless network.

In act 802, the device may identify a loss of a connection to one or more satellite(s) over the second network. For instance, the device may detect that a satellite has stopped sending responses (e.g., acknowledgements, negative acknowledgements, etc.) after attempted transmissions to the satellite. A satellite may lose connection to the device for any of a variety of reasons. For instance, a satellite may have previously been connected to the device via a hardwired connection (e.g., a wired Ethernet connection) during setup of the bonded group (e.g., during execution of process 600 by the primary device). In such an instance, the device may not have taken into account the wireless capabilities of the hardwired satellite when identifying the parameters for the second network (e.g., instead taking into account the capabilities of only those satellites without a hardwired connection to the device). As a result, in a situation where the hardwired connection to the satellite is lost (e.g., disconnected by a user, failure of a piece of network switching equipment between the device and the satellite, etc.), the satellite may be unable to connect to the second network (e.g., the second network operates on a band and/or channels not supported by the satellite device).

In act 804, the device may search for the lost satellite. For example, the satellite may automatically start transmitting one or more messages upon detection of a loss of the connection to the device. In such an example, the device may perform a search for a message from the satellite.

In act 806, the device may determine whether the satellite was detected. If the satellite was detected, the device may proceed to act 808 of identifying new parameters for the second network. Otherwise, the device may end process 800 (e.g., because the satellite likely lost power altogether or is otherwise not operational).

In act 808, the device may identify new parameters for the second network. For instance, the connection to the satellite may have been lost because the satellite device previously had a hardwired connection that was lost (e.g., disconnected by a user, failure of a piece of network switching equipment between the device and the satellite, etc.) and the satellite is unable to connect to the second network as currently configured (e.g., the second network operates on a band and/or channels not supported by the satellite device). In such an instance, the device may identify new parameters now taking into account the wireless capabilities of the lost satellite device (that may not have been taken in account previously because the device was hardwired at the time). The identification of new parameters may be based on any of the considerations described previously in connection with FIG. 6 including: (1) capabilities of the satellite devices in the bonded group such as audio rendering capabilities and/or wireless communication capabilities; (2) regulatory requirements of the geographic region in which the device is operating; (3) existence (or absence) of a wired connection between the device and a given satellite device; and (4) state information associated with one or more playback devices (e.g., wireless channel(s) used by another primary device to communicate to another set of one or more satellite devices in another part of a user's home).

In act 810, the device may modify the second wireless network based on the identified parameters in act 808.

In some embodiments, the search for a lost satellite may use an intermediary device such as user device 210. For example, a lost satellite may be transmitting its status and a request for help on a BLUETOOTH channel or through some other mechanism that the primary device is not capable of receiving. In this case, the user device 210, for example a smart phone, may have the capability to receive those messages from the lost satellite and relay them to the primary device, either through the AP 208 backhaul link or directly over communication link 211. In some instances, the user device may be configured to continuously or periodically scan for messages from lost satellites. In some instances, the primary device may send a request to the user device for help in locating lost satellites that are no longer visible to the primary device.

V. Conclusion

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for the implementation of the functions and methods.

The description above discloses, among other things, various example systems, methods, apparatus, and articles of manufacture including, among other components, firmware and/or software executed on hardware It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only ways to implement such systems, methods, apparatus, and/or articles of manufacture.

It should be appreciated that the latency reduction techniques may be advantageously implemented in any of a variety of devices (e.g., playback devices) separate and apart from those specific playback devices configured to receive audio content from a television. For example, the latency reduction techniques may be readily integrated into a television itself (or any other playback device that displays video content) that wirelessly communicates the audio content to other devices (e.g., a soundbar, a sub, rear satellites, etc.) for playback in synchrony with the displayed video content. While such a television could simply delay output of the video content to accommodate the time needed to successfully transmit all the audio to the other devices for playback, such a design would undesirably increase the input lag of the television. Thus, the latency reduction techniques described herein may be readily implemented in such a television (or any other playback device that displays video content) so as to limit (and/or eliminate) the delay that would need to otherwise be introduced to accommodate the wireless transmission of the audio content to the requisite devices.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well-known methods, procedures, components, and circuitry have not been described in detail to avoid unnecessarily obscuring aspects of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

VI. Example Features (Feature 1) A playback device comprising: radio circuitry comprising a first radio and a second radio; at least one antenna coupled to the radio circuitry; at least one processor; at least one non-transitory computer-readable medium; and program instructions stored on the non-transitory computer-readable medium that are executable by the at least one processor such that the playback device is configured to connect, using the first radio, to a first wireless network; receive an instruction to form a bonded group, wherein the bonded group comprises the playback device and a satellite playback device; identify one or more parameters for a second wireless network over which to communicate with the satellite playback device; establish, using the second radio, the second wireless network in accordance with the identified one or more parameters for the second wireless network; and after the satellite playback device has connected to the second wireless network, (i) receive audio content, and (ii) communicate at least a portion of the audio content to the satellite playback device over the second wireless network.

(Feature 2) The playback device of feature 1, wherein the program instructions that are executable by the at least one processor such that the playback device is configured to identify the one or more parameters for the second wireless network comprise program instructions that are executable by the at least one processor such that the playback device is configured to: identify the one or more parameters for the second wireless network based on at least one of: one or more parameters for the first wireless network or one or more capabilities of the satellite playback device.

(Feature 3) The playback device of feature 1 or 2, wherein the at least one non-transitory computer-readable medium further comprises program instructions that are executable by the at least one processor such that the playback device is configured to: detect a loss of connection to the first wireless network; search for the first wireless network in a first frequency range, the first frequency range excluding a frequency range used by the second wireless network; and reconnect to the first wireless network based on a successful search.

(Feature 4) The playback device of feature 3, wherein the search is a first search and wherein the at least one non-transitory computer-readable medium further comprises program instructions that are executable by the at least one processor such that the playback device is configured to, based on failure of the first search: identify one or more new parameters for the second wireless network over which to communicate with the satellite playback device, based on one or more parameters for the first wireless network and based on capabilities of the satellite playback device; modify the second wireless network in accordance with the identified one or more new parameters; perform a second search for the connection to the first wireless network in a second frequency range, the second frequency range excluding a frequency range used by the modified second wireless network; and reconnect to the first wireless network based on a successful second search.

(Feature 5) The playback device of any of features 1-4, wherein the at least one non-transitory computer-readable medium further comprises program instructions that are executable by the at least one processor such that the playback device is configured to: detect a loss of connection to the satellite playback device; detect the satellite playback device based on receipt of a transmission from the satellite playback device; based on a successful detection of the satellite playback device: identify one or more new parameters for the second wireless network over which to communicate with the satellite playback device, based on one or more parameters for the first wireless network and based on capabilities of the satellite playback device; and modify the second wireless network in accordance with the identified one or more new parameters.

(Feature 6) The playback device of feature 5, wherein the program instructions that are executable by the at least one processor such that the playback device is configured to detect the loss of connection to the satellite playback device comprise program instructions that are executable by the at least one processor such that the playback device is configured to: detect a failure to receive, within a timeout period, a response to a transmission from the playback device to the satellite playback device.

(Feature 7) The playback device of feature 5, wherein the program instructions that are executable by the at least one processor such that the playback device is configured to detect the loss of connection to the satellite playback device comprise program instructions that are executable by the at least one processor such that the playback device is configured to: detect the loss of connection to the satellite playback device based on receipt of a message from an intermediary device indicating a status of the satellite device.

(Feature 8) The playback device of feature 7, wherein the intermediary device is a user device configured to control the playback device.

(Feature 9) The playback device of feature 8, wherein the intermediary device is a smartphone.

(Feature 10) The playback device of any of features 1-9, wherein the playback device is a soundbar.

(Feature 11) The playback device of any of features 1-19, wherein the playback device is a smart television.

(Feature 12) The playback device of any of features 1-11, wherein the first wireless network includes a WIFI Access Point (AP).

(Feature 13) The playback device of feature 12, wherein the WIFI AP is a first WIFI AP, and the playback device further comprises a second WIFI AP configured to perform as a mesh router.

(Feature 14) The playback device of any of features 1-13, wherein the audio content is received over the first wireless network.

(Feature 15) The playback device of any of features 1-14, wherein the identified one or more parameters include one or more of an operating band, a wireless channel, a wireless channel width, a signal modulation scheme, and a communication protocol.

(Feature 16) The playback device of feature 15, wherein the operating band is one of a 2.4 GHz band, a first region of a 5 GHz band, a second region of the 5 GHz band, or a 6 GHz band.

(Feature 17) The playback device of any of features 1-16, wherein the at least one antenna is a multi-band antenna configured to operate in two or more operating bands.

(Feature 18) The playback device of any of features 1-17, further comprising switching circuitry configured to couple one or more of the at least one antenna to one or more communication ports of the first or second radio.

(Feature 19) The playback device of feature 18, wherein the program instructions are executable by the at least one processor to generate a signal to control the switching circuitry to select the one or more of the at least one antenna to be coupled to the one or more communication ports.

(Feature 20) The playback device of feature 18, further comprising filter circuitry coupled between the switching circuitry and the at least one antenna, the filter circuitry configured to filter signals transmitted or received from communication ports to a selected operating band.

(Feature 21) The playback device of feature 20, wherein the filter circuitry comprises one or more of a bandpass filter, a low pass filter, a high pass filter, an all pass filter, or a diplexer.

(Feature 22) The playback device of any of features 21, wherein the at least one non-transitory computer-readable medium further comprises program instructions that are executable by the at least one processor such that the playback device is configured to: simultaneously communicate with a first of the satellite playback devices in a 2.4 GHz band and a second of the satellite playback devices in a 5 GHz or 6 GHz band.

(Feature 23) A first device comprising: radio circuitry comprising a first radio and a second radio; at least one antenna coupled to the radio circuitry; at least one processor; at least one non-transitory computer-readable medium; and program instructions stored on the non-transitory computer-readable medium that are executable by the at least one processor such that the playback device is configured to connect, using the first radio, to a first wireless network; receive an instruction to form a second wireless network for at least one second device to join; identify one or more parameters for a second wireless network over which to communicate with the at least one second device; establish, using the second radio, the second wireless network in accordance with the identified one or more parameters for the second wireless network; and after the at least one second device has connected to the second wireless network, (i) receive data via the first wireless network, and (ii) communicate at least a portion of the received data to one or more of the at least one second device over the second wireless network.

(Feature 24) The first device of feature 23, wherein the first device is a user device.

(Feature 25) The first device of features 22 or 23, wherein the first device is a video playback device.

(Feature 26) A playback device comprising: radio circuitry comprising a first radio and a second radio; at least one antenna coupled to the radio circuitry; at least one processor; at least one non-transitory computer-readable medium; and program instructions stored on the non-transitory computer-readable medium that are executable by the at least one processor such that the playback device is configured to connect, using the first radio, to a first wireless network; receive an instruction to form a bonded group, wherein the bonded group comprises the playback device and a satellite playback device; identify one or more parameters for a second wireless network over which to communicate with the satellite playback device; establish, using the second radio, the second wireless network in accordance with the identified one or more parameters for the second wireless network; and after the satellite playback device has connected to the second wireless network, (i) while receiving an audio stream comprising multi-channel audio content, communicate at least one first channel of the multi-channel audio content to the satellite playback device over the second wireless network, and (ii) render at least one second channel of the multi-channel audio content in synchrony with rendering of the at least one first channel by the satellite playback device.

(Feature 27) A method of operating a playback device, the method comprising: connecting, using a first radio, to a first wireless network; receiving an instruction to form a bonded group, wherein the bonded group comprises the playback device and a satellite playback device; identifying one or more parameters for a second wireless network over which to communicate with the satellite playback device; establishing, using a second radio, the second wireless network in accordance with the identified one or more parameters for the second wireless network; and after the satellite playback device has connected to the second wireless network, (i) receiving audio content, and (ii) communicating at least a portion of the audio content to the satellite playback device over the second wireless network.

(Feature 28) The method of feature 27, further comprising identifying the one or more parameters for the second wireless network based on at least one of: one or more parameters for the first wireless network or one or more capabilities of the satellite playback device.

(Feature 29) The method of features 27 or 28, further comprising: detecting a loss of connection to the first wireless network; searching for the first wireless network in a first frequency range, the first frequency range excluding a frequency range used by the second wireless network; and reconnecting to the first wireless network based on a successful search.

(Feature 30) The method of feature 29, wherein the search is a first search and wherein the method further comprises, based on failure of the first search: identifying one or more new parameters for the second wireless network over which to communicate with the satellite playback device, based on one or more parameters for the first wireless network and based on capabilities of the satellite playback device; modifying the second wireless network in accordance with the identified one or more new parameters; performing a second search for the connection to the first wireless network in a second frequency range, the second frequency range excluding a frequency range used by the modified second wireless network; and reconnecting to the first wireless network based on a successful second search.

(Feature 31) The method of any of features 27-30, further comprising: detecting a loss of connection to the satellite playback device; detecting the satellite playback device based on receipt of a transmission from the satellite playback device; based on a successful detection of the satellite playback device: identifying one or more new parameters for the second wireless network over which to communicate with the satellite playback device, based on one or more parameters for the first wireless network and based on capabilities of the satellite playback device; and modifying the second wireless network in accordance with the identified one or more new parameters.

(Feature 32) The method of feature 31, wherein detecting the loss of connection to the satellite playback device further comprises detecting a failure to receive, within a timeout period, a response to a transmission from the playback device to the satellite playback device.

(Feature 33) The method of feature 31, wherein detecting the loss of connection to the satellite playback device further comprises detecting the loss of connection to the satellite playback device based on receipt of a message from an intermediary device indicating a status of the satellite device.

(Feature 34) The method of feature 33, wherein the intermediary device is a user device configured to control the playback device.

(Feature 35) The method of feature 34, wherein the intermediary device is a smartphone.

(Feature 36) The method of any of features 27-35, wherein the playback device is a soundbar.

(Feature 37) The method of any of features 27, wherein the playback device is a smart television.

(Feature 38) The method of feature 27-36, wherein the first wireless network includes a WIFI Access Point (AP).

(Feature 39) The method of feature 38, wherein the WIFI AP is a first WIFI AP, and the playback device further comprises a second WIFI AP configured to perform as a mesh router.

(Feature 40) The method of any of features 27-39, wherein the audio content is received over the first wireless network.

(Feature 41) The method of any of features 27-40, wherein the identified one or more parameters include one or more of an operating band, a wireless channel, a wireless channel width, a signal modulation scheme, and a communication protocol.

(Feature 42) The method of feature 41, wherein the operating band is one of a 2.4 GHz band, a first region of a 5 GHz band, a second region of the 5 GHz band, or a 6 GHz band.

(Feature 43) The method of any of features 27-42, further comprising controlling switching circuitry to select one or more antennas to be coupled to one or more communication ports of the first or second radio.

(Feature 44) The method of feature 43, further comprising filtering signals transmitted or received from the communication ports to a selected operating band.

(Feature 45) The method of any of features 27-44, further comprising simultaneously communicating with a first of the satellite playback devices in a 2.4 GHz band and a second of the satellite playback devices in a 5 GHz or 6 GHz band.

(Feature 46) A method for a first playback device, the method comprising: connecting, using a first radio, to a first wireless network; based on a received instruction, identifying one or more parameters for a second wireless network over which to communicate with the at least one second playback device; establishing, using a second radio, the second wireless network in accordance with the identified one or more parameters for the second wireless network; and after the at least one second playback device has connected to the second wireless network, (i) receiving data, and (ii) communicating at least a portion of the received data to at least one of the at least one second playback device over the second wireless network.

(Feature 47) The method of feature 46, further comprising: identifying the one or more parameters for the second wireless network based on at least one of: one or more parameters for the first wireless network; or one or more capabilities of the at least one second playback device.

(Feature 48) The method of any preceding feature, further comprising: detecting a loss of connection to the first wireless network; searching for the first wireless network in a first frequency range, the first frequency range excluding a frequency range used by the second wireless network; and reconnecting to the first wireless network based on a successful search.

(Feature 49) The method of feature 48, wherein the search is a first search and wherein the processor is configured to, based on failure of the first search: identify one or more new parameters for the second wireless network over which to communicate with the at least one second playback device, based on one or more parameters for the first wireless network and based on capabilities of the at least one second playback device; modify the second wireless network in accordance with the identified one or more new parameters; perform a second search for the connection to the first wireless network in a second frequency range, the second frequency range excluding a frequency range used by the modified second wireless network; and reconnect to the first wireless network based on a successful second search.

(Feature 50) The method of any preceding feature, further comprising: detecting a loss of connection to the at least one second playback device; detecting the at least one second playback device based on receipt of a transmission from the at least one second playback device; based on a successful detection of the at least one second playback device: identifying one or more new parameters for the second wireless network over which to communicate with the at least one second playback device, based on one or more parameters for the first wireless network and based on capabilities of the at least one second playback device; and modifying the second wireless network in accordance with the identified one or more new parameters.

(Feature 51) The method of feature 50, wherein detecting the loss of connection to the at least one second playback device comprises: detecting a failure to receive, within a timeout period, a response to a transmission from the playback device to the at least one second playback device.

(Feature 52) The method of any preceding feature, wherein the data is received over the first wireless network.

(Feature 53) The method of any preceding feature, wherein receiving the instruction comprises receiving an instruction to form a bonded group, wherein the bonded group comprises the playback device and the at least one second playback device, wherein the at least one second playback device is a satellite playback device.

(Feature 54) The method of feature 53, wherein the received data is audio data, and wherein communicating at least a portion of the received data to the at least one of the at least one second device comprises communicating at least a portion of the audio data to the at least one of the at least one second playback device.

(Feature 55) The method of any preceding feature, wherein receiving the instruction comprises receiving an instruction to form a second wireless network for the at least one second device to join.

(Feature 56) The method of any preceding feature, wherein: the received data is multi-channel audio content, the at least the portion of the received data communicated to the at least one second playback device comprises at least one first channel of the multi-channel audio content, and the method further comprises rendering at least one second channel of the multi-channel audio content in synchrony with rendering of the at least one first channel by the satellite playback device.

(Feature 57) The method of any preceding feature, wherein the identified one or more parameters include one or more of an operating band, a wireless channel, a wireless channel width, a signal modulation scheme, and a communication protocol.

(Feature 58) The method of feature 57, wherein the operating band is one of a 2.4 GHz band, a first region of a 5 GHz band, a second region of the 5 GHz band, or a 6 GHz band.

(Feature 59) The method of any preceding feature, further comprising generating a signal to control switching circuitry to select at least one antenna to be coupled to one or more communication ports of the first or second radio.

(Feature 60) The method of any preceding feature, further comprising filtering, using filter circuitry coupled between the switching circuitry and the at least one antenna, signals transmitted or received from communication ports to a selected operating band.

(Feature 61) The method of any preceding feature, further comprising simultaneously communicating with a first of the at least one second playback devices in a 2.4 GHz band and a second of the at least one second playback devices in a 5 GHz or 6 GHz band.

(Feature 62) The method of feature 50 alone or in combination with any preceding feature, wherein detecting the loss of connection to the at least one second playback device is based on receipt of a message from an intermediary device indicating a status of the at least one second device.

(Feature 63) The method of feature 62, wherein the intermediary device is at least one of a user device configured to control the playback device and a smartphone.

(Feature 64) The method of any preceding feature, wherein the first playback device is at least one of: a user device; a soundbar; a smart television; and a video playback device.

(Feature 65) The method of any preceding feature, wherein the first wireless network includes a WIFI Access Point (AP).

(Feature 66) The method of feature 65, wherein the WIFI AP is a first WIFI AP, and the playback device further comprises a second WIFI AP configured to perform as a mesh router.

(Feature 67) A first playback device comprising: radio circuitry comprising a first radio and a second radio; at least one antenna coupled to the radio circuitry; at least one processor; at least one non-transitory computer-readable medium; and program instructions stored on the non-transitory computer-readable medium that are executable by the at least one processor such that the playback device is configured to perform the method of any preceding feature.

(Feature 68) The playback device of feature 67, further comprising switching circuitry configured to couple one or more of the at least one antenna to one or more communication ports of the first or second radio.

(Feature 69) The playback device of feature 68, further comprising filter circuitry coupled between the switching circuitry and the at least one antenna.

(Feature 70) The playback device of feature 69, wherein the filter circuitry comprises one or more of a bandpass filter, a low pass filter, a high pass filter, an all pass filter, or a diplexer.

(Feature 71) The playback device of one of features 68 to 70, wherein the at least one antenna is a multi-band antenna configured to operate in two or more operating bands.

What is claimed is:

1. A playback device comprising:

radio circuitry comprising a first radio and a second radio;

at least one antenna coupled to the radio circuitry;

at least one processor;

at least one non-transitory computer-readable medium; and program instructions stored on the at least one non-transitory computer-readable medium that are executable by the at least one processor such that the playback device is configured to connect, using the first radio, to a first wireless network, the first wireless network operating in accordance with one or more operating parameters;

receive an instruction to form a bonded group, wherein the bonded group comprises the playback device and a satellite playback device;

identify one or more parameters for a second wireless network over which to communicate with the satellite playback device, wherein the one or more parameters for the second wireless network are identified based on the one or more operating parameters for the first wireless network;

establish, using the second radio, the second wireless network in accordance with the identified one or more parameters for the second wireless network; and after the satellite playback device has connected to the second wireless network, (i) receive audio content via the first wireless network, and (ii) communicate at least a portion of the audio content to the satellite playback device over the second wireless network.

2. The playback device of claim 1, wherein the program instructions that are executable by the at least one processor such that the playback device is configured to identify the one or more parameters for the second wireless network comprise program instructions that are executable by the at least one processor such that the playback device is configured to:

identify the one or more parameters for the second wireless network further based on:

one or more capabilities of the satellite playback device.

3. The playback device of claim 1, wherein the at least one non-transitory computer-readable medium further comprises program instructions that are executable by the at least one processor such that the playback device is configured to:

detect a loss of a connection to the first wireless network;

perform a search for the first wireless network in a first frequency range, the first frequency range excluding a frequency range used by the second wireless network; and reconnect to the first wireless network based on a successful search.

4. The playback device of claim 3, wherein:

the search is a first search; and the at least one non-transitory computer-readable medium further comprises program instructions that are executable by the at least one processor such that the playback device is configured to, based on failure of the first search:

identify one or more new parameters for the second wireless network over which to communicate with the satellite playback device, based on the one or more operating parameters for the first wireless network and based on capabilities of the satellite playback device;

modify the second wireless network in accordance with the identified one or more new parameters;

perform a second search for the connection to the first wireless network in a second frequency range, the second frequency range excluding a frequency range used by the modified second wireless network; and reconnect to the first wireless network based on a successful second search.

5. The playback device of claim 1, wherein the at least one non-transitory computer-readable medium further comprises program instructions that are executable by the at least one processor such that the playback device is configured to:

detect a loss of connection to the satellite playback device;

detect the satellite playback device based on receipt of a transmission from the satellite playback device; and based on a successful detection of the satellite playback device:

identify one or more new parameters for the second wireless network over which to communicate with the satellite playback device, based on the one or more operating parameters for the first wireless network and based on capabilities of the satellite playback device; and modify the second wireless network in accordance with the identified one or more new parameters.

6. The playback device of claim 5, wherein the program instructions that are executable by the at least one processor such that the playback device is configured to detect the loss of connection to the satellite playback device comprise program instructions that are executable by the at least one processor such that the playback device is configured to:

detect a failure to receive, within a timeout period, a response to a transmission from the playback device to the satellite playback device.

7. The playback device of claim 5, wherein the program instructions that are executable by the at least one processor such that the playback device is configured to detect the loss of connection to the satellite playback device comprise program instructions that are executable by the at least one processor such that the playback device is configured to:

detect the loss of connection to the satellite playback device based on receipt of a message from an intermediary device indicating a status of the satellite playback device.

8. The playback device of claim 7, wherein the intermediary device is a user device configured to control the playback device.

9. The playback device of claim 8, wherein the playback device is a soundbar or a smart television and the intermediary device is a smartphone.

10. The playback device of claim 1, wherein the first wireless network includes a WIFI Access Point (AP).

11. The playback device of claim 10, wherein the WIFI AP is a first WIFI AP, and the playback device further comprises a second WIFI AP configured to perform as a mesh router.

12. The playback device of claim 1, wherein the identified one or more parameters for the second wireless network include one or more of an operating band, a wireless channel, a wireless channel width, a signal modulation scheme, or a communication protocol; and the operating band is one of a 2.4 GHz band, a first region of a 5 GHz band, a second region of the 5 GHz band, or a 6 GHz band.

13. The playback device of claim 1, wherein the at least one non-transitory computer-readable medium further comprises program instructions that are executable by the at least one processor such that the playback device is configured to simultaneously communicate with a first satellite playback in a 2.4 GHz band and a second satellite playback device in a 5 GHz or 6 GHZ band.

14. The playback device of claim 1, wherein the at least one non-transitory computer-readable medium further comprises program instructions that are executable by the at least one processor such that the playback device is configured to, after the satellite playback device has connected to the second wireless network, (i) while receiving an audio stream comprising multi-channel audio content, communicate at least one first channel of the multi-channel audio content to the satellite playback device over the second wireless network, and (ii) render at least one second channel of the multi-channel audio content in synchrony with rendering of the at least one first channel by the satellite playback device.

15. A first device comprising:

radio circuitry comprising a first radio and a second radio;

at least one antenna coupled to the radio circuitry;

at least one processor;

at least one non-transitory computer-readable medium; and program instructions stored on the non-transitory computer-readable medium that are executable by the at least one processor such that the first device is configured to connect, using the first radio, to a first wireless network, the first wireless network operating in accordance with one or more operating parameters;

receive an instruction to form a second wireless network for at least one second device to join;

identify one or more parameters for a second wireless network over which to communicate with the at least one second device, wherein the one or more parameters for the second wireless network are identified based on the one or more operating parameters for the first wireless network;

establish, using the second radio, the second wireless network in accordance with the identified one or more parameters for the second wireless network; and after the at least one second device has connected to the second wireless network, (i) receive data via the first wireless network, and (ii) communicate at least a portion of the received data to one or more of the at least one second device over the second wireless network.

16. The first device of claim 15, wherein the first device is a user device or a video playback device.

17. A method of operating a playback device, the method comprising:

connecting, using a first radio, to a first wireless network, the first wireless network operating in accordance with one or more operating parameters;

receiving an instruction to form a bonded group, wherein the bonded group comprises the playback device and a satellite playback device;

identifying one or more parameters for a second wireless network over which to communicate with the satellite playback device, wherein the one or more parameters for the second wireless network are identified based on the one or more operating parameters for the first wireless network;

establishing, using a second radio, the second wireless network in accordance with the identified one or more parameters for the second wireless network; and after the satellite playback device has connected to the second wireless network, (i) receiving audio content via the first wireless network, and (ii) communicating at least a portion of the audio content to the satellite playback device over the second wireless network.

18. The method of claim 17, further comprising:

detecting a loss of a connection to the first wireless network;

performing a search for the first wireless network in a first frequency range, the first frequency range excluding a frequency range used by the second wireless network; and reconnecting to the first wireless network based on a successful search.

19. The method of claim 18, wherein the search is a first search and wherein the method further comprises, based on failure of the first search:

identifying one or more new parameters for the second wireless network over which to communicate with the satellite playback device, based on the one or more operating parameters for the first wireless network and based on capabilities of the satellite playback device;

modifying the second wireless network in accordance with the identified one or more new parameters;

performing a second search for the connection to the first wireless network in a second frequency range, the second frequency range excluding a frequency range used by the modified second wireless network; and reconnecting to the first wireless network based on a successful second search.

20. The method of claim 17, further comprising:

detecting a loss of connection to the satellite playback device;

detecting the satellite playback device based on receipt of a transmission from the satellite playback device; and based on a successful detection of the satellite playback device:

identifying one or more new parameters for the second wireless network over which to communicate with the satellite playback device, based on the one or more operating parameters for the first wireless network and based on capabilities of the satellite playback device; and modifying the second wireless network in accordance with the identified one or more new parameters.

* * * * *